(12) United States Patent
Saito et al.

(10) Patent No.: US 6,254,964 B1
(45) Date of Patent: Jul. 3, 2001

(54) MAGNETIC RECORDING MEDIUM

(75) Inventors: Shinji Saito; Hitoshi Noguchi; Nobuo Yamazaki; Junichi Nakamikawa, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/267,929

(22) Filed: Mar. 8, 1999

(30) Foreign Application Priority Data

Feb. 10, 1997 (JP) .................................................. 9-27115
Mar. 14, 1997 (JP) .................................................. 9-61560

(51) Int. Cl.$^7$ .................................................. G11B 05/70

(52) U.S. Cl. .................. 428/141; 428/141; 428/323; 428/328; 428/329; 428/336; 428/694 BU; 428/694 BP; 428/694 BS; 428/694 BR; 428/694 BN; 428/694 BA; 428/694 BH

(58) Field of Search .................................................. 428/141, 336, 428/323, 328, 329, 694 BU, 694 BP, 694 BS, 694 BR, 694 BN, 694 BA, 694 BH, 900

(56) References Cited

U.S. PATENT DOCUMENTS

| 4,163,823 | 8/1979 | Legras et al. | 428/317.9 |
|---|---|---|---|
| 4,439,795 | 3/1984 | Kitamoto et al. | 360/131 |
| 4,447,270 | 5/1984 | Howard et al. | 106/438 |
| 4,452,830 | 6/1984 | Yoshizumi | 427/215 |
| 4,506,000 | 3/1985 | Kubota et al. | 430/39 |
| 4,507,157 | 3/1985 | Oliver, Jr. | 117/56 |
| 4,528,240 | 7/1985 | Miyoshi et al. | 428/323 |
| 4,587,157 | 5/1986 | Brock et al. | 428/216 |
| 4,617,226 | 10/1986 | Yamaguchi et al. | 428/216 |
| 4,619,856 | 10/1986 | Kamada et al. | 428/143 |
| 4,649,073 | 3/1987 | Suzuki et al. | 428/212 |
| 4,654,260 | 3/1987 | Chubachi et al. | 428/328 |
| 4,664,975 | 5/1987 | Kobayashi et al. | 428/323 |
| 4,666,769 | 5/1987 | Miyata et al. | 428/323 |
| 4,708,906 | 11/1987 | Sekiyo et al. | 428/336 |
| 4,741,953 | 5/1988 | Katsuta et al. | 428/323 |
| 4,746,558 | 5/1988 | Shimozawa et al. | 428/141 |
| 4,756,953 | 7/1988 | Utsami | 428/220 |

(List continued on next page.)

FOREIGN PATENT DOCUMENTS

| 0 392 810 A2 | 10/1990 | (EP) . |
|---|---|---|
| 0 546 277 | 6/1993 | (EP) . |
| 0 768 644 | 4/1997 | (EP) . |
| 0 847 961 | 6/1998 | (EP) . |
| 0 853 066 | 7/1998 | (EP) . |
| 0 862 163 | 9/1998 | (EP) . |
| 0 865 034 | 9/1998 | (EP) . |
| 1417442 | 12/1975 | (GB) . |
| 1417765 | 12/1975 | (GB) . |
| 62-92128 | 4/1962 | (JP) . |
| 63-113931 | 5/1963 | (JP) . |
| 54-30002 | 3/1979 | (JP) . |
| 55-55438 | 4/1980 | (JP) . |
| 55-139634 | 10/1980 | (JP) . |
| 57-6178 | 2/1982 | (JP) . |
| 58-85931 | 5/1983 | (JP) . |
| 58-139337 | 8/1983 | (JP) . |
| 58-159228 | 9/1983 | (JP) . |
| 58-51327 | 11/1983 | (JP) . |
| 59-8124 | 1/1984 | (JP) . |
| 59-154646 | 9/1984 | (JP) . |
| 60-109020 | 6/1985 | (JP) . |
| 60-154327 | 8/1985 | (JP) . |
| 60-164926 | 8/1985 | (JP) . |
| 60-193130 | 10/1985 | (JP) . |
| 61-172215 | 8/1986 | (JP) . |
| 60-204827 | 9/1986 | (JP) . |
| 60-204829 | 9/1986 | (JP) . |
| 61 204 827 | 9/1986 | (JP) . |
| 61-214127 | 9/1986 | (JP) . |
| 61-216116 | 9/1986 | (JP) . |
| 61-237623 | 10/1986 | (JP) . |
| 61-241325 | 10/1986 | (JP) . |

(List continued on next page.)

OTHER PUBLICATIONS

Nikkei Electronics No. 667 Jul. 29, 1996 pp. 87–90.*
The Advantages of the Thin Magnetic Layer on a Metal Particulate Tape, IEEE Transactions on Magnetica, vol. 29, No. 6, Nov. 1993.
Development of Particulate Recording Media with Ultrathin Magnetic Layer, IEICE Trans Electron, vol. E78–C. No. 11, Nov. 1995.
Enabling technologies for a 100MB 3.5" floppy (ZIP™) disk drive, 220/SPIE vol. 2604.

*Primary Examiner*—Stevan A. Resan
(74) *Attorney, Agent, or Firm*—Stroock & Stroock & Lavan LLP

(57) ABSTRACT

A magnetic recording medium is disclosed, which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.17 to 2 G bit/inch$^2$, wherein the coercive force of the magnetic layer is 1,800 Oe or more, the average long axis length of the ferromagnetic metal powder is 0.15 $\mu$m or less, and the average particle size of the ferromagnetic hexagonal ferrite powder is 0.10 $\mu$m or less; or wherein the dry thickness of the magnetic layer is from 0.05 to 0.30 $\mu$m, $\phi$m is from $10.0 \times 10^{-3}$ to $1.0 \times 10^{-3}$ emu/cm$^2$, and the coercive force of the magnetic layer is 1,800 Oe or more.

The object of the present invention is to provide a magnetic recording medium which is markedly improved in electromagnetic characteristics, particularly, high density recording characteristics, and is excellent in durability: and to provide a high capacity magnetic recording medium, in particular, a disc-like magnetic recording medium, having a high recording capacity of from 0.17 to 2 Gbit/inch$^2$.

37 Claims, No Drawings

U.S. PATENT DOCUMENTS

| | | | |
|---|---|---|---|
| 4,784,895 | 11/1988 | Mizuno et al. | 512/25 |
| 4,794,042 | 12/1988 | Kubota et al. | 428/328 |
| 4,839,225 | 6/1989 | Matsufuji et al. | 428/336 |
| 4,844,963 | 7/1989 | Takasuma et al. | 428/65.3 |
| 4,847,147 | 7/1989 | Aonuma et al. | 428/329 |
| 4,851,289 | 7/1989 | Ogawa et al. | 428/329 |
| 4,857,388 | 8/1989 | Ogawa et al. | 428/212 |
| 4,863,791 | 9/1989 | Steward et al. | 428/310.5 |
| 4,863,793 | 9/1989 | Ogawa et al. | 428/323 |
| 4,865,924 | 9/1989 | Saito et al. . | |
| 4,874,633 | 10/1989 | Komatsu et al. | 427/54 G |
| 4,910,068 | 3/1990 | Tokagi et al. | 428/141 |
| 4,916,024 | 4/1990 | Kasuga et al. | 428/323 |
| 4,943,479 | 7/1990 | Yamada et al. | 428/331 |
| 4,952,444 | 8/1990 | Kawamata et al. | 428/141 |
| 4,963,433 | 10/1990 | Ogawa et al. | 428/323 |
| 4,965,120 | 10/1990 | Ono et al. | 428/213 |
| 5,030,484 | 7/1991 | Chino et al. | 427/434.3 |
| 5,032,428 | 7/1991 | Ogawa et al. | 427/130 |
| 5,051,291 | 9/1991 | Kowahaue et al. | 428/141 |
| 5,051,303 | 9/1991 | Naguchi et al. | 428/329 |
| 5,093,192 | 3/1992 | Kawahara et al. | 428/323 |
| 5,104,750 | 4/1992 | Kubo et al. | 428/694 MT |
| 5,112,679 | 5/1992 | Nakagawa et al. | 428/323 |
| 5,151,323 | 9/1992 | Kowahaue et al. | 428/323 |
| 5,156,908 | 10/1992 | Araki et al. | 428/323 |
| 5,160,761 | 11/1992 | Koga et al. | 427/548 |
| 5,196,265 | 3/1993 | Ryoke et al. | 428/332 |
| 5,219,670 | 6/1993 | Ohno et al. | 428/694 B |
| 5,258,223 | 11/1993 | Inaba et al. | 428/323 |
| 5,268,206 | 12/1993 | Komatsu et al. | 427/548 |
| 5,300,314 | 4/1994 | Hayakawa et al. | 427/58 |
| 5,318,838 | 6/1994 | Matsufuji et al. | 428/328 |
| 5,358,777 | 10/1994 | Kojima et al. | 428/212 |
| 5,384,175 | 1/1995 | Kojima et al. | 428/65.3 |
| 5,455,104 | 10/1995 | Sekigucho et al. | 428/212 |
| 5,455,112 | 10/1995 | Inaba et al. | 428/323 |
| 5,458,948 | 10/1995 | Yanagita | 428/141 |
| 5,489,466 | 2/1996 | Inaba et al. | 428/212 |
| 5,503,911 | 4/1996 | Aoki et al. | 428/213 |
| 5,512,350 * | 4/1996 | Ayoke et al. | 428/141 |
| 5,514,464 | 5/1996 | Sasaki et al. | 428/323 |
| 5,518,804 | 5/1996 | Mizuno et al. | 428/212 |
| 5,532,041 | 7/1996 | Honjo et al. | 428/141 |
| 5,547,772 | 8/1996 | Saito et al. | 428/694 B |
| 5,597,638 | 1/1997 | Saito et al. | 428/141 |
| 5,645,917 | 7/1997 | Ejiri et al. . | |
| 5,672,423 | 9/1997 | Inaba et al. | 428/323 |
| 5,688,591 * | 11/1997 | Kuwaijima et al. | 428/323 |
| 5,698,311 * | 12/1997 | Masaki et al. | 428/328 |
| 5,700,541 * | 12/1997 | Okita et al. | 428/65.4 |
| 5,750,250 | 5/1998 | Hayashi et al. . | |
| 5,756,148 | 5/1998 | Ejiri et al. . | |
| 5,763,046 | 6/1998 | Ejiri et al. . | |
| 5,780,141 | 7/1998 | Ejiri et al. . | |
| 5,792,543 | 8/1998 | Ejiri et al. . | |
| 5,795,646 | 8/1998 | Ejiri et al. . | |
| 5,811,166 | 9/1998 | Ejiri et al. . | |
| 5,811,172 | 9/1998 | Ejiri et al. . | |
| 5,827,600 | 10/1998 | Ejiri et al. . | |
| 5,851,622 | 12/1998 | Ejiri et al. . | |
| 5,888,637 | 3/1999 | Kakuishi et al. . | |
| 5,958,565 | 9/1999 | Hattori et al. . | |
| 6,096,406 * | 8/2000 | Yamazaki et al. | 428/141 |

FOREIGN PATENT DOCUMENTS

| | | |
|---|---|---|
| 62-001115A | 1/1987 | (JP) . |
| 62-22235 | 1/1987 | (JP) . |
| 62-33337 | 2/1987 | (JP) . |
| 62-36727 | 2/1987 | (JP) . |
| 62-159338 | 7/1987 | (JP) . |
| 62-188017 | 8/1987 | (JP) . |
| 62-219321 | 9/1987 | (JP) . |
| 62-222427 | 9/1987 | (JP) . |
| 62-234231 | 10/1987 | (JP) . |
| 63-146210 | 6/1988 | (JP) . |
| 63-157313 | 6/1988 | (JP) . |
| 63-164022 | 7/1988 | (JP) . |
| 63 317 926 | 12/1988 | (JP) . |
| 63-317926 | 12/1988 | (JP) . |
| 1-109518 | 4/1989 | (JP) . |
| 1-119916 | 5/1989 | (JP) . |
| 1-276422 | 7/1989 | (JP) . |
| 1-220120 | 9/1989 | (JP) . |
| 1-235211 | 9/1989 | (JP) . |
| 1-248318 | 10/1989 | (JP) . |
| 1-300419 | 12/1989 | (JP) . |
| 2-15415 | 1/1990 | (JP) . |
| 2-58727 | 2/1990 | (JP) . |
| 2-98816 | 4/1990 | (JP) . |
| 2-149916 | 6/1990 | (JP) . |
| 2-194063 | 7/1990 | (JP) . |
| 2-208824 | 8/1990 | (JP) . |
| 2 257 424 | 10/1990 | (JP) . |
| 2-257424 | 10/1990 | (JP) . |
| 2-307806 | 12/1990 | (JP) . |
| 3-17817 | 1/1991 | (JP) . |
| 3-5913 | 1/1991 | (JP) . |
| 3-49032 | 3/1991 | (JP) . |
| 3-80422 | 4/1991 | (JP) . |
| 3-88118 | 4/1991 | (JP) . |
| 3-157812 | 7/1991 | (JP) . |
| 3-219424 | 9/1991 | (JP) . |
| 4-271010 | 9/1992 | (JP) . |
| 08-221740 * | 8/1996 | (JP) . |

* cited by examiner

MAGNETIC RECORDING MEDIUM

FIELD OF THE INVENTION

The present invention relates to a coating type high capacity magnetic recording medium (i.e., a high capacity magnetic recording particulate medium) capable of high density recording. More specifically, the present invention relates to a coating type high capacity magnetic recording medium for high density recording which comprises a magnetic layer on a substantially nonmagnetic lower layer wherein the uppermost magnetic layer contains a ferromagnetic metal powder or a hexagonal ferrite powder.

BACKGROUND OF THE INVENTION

In the field of a magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

Also, in the field of a magnetic tape, with the prevalence of an office computer, such as a minicomputer, a personal computer and a work station, a magnetic tape for recording computer data as external storage medium (a so-called backup tape) has been vigorously studied. For the realization of the magnetic tape for such a use, the improvement of recording capacity has been strongly demanded conjoint-ly with the miniaturization of a computer and the increase of information processing ability (e.g., information throughput).

Magnetic layers comprising iron oxide, Co-modified iron oxide, $CrO_2$, a ferromagnetic metal powder, or a hexagonal ferrite powder dispersed in a binder, which are coated on a nonmagnetic support, have been conventionally widely used in magnetic recording media. Ferromagnetic metal powders and hexagonal ferrite powders among these have been known to have excellent high density recording characteristics.

In the case of a disc, as high capacity discs using ferromagnetic metal powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and properties. As is the circumstance, various attempts have been made to improve high density recording characteristics. Some examples thereof are described below.

For improving characteristics of a disc-like magnetic recording medium, JP-A-64-84418 (the term "JP-A" as used herein means an "unexamined published Japanese patent application") proposes the use of a vinyl chloride resin having an acidic group, an epoxy group and a hydroxyl group, JP-B-3-12374 (the term "JP-B" as used herein means an "examined Japanese patent publication") proposes the use of a metal powder having a coercive force Hc of 1,000 Oe or more and a specific surface area of from 25 to 70 m²/g, and JP-B-6-28106 proposes to regulate the specific surface area and magnetic susceptibility of magnetic powders and contain an abrasive.

For improving the durability of a disc-like magnetic recording medium, JP-B-7-85304 proposes the use of a fatty acid ester having an unsaturated fatty acid ester and an ether bond, JP-B-7-70045 proposes the use of a fatty acid ester having a branched fatty acid ester and an ether bond, JP-A-54-124716 proposes the use of a nonmagnetic powder having a Mohs' hardness of 6 or more and a higher fatty acid ester, JP-B-7-89407 proposes to regulate the volume of voids containing a lubricant and the surface roughness to from 0.005 to 0.025 μm, JP-A-61-294637 proposes the use of a fatty acid ester having a low melting point and a fatty acid ester having a high melting point, JP-B-7-36216 proposes the use an abrasive having a particle size of from ¼ to ¾ of the magnetic layer thickness and a fatty acid ester having a low melting point, and JP-A-3-203018 proposes the use of a metallic magnetic powder containing Al and a chromium oxide.

As the constitution of a disc-like magnetic recording medium having a nonmagnetic lower layer and an intermediate layer, JP-A-3-120613 proposes the constitution comprising an electrically conductive layer and a magnetic layer containing a metal powder, JP-A-6-290446 proposes the constitution comprising a magnetic layer having a thickness of 1 μm or less and a nonmagnetic layer, JP-A-62-159337 proposes the constitution comprising an intermediate layer comprising a carbon and a magnetic layer containing a lubricant, and JP-A-5-290358 proposes the constitution comprising a nonmagnetic layer in which the carbon size is regulated.

On the other hand, a disc-like magnetic recording medium comprising a thin magnetic layer and a functional nonmagnetic layer has been developed in recent years and floppy discs of the class with the capacity of 100 MB are now on the market. As floppy discs showing these characteristics, JP-A-5-109061 proposes the constitution comprising a magnetic layer having Hc of 1,400 Oe or more and a thickness of 0.5 μm or less and a nonmagnetic layer containing electrically conductive particles, JP-A-5-197946 proposes the constitution comprising abrasives having particle sizes larger than the thickness of the magnetic layer, JP-A-5-290354 proposes the constitution comprising a magnetic layer having a thickness of 0.5 μm or less and the fluctuation of the thickness of within ±15%, in which the surface electric resistance is regulated, and JP-A-6-68453 proposes the constitution in which two kinds of abrasives having different particle sizes are contained and the amount of the abrasives on the surface is regulated.

Further, in the field of a tape-like magnetic recording medium, with the prevalence of an office computer, such as a minicomputer and a personal computer, a magnetic tape for recording computer data as external storage medium (a so-called backup tape) has been vigorously studied. For the realization of the magnetic tape for such a use, the improvement of recording capacity has been strongly demanded conjointly with the miniaturization of a computer and the increase of information processing capability. In addition, the use in various environmental conditions due to widening of use environments of magnetic tapes (in particular, under fluctuating temperature/humidity conditions), reliability on data storage, and reliability on performance, such as stable recording/readout of data in multiple running due to repeating use at high speed, have been increasingly demanded.

Magnetic tapes which are used in digital signal recording systems vary according to each system, for example, magnetic tapes corresponding to a so-called DLT type, 3480, 3490, 3590, QIC, a D8 type and a DDS type are known. In every system, the magnetic tape comprises, on one surface side of a nonmagnetic support, a magnetic layer of a single layer structure having a comparatively thick layer thickness, e.g., from 2.0 to 3.0 μm, containing a ferromagnetic powder, a binder and an abrasive, and a back coating layer provided on the surface side of the support opposite to the side having the magnetic layer for purposes of preventing winding disarrangement and maintaining good running durability. However, in general, in a magnetic layer of a single layer structure having a comparatively thick layer thickness as described above, there is a problem of thickness loss which generates the reduction of output.

For the improvement of the reduction of reproduction output due to thickness loss, thinning of a magnetic layer has been known. For example, JP-A-5-182178 discloses a magnetic recording medium comprising a nonmagnetic support having thereon a lower nonmagnetic layer containing an inorganic powder dispersed in a binder and an upper magnetic layer containing a ferromagnetic powder dispersed in a binder and having a thickness of 1.0 μm or less, which is coated on the lower nonmagnetic layer while the nonmagnetic layer is still wet.

However, with the rapid trend of the increase of the capacity and density of disc-like and tape-like magnetic recording media, it has become difficult to obtain satisfactory characteristics even with these techniques. It has also become difficult to make the increase of the capacity and density compatible with durability.

An object of the present invention is to provide a magnetic recording medium which is markedly improved in electromagnetic characteristics, particularly, high density recording characteristics and which unites high durability, and in which the error rate in high density recording region is conspicuously improved particularly. Further, an object of the present invention is to provide a high capacity magnetic recording medium, particularly, a disc-like magnetic recording medium having a high recording capacity of from 0.17 to 2 G bit/inch$^2$, preferably from 0.2 to 2 G bit/inch$^2$, and particularly preferably from 0.35 to 2 G bit/inch$^2$.

DISCLOSURE OF THE INVENTION

As a result of earnest studies to provide a high capacity magnetic recording medium which is excellent in electromagnetic characteristics and durability, in particular, markedly improved in the error rate in a high density recording region, the present inventors have found that high capacity, high density recording characteristics and excellent durability of the object of the present invention can be obtained by the magnetic recording medium having the constitution described below, thus the present invention has been attained.

That is, the present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.17 to 2 G bit/inch$^2$, wherein the coercive force of the magnetic layer is 1,800 Oe or more, the average long axis length of the above ferromagnetic metal powder is 0.15 μm or less, and the average particle size of the above ferromagnetic hexagonal ferrite powder is 0.10 μm or less, or the present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.17 to 2 G bit/inch$^2$, wherein the dry thickness of the magnetic layer is from 0.05 to 0.30 μm, φm is from $10.0 \times 10^{-3}$ to $1.0 \times 10^{-3}$ emu/cm$^2$, and the coercive force of the magnetic layer is 1,800 Oe or more. The magnetic layer preferably has a dry thickness of from 0.05 to 0.25 μm and φm of preferably from $8.0 \times 10^{-3}$ to $1.0 \times 10^{-3}$ emu/cm$^2$, and the magnetic recording medium of the present invention is a magnetic recording medium for recording signals having areal recording density of preferably from 0.20 to 2 G bit/inch$^2$. The present inventors have found that the magnetic recording medium having high capacity, excellent high density characteristics and excellent durability, in which, in particular, the error rate in high density recording region has been markedly improved, which could not be obtained by conventional techniques, could be obtained by adopting the constitution of the present invention.

The term "a substantially nonmagnetic lower layer" in the present invention means a lower layer which may have a magnetic property but not too much for participating in recording, and hereinafter is referred to simply as "a lower layer" or "a nonmagnetic layer". When a magnetic powder is contained in the lower layer, the content is preferably less than ½ of the content of the inorganic powder.

Areal recording density is a value obtained by multiplying linear recording density by track density.

φm is the amount of magnetic moment (emu/cm$^2$) which can be directly measured from the magnetic layer per unit area of one side using a vibrating sample magnetometer (VSM, a product of Toei Kogyo Co., Ltd.) at Hm 10 KOe, which is equal to the value obtained by multiplying magnetic flux density (Bm) obtained using VSM (unit G=4 πemu/cm$^3$) by the thickness (cm). Accordingly, the unit of φm is represented by emu/cm$^2$ or G·cm.

Linear recording density means the bit number of signals recorded per 1 inch in the recording direction.

These linear recording density, track density and areal recording density are values determined by each system.

That is, the present inventors have elaborated some means in an attempt to improve the magnetic layer thickness, the coercive force (Hc) and the central plane average surface roughness as to the linear recording density, and the optimization of the φm as to the track density for the improvement of the areal recording density.

Preferred embodiments of the present invention are described below.

As for the Magnetic Recording Medium as a Whole:
(1) In the above magnetic recording medium, the magnetic layer has a central plane average surface roughness of preferably 5.0 nm or less, more preferably 4.0 nm or less measured by 3D-MIRAU method.
(2) In the above magnetic recording medium, the magnetic layer has a coercive force of 2,100 Oe or more, and the ferromagnetic metal powder has an average long axis length of 0.12 μm or less or the ferromagnetic hexagonal ferrite powder has an average particle size of 0.10 μm or less.
(3) The above magnetic recording medium is a magnetic recording medium for recording signals having areal recording density of from 0.20 to 2 G bit/inch$^2$.
(4) The above magnetic recording medium is a magnetic recording medium for a system of a high transfer rate for 1.0 MB/sec. or more.
(5) The above magnetic recording medium is a magnetic recording medium for a high capacity floppy disc system of disc rotation speed of 2,000 rpm or more.

As for the Improvement of the Magnetic Powder:
(1) In the above magnetic recording medium, the ferromagnetic metal powder comprises Fe as a main component, has an average long axis length of from 0.12 µm or less, and an acicular ratio of from 3.0 to 9.0, preferably from 4.0 to 9.0.
(2) In the above magnetic recording medium, the ferromagnetic metal powder comprises Fe as a main component, has an average long axis length of 0.10 µm or less, and a crystallite size of from 80 to 180 Å.

As for the Improvement of the Support:
(1) In the above magnetic recording medium, the support has a central plane average surface roughness of preferably 5.0 nm or less, more preferably 4.0 nm or less.
(2) In the above magnetic recording medium, the support has a thermal shrinkage factor of 0.5% or less both at 100° C. for 30 minutes and at 80° C. for 30 minutes in every direction of in-plane of the support.
(3) In the above magnetic recording medium, the support has a temperature expansion coefficient of from $10^{-4}$ to $10^{-8}$/° C. in every direction of in-plane of the support.
(4) In the above magnetic recording medium, the support comprises polyethylene terephthalate or polyamide.

As for the Improvement of Lubricants:
(1) In the above magnetic recording medium, the lower layer and/or the magnetic layer contain(s) at least three kinds in total of a fatty acid and/or a fatty acid ester.
(2) In the above magnetic recording medium, the fatty acid and the fatty acid ester have the same fatty acid residues with each other.
(3) In the above magnetic recording medium, the fatty acid contains at least a saturated fatty acid and the fatty acid ester contains at least a saturated fatty acid ester or an unsaturated fatty acid ester.
(4) In the above magnetic recording medium, the fatty acid ester contains a monoester and a diester.
(5) In the above magnetic recording medium, the fatty acid ester contains a saturated fatty acid ester and an unsaturated fatty acid ester.
(6) In the above magnetic recording medium, the surface of the magnetic layer has preferably a C/Fe peak ratio of from 5 to 120, more preferably from 5 to 100, when the surface is measured by the Auger electron spectroscopy.

As for the Improvement of the Nonmagnetic Powder for the Lower Layer:
(1) In the above magnetic recording medium, the lower layer contains a carbon black having a particle size of from 5 to 80 nm and the magnetic layer contains a carbon black having a particle size of from 5 to 300 nm.
(2) In the above magnetic recording medium, the lower layer contains a carbon black having an average particle size of from 5 to 80 nm and a carbon black having an average particle size of larger than 80 nm.
(3) In the above magnetic recording medium, the lower layer and the magnetic layer each contains a carbon black having an average particle size of from 5 to 80 nm.
(4) In the above magnetic recording medium, the lower layer contains an acicular inorganic powder having an average long axis length of 0.20 µm or less and an acicular ratio of from 4.0 or 9.0.
(5) In the above magnetic recording medium, the lower layer contains an acicular inorganic powder and the magnetic layer contains an acicular ferromagnetic metal powder, and the average long axis length of the acicular inorganic powder is from 1.1 to 3.0 times the average long axis length of the acicular ferromagnetic metal powder.
(6) In the above magnetic recording medium, the lower layer and/or the magnetic layer contain(s) a phosphorus compound and the lower layer contains an acicular or spherical inorganic powder.

As for the Improvement of the Abrasive for the Magnetic Layer:
(1) In the above magnetic recording medium, the magnetic layer contains at least an abrasive having an average particle size of from 0.01 to 0.30 µm.
(2) In the above magnetic recording medium, the magnetic layer contains at least a diamond particle having an average particle size of 2.0 µm or less, preferably from 0.01 to 1.0 µm.
(3) In the above magnetic recording medium, the magnetic layer contains two kinds of abrasives having a Mohs' hardness of 9 or more.
(4) In the above magnetic recording medium, the magnetic layer contains an α-alumina and a diamond particle.

As for the Improvement of the Binder:
(1) In the above magnetic recording medium, the lower layer and/or the magnetic layer contain(s) at least a polyurethane having a glass transition temperature of preferably from 0° C. to 100° C., more preferably from 30 to 100° C.
(2) In the above magnetic recording medium, the lower layer and/or the magnetic layer contain(s) at least a polyurethane having a breaking stress of from 0.05 to 10 kg/mm².

As for the Improvement of the Magnetic Recording Medium as a Whole:
(1) In the above magnetic recording medium, the magnetic layer has a dry thickness of from 0.05 to 0.20 µm and the magnetic layer contains an abrasive having an average particle size of 0.4 µm or less.
(2) The above magnetic recording medium is a magnetic recording medium for recording signals having areal recording density of from 0.35 to 2 G bit/inch².
(3) The above magnetic recording medium is a magnetic recording medium for a high capacity floppy disc system for disc rotation speed of 3,000 rpm or more.
(4) The above magnetic recording medium is a magnetic recording medium for a system for a high transfer rate of 2.0 MB/sec. or more.
(5) The above magnetic recording medium is a magnetic recording medium which has realized subordination transposition capable of recording/reproduction with conventional 3.5 inch type floppy discs.
(6) The above magnetic recording medium is a magnetic recording medium for a high capacity floppy disc system adopting a dual discrete gap head having both a narrow gap for high density recording and a broad gap for conventional 3.5 inch type floppy discs.
(7) The above magnetic recording medium is a magnetic recording medium for a high capacity floppy disc system adopting a head which floats by disc rotation.
(8) The above magnetic recording medium is a magnetic recording medium for a high capacity floppy disc system adopting a head which floats by disc rotation and, at the same time, a linear type voice coil motor as a driving motor of the head.

The present inventors have found that a magnetic recording medium, in particular, a disc-like magnetic recording medium, in the recording capacity system of areal recording density of from 0.17 to 2 G bit/inch², having excellent high density characteristics and excellent durability, in particular, markedly improved error rate in high density recording region, which could not be obtained by conventional techniques, could be obtained by adopting the above constitution of the present invention.

A magnetic recording medium, in particular, a disc-like magnetic recording medium, having high density characteristics and high durability in the recording capacity system of areal recording density of from 0.17 to 2 G bit/inch$^2$, preferably from 0.2 to 2 G bit/inch$^2$, more preferably from 0.35 to 2 G bit/inch$^2$, which could never be achieved by any magnetic recording particulate media known in the world, can be obtained as a result of organically combining and synthesizing the points as shown below.

The points aimed at in the present invention include (1) high Hc and hyper-smoothing, (2) ensuring of durability by the improvement of a composite lubricant, a binder with high durability and a ferromagnetic powder, and the use of an abrasive with high hardness (3) ultra-thinning of the magnetic layer and the reduction of fluctuation in the interface between the magnetic layer and the lower layer, (4) the increase of packing density of powders (a ferromagnetic powder and a nonmagnetic powder), (5) ultra-fine granulation of powders (a ferromagnetic powder and a nonmagnetic powder), (6) stabilization of head touch, (7) dimensional stability and servomechanism, (8) improvement of thermal shrinkage factors of the magnetic layer and the support, and (9) the functions of a lubricant at high temperature and low temperature, and the present invention has been achieved by combining and synthesizing these points.

The above item (1) high Hc and hyper-smoothing are described in the first place. Hc of the magnetic layer can be increased to 1,800 Oe or more, preferably 2,100 Oe or more, by using a ferromagnetic powder with high Hc, thereby high capacity and high density can be obtained. With respect to hyper-smoothing, a smooth magnetic layer can be obtained by making the central plane average surface roughness of the support preferably 4.0 nm or less, and employing ATOMM® constitution. High capacity and high density can be attained by making the central plane average surface roughness of the magnetic layer preferably 4.0 nm or less. Subsequently, the above item (2) ensuring of durability by the improvement of a composite lubricant, a binder with high durability and a ferromagnetic powder, and the use of an abrasive with high hardness is described. With respect to a composite lubricant, fundamental concepts for the enhancement of lubrication capability are shown below.

(1) A plurality of lubricants having different functions and capabilities are used in combination.
(2) A plurality of lubricants having similar functions and capabilities are used in combination.

Due to the above item (1), a variety of functions and capabilities can be attained under various conditions. Further, due to the above item (2), affinity and compatibility of lubricants with each other can be ensured and good functions of lubricants can be exhibited.

Examples of combinations of a plurality of lubricants having different functions and capabilities as in the above item (1) are shown below.

1) A lubricant having a fluid lubrication function and a lubricant having a boundary lubrication function are used in combination.
2) A polar lubricant and a nonpolar lubricant are used in combination.
3) A liquid lubricant and a solid lubricant are used in combination.
4) Lubricants having different polarities, in particular, a fatty acid and/or a fatty acid ester, are used in combination. For example, a fatty acid monoester and a fatty acid diester are used in combination.
5) Lubricants having different melting points and different boiling points, in particular, a fatty acid and/or a fatty acid ester, are used in combination.
6) Lubricants which differ in lengths of carbon atom number, in particular, a fatty acid and/or a fatty acid ester, are used in combination.
7) A straight chain lubricant and a branched chain lubricant, in particular, a fatty acid and/or a fatty acid ester, are used in combination. For example, a straight chain fatty acid ester and a branched fatty acid ester are used in combination.
8) A lubricant having a saturated carbon chain and a lubricant having an unsaturated carbon chain, in particular, a fatty acid and/or a fatty acid ester, are used in combination. For example, a saturated fatty acid ester and an unsaturated fatty acid ester are used in combination.
9) Lubricants having different affinities with a binder are used in combination.
10) Lubricants having different affinities with an inorganic powder are used in combination.

By the combined use of lubricants as in the above item (1), a variety of functions and capabilities can be attained under various conditions.

Examples of combinations of a plurality of lubricants having similar functions and capabilities as in the above item (2) are shown below.

1) Fatty acid residues of a fatty acid and a fatty acid ester are made the same with each other.
2) Fatty acid esters having the same fatty acid residues with each other and/or having the same alcohol residues with each other are used in combination.
3) Two or more saturated fatty acids are used in combination.
4) Saturated fatty acids are respectively used in the fatty acid residue parts of a fatty acid and a fatty acid ester.
5) Unsaturated fatty acids are respectively used in the fatty acid residue parts of a fatty acid and a fatty acid ester.
6) Three or more fatty acid esters alone are used in combination.
7) Fatty acid parts of a fatty acid and a fatty acid amide are made the same with each other.

By the combined use of lubricants as in the above item (2), affinity and compatibility of lubricants with each other can be ensured and good functions of lubricants can be exhibited.

By the combined use of lubricants as in the above items (1) and (2), not only a variety of functions and capabilities can be attained under various conditions but also affinity and compatibility of lubricants with each other can be ensured and good functions of lubricants can be exhibited.

The binder with high durability is described below. By the incorporation of a resin having a polar group, in particular, a polyurethane resin, having high dispersibility, high glass transition temperature and high breaking stress, durability of the binder can be improved. It is preferred for the polyurethane resin to have 2 or more OH groups, more preferably 3 or more, and most preferably 4 or more, at the terminals of the molecule because the reactivity with polyisocyanate, which is a polyfunctional curing agent, becomes high and the coated film of three dimensional network can be formed after curing by the polyhydroxylation of the polyurethane resin. With respect to the improvement of the ferromagnetic powder, durability can be improved by increasing the Al component which can heighten the hardness of the ferromagnetic powder. Ensuring of durability by using an abrasive having high hardness is described below. Higher durability can be obtained by the combined use of a diamond fine particle having a Mohs' hardness of 10 with conventionally used abrasives having a Mohs' hardness of about 9, e.g., an α-alumina. Next, ultra-thinning of the magnetic layer and the reduction of fluctuation in the interface between the magnetic layer and the lower layer in the above item (3) is described. By reducing the thickness of the magnetic layer to preferably from 0.05 to 0.30 μm, more preferably from 0.05 to 0.25 μm. and reducing the fluctuation in the interface between the magnetic layer and the lower layer, uniform, smooth and thin magnetic layer can be obtained, thereby higher capacity and higher density of the magnetic recording medium can be attained. The increase of the packing density of powders (a ferromagnetic powder and a nonmagnetic powder) in the above item (4) is described. By packing at high density a fine ferromagnetic powder, specifically, a fine ferromagnetic metal powder, preferably having an average long axis length of 0.15 μm or less, more preferably 0.12 μm or less, and a fine ferromagnetic hexagonal ferrite powder having an average particle size of 0.10 μm or less, high φm can be obtained thereby higher capacity and higher density of the magnetic recording medium can be attained. Durability can be improved by packing at high density an inorganic powder. Ultra-fine granulation of powders (a ferromagnetic powder and a nonmagnetic powder) in the above item (5) is described. By the use of a fine ferromagnetic powder, specifically a fine ferromagnetic metal powder having an average long axis length of preferably 0.15 μm or less, more preferably 0.12 μm or less, and a fine ferromagnetic hexagonal ferrite powder having an average particle size of 0.10 μm or less, in particular, with the case of a ferromagnetic metal powder, by the ultra-fine granulation of the powder such as an average long axis length of 0.10 μm or less, an acicular ratio of from 4.0 to 9.0, and a crystallite size of from 80 Å to 180 Å, higher packing density and hyper-smoothing of the magnetic layer can be attained, thereby higher capacity and higher density of the magnetic recording medium can be attained. Stabilization of head touch in the above item (6) is described. Stabilization of head touch can be contrived by an appropriate strength, flexibility and smoothness of the magnetic recording medium as a whole, thereby higher capacity and higher density of the magnetic recording medium can be attained stably even at high speed running and high rotation rate. Dimensional stability and servomechanism in the above item (7) is described. For example, when the support has a thermal shrinkage factor of 0.5% or less both at 100° C. for 30 minutes and at 80° C. for 30 minutes in every direction of in-plane of the support, and a temperature expansion coefficient of from $10^{-4}$ to $10^{-8}$/° C. in every direction of in-plane of the support, dimensional stability of the support can be obtained, thereby higher capacity and higher density of the magnetic recording medium can be attained stably even at high speed running and high rotation rate, and improvement of thermal shrinkage factors of the magnetic layer and the support in the above item (8) can also achieved. With respect to the functions of a lubricant at high temperature and low temperature in the above item (9), desired lubricating functions at both high temperature and low temperature can be obtained by selecting and combining various lubricants described above based on specific concepts.

In the field of personal computers where the tendency of multimedia has been increasingly progressed, high capacity recording media have attracted public attentions in place of conventional floppy discs and, for example, ZIP disc, has been on sale from IOMEGA CORP., U.S.A. This is a recording medium comprising a lower layer and a magnetic thin layer developed by the present inventors using ATOMM® (Advanced Super Thin Layer & High Output Metal Media Technology), and products of 3.7 inches with the recording capacity of 100 MB or more are on the market. The capacity of from 100 to 120 MB discs is almost equal to the capacity of MO (3.5 inches), i.e., one disc has the capacity of recording newspaper articles of from seven to eight month period. A transfer rate indicating write/readout time of data is 2 MB or more per a second, which is equal to a hard disc, and the working speed is 20 times of conventional floppy discs and more than 2 times of the MO, therefore, extremely advantageous. In addition, as this recording medium comprising a lower layer and a magnetic thin layer is the same coating type medium as floppy discs used at present, mass production is feasible, accordingly inexpensive as compared with hard discs and the MO.

As a result of eager investigations based on the knowledge on these media, the present inventors have achieved the present invention of a magnetic recording medium, in particular, a disc-like magnetic recording medium, in the recording capacity system of areal recording density of from 0.17 to 2 G bit/inch$^2$, preferably from 0.2 to 2 G bit/inch$^2$, more preferably from 0.35 to 2 G bit/inch$^2$, and φm of preferably from $10.0 \times 10^{-3}$ to $1.0 \times 10^{-3}$ emu/cm$^2$, particularly preferably from $8.0 \times 10^{-3}$ to $1.0 \times 10^{-3}$ emu/cm$^2$, which has markedly high recording capacity as compared with the above ZIP disc and the MO (3.5 inches). This recording medium also has high capacity, high density characteristics and excellent durability which could never be achieved by any products known in the world and, in particular, the error rate in high density recording region is noticeably improved, and this is the invention applicable to a magnetic tape, e.g., a computer tape.

The magnetic recording medium of the present invention comprises an ultra-thin magnetic layer containing a magnetic powder of ultra-fine particles excellent in high output and high dispersibility, and a lower layer containing a spherical or acicular inorganic powder, and by thus reducing the thickness of the magnetic layer, a magnetic force offset in the magnetic layer can be reduced, the output in a high frequency region can be markedly increased and, further, overwriting characteristics can be improved. By the improvement of a magnetic head, the effect of the ultra-thin magnetic layer can be further exhibited by the combined use with a narrow gap head and a magneto resistance head (an MR head), and digital recording characteristics can be improved.

The upper magnetic layer is a thin layer having a thickness of preferably from 0.05 to 0.30 μm, more preferably from 0.05 to 0.25 μm, so as to match the performance required from the magnetic recording system and the magnetic head of high density recording. Such a uniform and ultra-thin magnetic layer is attained by high dispersion and high packing density realized by the combined use of a fine magnetic powder and nonmagnetic powder with a dispersant and a high dispersible binder. The magnetic powders used are preferably magnetic powders capable of achieving high output, excellent in high dispersibility and high randamizing property for inducing suitabilities of high capacity floppy discs and computer tapes as far as possible. That is, high output and high durability can be attained by the use of ferromagnetic metal powders of extremely fine particles which are capable of achieving high output having an average long axis length of preferably 0.15 μm or less, more preferably 0.12 μm or less, or ferromagnetic hexagonal ferrite powders having an average particle size of 0.10 μm or less, in particular, by the use of ferromagnetic metal powders having a long axis length of 0.1 μm or less and a crystallite size of from 80 to 180 Å, containing a large amount of Co, and further Al, Si, Y and Nd as a sintering preventing agent. For the realization of a high transfer rate, running stability and durability during high speed rotation can be ensured making use of a three dimensional network binder system suitable for an ultra-thin magnetic layer. A composite lubricant capable of maintaining the effect thereof during use under various temperature and humidity conditions and in high rotation use can be incorporated into upper and lower layers and, further, with making the lower layer have a role of the tank of the lubricant so as to be able to always supply an appropriate amount of the lubricant to the upper magnetic layer to thereby heighten the durability of the upper magnetic layer to improve the reliance. Cushioning effect of the lower layer can bring about good head touch and stable running property.

A high transfer rate is required in a high capacity recording system, e.g., a transfer rate of 1.4 MB/sec. in Zip and a maximum transfer rate of 3.6 MB/sec. in HiFD®. For that sake, it is necessary that the rotation speed of a magnetic disc for a high capacity recording system should be taken up one or more places as compared with conventional FD systems. Specifically, the rotation speed of a magnetic disc is preferably 1,800 rpm or more, more preferably 3,000 rpm or more. For example, the rotation speed of a magnetic disc is 2,968 rpm in Zip and 3,600 rpm in HiFD®. In other systems, it is estimated that the rotation speed of a magnetic disc is 5,400 rpm and the transfer rate is 7.5 MB/sec when a recording capacity is 650 MB (0.65 GB). Recording track density is improved with the increase of capacity/density of magnetic recording. In general, a servo recording area is provided on a medium to ensure traceability of a magnetic head against a recording track. In the magnetic recording medium according to the present invention, a base whose dimensional stability is isotropically heightened is preferably used as the support base, thereby further stabilization of the traceability is devised. The smoothness of the magnetic layer can be further improved by using a hyper-smooth base.

The increment of density of magnetic recording of a disc-like magnetic recording medium requires the improvement of linear recording density and track density. Characteristics of a support are important factors for the improvement of track density. The dimensional stability of a support base, in particular, isotropy, is considered in the recording medium according to the present invention. Servo recording is an indispensable technique in recording/reproduction of high track density, but the improvement can be contrived from the medium side by making the support base isotropic as far emcee as possible.

Advantages of changing the magnetic layer of the present invention from a monolayer (i.e., a single layer) to the ATOMM® constitution are thought to be as follows.
(1) Improvement of electromagnetic characteristics by the thin layer structure of the magnetic layer;
(2) Improvement of durability by stable supply of lubricants;
(3) High output by smoothing the upper magnetic layer; and
(4) Easiness of imparting required functions by functional separation of the magnetic layer.

These functions cannot be sufficiently attained only by making the magnetic layer a multilayer structure. For constituting a multilayer structure, a successive multilayer system comprising successively constituting the layers is generally used. In this system, the lower layer is coated, cured or dried, then the upper magnetic layer is coated in the same way, cured, and surface-treated. In the case of a floppy disc (FD), as different from a magnetic tape, the same treatments are conducted on both surface sides. After a coating step, a disc undergoes a slitting step, a punching step, a shell incorporation step, and a certifying step, thus a final product is completed. Simultaneous coating or successive coating of coating the upper magnetic layer while the lower layer is still wet is preferred in view of the productivity.

Electromagnetic characteristics can be widely improved by the thin layer structure of the magnetic layer as follows.
(1) Improvement of the output in a high frequency region by the improvement of characteristics of recording demagnetization;
(2) Improvement-of overwriting characteristics; and
(3) Security of window margin.

Durability is an important factor for a magnetic recording disc. In particular, for realizing a high transfer rate, it is necessary that the rotation speed of a magnetic disc should be taken up one or more places as compared with conventional FD systems, and security of the durability of a magnetic disc is an important problem when the magnetic disc is sliding with a magnetic head and parts in a cartridge at a high speed. For improving durability of a disc, there are means such as a binder formulation to increase the film strength-of a disc per se, and a lubricant formulation to maintain a sliding property of a disc with a magnetic head. In the magnetic recording medium according to the present invention, a three dimensional network binder system which has shown actual results in conventional FD systems is used in the binder formulation by being modified.

In the present invention, lubricants are used in combination of a plurality of kinds respectively exhibiting superior effects in various temperature and humidity conditions under which they are used, and each lubricant exhibits its function in different temperature (low temperature, room temperature, high temperature) and humidity (low humidity, high humidity) atmospheres, thereby totally stable lubrication effect can be maintained.

By using two layer structure, the durability of the upper magnetic layer can be heightened with making the lower layer have a role of the tank of a lubricant capable of always supplying an appropriate amount of a lubricant to the upper magnetic layer. There is a limit on the amount of a lubricant which can be contained in the ultra-thin magnetic layer. Simple reduction of the thickness of the magnetic layer causes the reduction of the absolute amount of a lubricant, and it follows that running durability is deteriorated. In this case, it was difficult to well balance the thickness of the magnetic layer with the amount of the lubricant. The improvement of electromagnetic characteristics could be compatible with the improvement of durability by imparting different functions to the upper layer and the lower layer and making up for each other. This functional separation was particularly effective in a system where a medium was slid on a magnetic head at a high speed.

In addition to the maintaining function of a lubricant, a controlling function of surface electrical resistance can be imparted to the lower layer. For controlling electrical resistance, in general, a solid electrically conductive material such as a carbon black is added to a magnetic layer in many cases. Such a material not only restricts the increase of the packing density of magnetic powders but also influences the surface roughness of the magnetic layer as the thickness of the magnetic layer becomes thinner. Incorporation of electrically conductive materials in the lower layer can eliminate these defects.

With the progress of multimedia in society, needs for image recording have been increased more and more not only in the industry but also in general homes. The high capacity magnetic recording medium of the present invention has capabilities capable of sufficiently responding to demands such as function/cost as a medium for recording images, as well as data such as letters and figures. The high capacity magnetic recording medium according to the present invention is based on the coating type magnetic recording medium which has shown actual results and ensures reliability for a long period of time and is excellent in cost performance.

The present invention has been attained for the first time by heaping up the above various factors, and making them worked synergistically and organically. The thus-obtained magnetic recording medium by adopting or rejecting and combining every technique has capability applicable to, e.g., HiFD®, which has been developed by joint development by Fuji Photo Film Co., Ltd. with Sony Corp. HiFD® has been developed to meet the demand for a new data recording system of high performance having high capacity and high data transfer rate with the rapid development of information processing capability of personal computers in recent years and sharp increase of throughput to be dealt with. On the other hand, 3.5 inch type floppy discs of the present have prevailed worldwide as easily usable recording media. HiFD® has been developed as a new system which can read out and reuse accumulated massive data using these discs even after this. HiFD® for 3.5 inch type floppy disc is a high capacity floppy disc system of the next generation which has high capacity of 200 MB, high transfer rate of 3.6 MB/sec, and capable of realizing subordination transposition capable of recording/reproduction with 3.5 inch type floppy discs of the present. High capacity of 200 MB of HiFD® has been realized by an ultra-thin layer coating type metal (particulate) disc newly developed and by the adoption of a dual discrete gap head having both a narrow gap for high density recording and a broad gap for a 3.5 inch type floppy disc of the present, which can easily process data file of huge volume such as an image and a sound. HiFD® has realized a high transfer rate of a maximum of 3.6 MB/sec. as compared with a transfer rate of 0.06 MB/sec. of conventional 3.5 inch type floppy discs (2HD) due to high linear recording density and high speed disc rotation such as 3,600 rpm, which is high speed processing of about 60 times as compared with conventional systems. Further, by the adoption of a floatation type dual discrete gap head and, at the same time, by the use of a linear type voice coil motor as a driving motor of the head, HiFD® has achieved high speed random access of about 3 to 4 times as compared with conventional 3.5 inch type floppy disc drives. The floatation type dual discrete gap head, similar to a hard disc, floats by disc rotation and does not contact with the disc during recording/reproduction leading to long lifetime and high reliability. In addition, by the dual discrete gap head, subordination transposition capable of recording/reproduction with 3.5 inch type floppy discs of the present has been realized. Further, abrasion of a disc can be reduced by the integration of a new mechanism capable of soft head loading, and high reliability can be attained by the loading of an error correcting function. The magnetic recording medium according to the present invention has been developed to be applicable to such a high capacity floppy disc system of the next generation which has high capacity of 200 MB, high transfer rate of 3.6 MB/sec, and has realized subordination transposition capable of recording/reproduction with 3.5 inch type floppy discs of the present.

PRACTICAL EMBODIMENT OF THE INVENTION

Magnetic Layer

The lower layer and the ultrathin magnetic layer of the magnetic recording medium according to the present invention may be provided on either one side of the support or may be provided on both sides. The upper magnetic layer may be coated while the lower layer coated is still wet (W/W coating) or may be coated after the lower layer coated is dried (W/D coating). Simultaneous or successive wet on wet coating is preferred in view of the productivity but in the case of a disc-like medium, wet on dry coating can be sufficiently used. In the multilayer construction according to the present invention, as the upper layer and the lower layer can be formed simultaneously or successively (with W/W coating), a surface treatment step, e.g., a calendering step, can be utilized effectively and surface roughness of the upper magnetic layer can be improved even the layer is an ultrathin layer. The coercive force (Hc) of the magnetic layer is essential to be 1,800 Oe or more, and the maximum magnetic flux density (Bm) of magnetic metal powders is preferably from 2,000 to 5,000 G and of barium ferrite powders is from 1,000 to 3,000 G.

Ferromagnetic Metal Powder

The ferromagnetic powders which can be used in the present invention are preferably ferromagnetic alloy powders containing α-Fe as a main component. These ferromagnetic powders which can be preferably used in the upper magnetic layer of the present invention may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and more preferably at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 15 atomic %, more preferably from 3 to 12 atomic %, and most preferably from 4 to 9 atomic %, and the content of Al is preferably from 1.5 to 30 atomic %, more preferably from 3 to 20 atomic %, and most preferably from 4 to 14 atomic %, each based on Fe. These ferromagnetic powders may be previously treated with the later described dispersant, lubricant, surfactant, and antistatic agent before dispersion. Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014.

Ferromagnetic alloy powders may contain a small amount of a hydroxide or an oxide. Ferromagnetic alloy powders can be prepared by well-known methods, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium borohydride, hypophosphite, or hydrazine, to conduct reduction; and a method comprising evaporating a metal in a low pressure inert gas to obtain a fine powder. The thus-obtained ferromagnetic alloy powders which are subjected to wellknown gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic powders which can be preferably used in the magnetic layer according to the present invention have a specific surface area ($S_{BET}$) as measured by the BET method of from 40 to 80 m$^2$/g, preferably from 45 to 70 m$^2$/g. When $S_{BET}$ is less than 40 m$^2$/g, noise increases and when more than 80 m$^2$/g, good surface property is obtained with difficulty, which is not preferred. Ferromagnetic powders which can be preferably used in the magnetic layer according to the present invention have a crystallite size of generally from 80 to 180 Å, preferably from 100 to 180 Å, and more preferably from 110 to 175 Å. The long axis length of the ferromagnetic powders is generally from 0.01 to 0.25 μm, preferably from 0.03 to 0.15 μm, and more preferably from 0.03 to 0.12 μm. Ferromagnetic powders preferably have an acicular ratio of from 3.0 to 15.0, more preferably from 3.0 to 12.0, and particularly preferably from 3.0 to 9.0. Ferromagnetic metal powders have a saturation magnetization ($\sigma_s$) of generally from 100 to 180 emu/g, preferably from 110 to 170 emu/g, and more preferably from 125 to 160 emu/g. Ferromagnetic metal powders have a coercive force (Hc) of preferably from 1,700 to 3,500 Oe, and more preferably from 1,800 to 3,000 Oe.

Ferromagnetic metal powders preferably have a water content of from 0.01 to 2%. The water content of ferromagnetic metal powders is preferably optimized by selecting the kinds of binders. The pH of ferromagnetic metal powders is preferably optimized by the combination with the binder to be used. The pH range is from 4 to 12, preferably from 6 to 10. Ferromagnetic metal powders may be surface-treated with Al, Si, P or oxides thereof, if necessary. The amount thereof is from 0.1 to 10% based on the ferromagnetic metal powders. Adsorption of a lubricant, e.g., fatty acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic metal powders. It is preferred substantially not to contain such soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The shape of ferromagnetic metal powders is not particularly limited, and any shape such as an acicular shape, an ellipsoidal shape or a spindle shape may be used so long as it satisfies the above-described properties as to particle sizes. Switching Field Distribution (SFD) of a ferromagnetic metal powder itself is preferably small, preferably 0.8 or less. It is necessary to make Hc distribution of ferromagnetic metal powders narrow. When the SFD is 0.8 or less, electromagnetic characteristics are excellent, high output can be obtained, reversal of magnetization becomes sharp and peak shift is less, which is therefore, suitable for high density digital magnetic recording. For achieving small Hc distribution, making particle size distribution of goethite in ferromagnetic metal powders good and preventing sintering are effective methods.

Hexagonal Ferrite Powder

Examples of hexagonal ferrite which can be preferably used in the upper(most) magnetic layer in the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase, etc., are exemplified. Hexagonal ferrite powders may contain, in addition to the prescribed atoms, the following atoms, e.g., Al, Si, S, Sc, Ti, V, Cr. Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, those containing the following elements can be used, e.g., Co—Zn, Co—Ti, Co—Ti—Zr, Co—Ti—Zn, Ni—Ti—Zn, Nb—Zn—Co, Sb—Zn—Co, Nb—Zn, etc. According to starting materials and producing processes, specific impurities may be contained. The hexagonal ferrite has an average hexagonal tabular diameter of from 10 to 200 nm, preferably from 10 to 100 nm, and particularly preferably from 10 to 80 nm.

When reproduction is conducted using a magneto resistance head for increasing track density, it is necessary to reduce noise, accordingly the average tabular diameter is preferably 40 nm or less, but if it is smaller than 10 nm, stable magnetization cannot be obtained due to thermal fluctuation. While when it is more than 200 nm, noise increases, therefore, both of such particle diameters are not suitable for high density recording. A tabular ratio (tabular diameter/tabular thickness) is preferably from 1 to 15, more preferably from 1 to 7. If a tabular ratio is small, the packing density in a magnetic layer becomes high, which is preferred but satisfactory orientation cannot be obtained. If a tabular ratio is more than 15, noise increases due to stacking among particles. The specific surface area ($S_{BET}$) measured by the BET method of the particles having diameters within this range is from 10 to 200 m$^2$/g. Specific surface areas nearly coincide with the values obtained by arithmetic operations from tabular diameters and tabular thicknesses. Distribution of tabular diameter/tabular thickness is generally preferably as narrow as possible. It is difficult to show specific surface area distributions in numerical values but distributions can be compared by measuring TEM photographs of 500 particles selected randomly. Distributions are in many cases not regular distribution, but when expressed by the standard deviation to the average diameter from calculation, σ/average diameter is from 0.1 to 2.0. For obtaining narrow particle size distribution, it is efficient to make a particle forming reaction system homogeneous as far as possible, and particles formed are subjected to distribution-improving treatments as well. For example, a method of selectively dissolving ultrafine particles in an acid solution is also known. Coercive force (Hc) of generally from about 500 to about 5,000 Oe measured in magnetic powders can be produced. Higher Hc is advantageous for high density recording but it is restricted by capacities of recording heads. The magnetic powders according to the present invention have Hc of from about 1,700 to about 4,000 Oe, preferably from 1,800 to 3,500 Oe. When saturation magnetization of the head is more than 1.4 tesla, Hc of 2,000 Oe or more is preferred. Hc can be controlled by particle diameters (tabular diameter/tabular thickness), kinds and amounts of elements contained, substitution sites of elements, and reaction conditions of particle formation. Saturation magnetization ($\sigma_s$) is from 40 to 80 emu/g. $\sigma_s$ is preferably higher but it has inclination of becoming smaller as particles become finer. For the improvement of $\sigma_s$, it is well known to make composite of magnetoplumbite ferrite with spinel ferrite, to select kinds and amounts of elements to be contained, or W type hexagonal ferrite can also be used. Further, when magnetic powders are dispersed, particle surfaces of magnetic powders may be treated with substances compatible with the dispersion media and the polymers. Inorganic or organic compounds are used as a surface treating agent. For example, oxides or hydroxides of Si, Al, P, etc., various kinds of silane coupling agents, and various kinds of titanium coupling agents are representative examples. The amount of these surface treating agents is from 0.1 to 10% based on the amount of the magnetic powder. The pH of magnetic powders is also important for dispersion, and is in general from 4 to 12. The optimal value is dependent upon the dispersion medium and the polymer. Taking chemical stability and storage stability of magnetic media into consideration, pH of from 6 to 11 or so is selected. The water content in the magnetic powder also affects dispersion. The optimal value is dependent upon the dispersion medium and the polymer, and the water content of from 0.01 to 2.0% is selected in general. Producing methods of hexagonal ferrite include the following and any of these methods can be used in the present invention: (1) a glass crystallization method in which metal oxides which substitute barium oxide, iron oxide and iron, and boron oxide, etc., as a glass forming material are mixed so as to make a desired ferrite composition, melted, and then quenched to obtain an amorphous product, the obtained product is reheat-treated, washed and then pulverized to obtain a barium ferrite crystal powder, (2) a hydrothermal reaction method in which a solution of barium ferrite composition metal salts is neutralized with an alkali, byproducts are removed followed by liquid phase heating at 100° C. or more, washed, dried and then pulverized to obtain a barium ferrite crystal powder, and (3) a coprecipitation method in which a solution of barium ferrite composition metal salts is neutralized with an alkali, byproducts are removed followed by drying, treated at 1,100° C. or less, and then pulverized to obtain a barium ferrite crystal powder.

Nonmagnetic Layer

The lower layer is described in detail below. Inorganic powders contained in the lower layer of the present invention are nonmagnetic powders. They can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., α-alumina having an alpha-conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Particularly preferred of these compounds are titanium dioxide, zinc oxide, iron oxide and barium sulfate because they have small particle size distribution and various means for imparting functions, and more preferred are titanium dioxide and α-iron oxide. These nonmagnetic powders preferably have an average particle size of from 0.005 to 2 $\mu$m. If desired, a plurality of nonmagnetic powders each having a different average particle size may be combined, or a single nonmagnetic powder having a broad particle size distribution may be employed so as to attain the same effect as such a combination. A particularly preferred particle size of nonmagnetic powders is from 0.01 to 0.2 $\mu$m. In particular, when the nonmagnetic powder is a granular metal oxide, the average particle size thereof is preferably 0.08 $\mu$m or less, and when it is an acicular metal oxide, the average long axis length thereof is preferably 0.3 $\mu$m or less, more preferably 0.2 $\mu$m or less. Nonmagnetic powders for use in the present invention have a tap density of from 0.05 to 2 g/ml, preferably from 0.2 to 1.5 g/ml; a water content of from 0.1 to 5% by weight, preferably from 0.2 to 3% by weight, and more preferably from 0.3 to 1.5% by weight; a pH value of from 2 to 11, particularly preferably between 5.5 and 10; a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 $\mu$m, and more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic powders may be any of acicular, spherical, polyhedral, and tabular shapes. Nonmagnetic powders preferably have a Mohs' hardness of from 4 to 10. The SA (stearic acid) absorption amount of nonmagnetic powders is from 1 to 20 $\mu$mol/m$^2$, preferably from 2 to 15 $\mu$mol/m$^2$, and more preferably from 3 to 8 $\mu$mol/m$^2$. The pH of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$ by surface treatment. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic powders for use in the lower layer according to the present invention include HIT-100 (average particle size: 0.11 $\mu$m), and ZA-G1 (manufactured by Sumitomo Chemical Co., Ltd.) as alumina, Nanotite (average particle size: 0.06 $\mu$m) (manufactured by Showa Denko Co., Ltd.), α-hematite DPN-250, DPN-250BX (average long axis length: 0.16 $\mu$m, average short axis length: 0.02 $\mu$m, axis ratio: 7.45), DPN-245, DPN-270BX, DPN-550BX, DPN-550RX (average long axis length: 0.15 $\mu$m, average short axis length: 0.02 $\mu$m, axis ratio: 7.5), and DPN-650RX (manufactured by Toda Kogyo Co., Ltd.), α-hematite α-40 (manufactured by Titan Kogyo Co., Ltd.), α-hematite E270, E271, E300 and E303 (manufactured by Ishihara Sangyo Kaisha Ltd.) as iron oxide, titanium oxide TTO-51B (average particle size: from 0.01 to 0.03 $\mu$m), TTO-55A (average particle size: from 0.03 to 0.05 $\mu$m), TTO-55B (average particle size: from 0.03 to 0.05 $\mu$m), TTO-55C (average particle size: from 0.03 to 0.05 $\mu$m), TTO-55S (average particle size: from 0.03 to 0.05 $\mu$m), TTO-55D (average particle size: from 0.03 to 0.05 $\mu$m), and SN-100 (manufactured by Ishihara Sangyo Kaisha Ltd.), titanium oxide STT-4D (average particle size: 0.013 $\mu$m), STT-30D (average particle size: 0.09 $\mu$m), STT-30 (average particle size: 0.12 $\mu$m), STT-65C (average particle size: 0.12 $\mu$m) (manufactured by Titan Kogyo Co., Ltd.), titanium oxide MT-100S (average particle size: 0.015 $\mu$m), MT-100T (average particle size: 0.015 $\mu$m), MT-150W (average particle size: 0.015 $\mu$m), MT-500B (average particle size: 0.035 $\mu$m), MT-600B (average particle size: 0.050 $\mu$m), MT-100F, and MT-500HD (manufactured by Teika Co., Ltd.) as titanium oxide, FINEX-25 (average particle size: 0.5 $\mu$m) (manufactured by Sakai Chemical Industry Co., Ltd.) as zinc oxide, BF-1 (average particle size: 0.05 $\mu$m), BF-10 (average particle size: 0.06 $\mu$m), BF-20 (average particle size: 0.03 $\mu$m), and ST-M (manufactured by Sakai Chemical Industry Co., Ltd.) as barium sulfate, DEFIC-Y and DEFIC-R (manufactured by Dowa Mining Co., Ltd.), AS2BM and TiO$_2$ P25 (manufactured by Nippon Aerosil Co., Ltd.), and 100A, 500A and calcined products thereof (manufactured by Ube Industries, Ltd.). Particularly preferred nonmagnetic powders are titanium dioxide and α-iron oxide.

Preparation of α-iron oxide (hematite) is performed as follows. α-Fe$_2$O$_3$ powders are obtained from acicular goethite particles as precursor particles. Acicular goethite particles can be produced by any of the following methods.

(1) A method in which an aqueous alkali hydroxide solution is added to an aqueous ferrous salt solution in the equivalent or more amount to thereby prepare a suspension having pH of 11 or more containing ferrous hydroxide colloid, then an oxygen-containing gas is introduced to the suspension obtained at 80° C. or less to form acicular goethite particles by the oxidation reaction of ferrous ions;

(2) A method in which an aqueous ferrous salt solution is reacted with an aqueous alkali carbonate solution to thereby prepare a suspension containing FeCO$_3$, then an oxygen-containing gas is introduced to the suspension obtained to form spindle-like goethite particles by the oxidation reaction of ferrous ions;

(3) A method in which an aqueous alkali hydroxide solution or an aqueous alkali carbonate solution is added to an aqueous ferrous salt solution in the amount of less than equivalent, thereby an aqueous ferrous salt solution containing ferrous hydroxide colloid is prepared, then an oxygen-containing gas is introduced to the aqueous ferrous salt solution obtained to form acicular goethite nucleus particles by the oxidation reaction of ferrous ions, thereafter an aqueous alkali hydroxide solution is added to the aqueous ferrous salt solution containing the acicular goethite nucleus particles in the amount of equivalent or more based on Fe$^{2+}$ in the aqueous ferrous salt solution, then again an oxygen-containing gas is introduced to the aqueous ferrous salt solution to grow the acicular goethite nucleus particles; and (4) A method in which an aqueous alkali hydroxide solution or an aqueous alkali carbonate solution is added to an aqueous ferrous salt solution in the amount of less than equivalent, thereby an aqueous ferrous salt solution containing ferrous-hydroxide colloid is prepared, then an oxygen-containing gas is introduced to the aqueous ferrous salt solution obtained to form acicular goethite nucleus particles by the oxidation reaction of ferrous ions, thereafter the acicular goethite nucleus particles are grown in an acidic or neutral region.

Further, different kinds of elements such as Ni, Zn, P or Si, which are generally added to the reaction solution during the goethite particle-forming reaction for improving the properties of the powder, may be added. Acicular α-Fe$_2$O$_3$ particles can be obtained by dehydrating acicular goethite particles, which are precursor particles, in the range of 200 to 500° C. and further, if necessary, annealing the particles by heat treatment at 350 to 800° C. A sintering inhibitor such as P, Si, B, Zr or Sb may be adhered to the surface of acicular goethite particles to be dehydrated or annealed. The reason why annealing by heat treatment at 350 to 800° C. is conducted is because it is preferred to fill the voids which have occurred on the surface of acicular α-Fe$_2$O$_3$ particles obtained by the dehydration by melting the extreme surfaces of particles to obtain smooth surfaces.

The α-Fe$_2$O$_3$ powder for use in the present invention can be obtained by dispersing acicular α-Fe$_2$O$_3$ particles obtained by dehydration or annealing in an aqueous solution to make a suspension, adding Al compounds to the suspension obtained and adjusting the pH, covering the surface of acicular α-Fe$_2$O$_3$ particles with the above Al compounds, filtering, washing, drying, pulverizing and, if necessary, performing other treatments such as deaeration, compaction and the like. Aluminum salt such as aluminum acetate, aluminum sulfate, aluminum chloride, and aluminum nitrate, and aluminic acid alkali salt such as sodium aluminate can be used as the aluminum compound to be used. In this case, the addition amount of the Al compound is from 0.01 to 50% by weight in terms of Al based on the α-Fe$_2$O$_3$ powder. If the content is less than 0.01% by weight, dispersion in the binder resin is insufficient and if it exceeds 50% by weight, Al compounds suspending around surfaces of particles unfavorably interact with each other. The nonmagnetic powder for use in the lower layer according to the present invention may be covered with one or two or more selected from the group consisting of P, Ti, Mn, Ni, Zn, Zr, Sn and Sb, as well as Si compounds, together with Al compounds. The content of these compounds used together with Al compounds is each from 0.01 to 50% by weight based on the α-Fe$_2$O$_3$ powder. If the content is less than 0.01% by weight, the improvement of dispersibility by the addition can hardly be obtained, and if it exceeds 50% by weight, Al compounds suspending around other than surfaces of particles unfavorably interact with each other.

The producing method of a titanium dioxide is as follows. The producing method of a titanium dioxide mainly comprises a sulfuric acid process and a chlorine process. A sulfuric acid process comprises digesting raw ores of ilmenite with sulfuric acid and extracting Ti and Fe as sulfate. Iron sulfate is removed by crystallization-separation, the resulting titanyl sulfate solution is purified by filtration, water-containing titanium oxide is precipitated by thermal hydrolysis, the precipitated product is filtrated and washed, impurities are removed by washing, then a particle size-adjusting agent is added and calcined at 80 to 1,000° C., thereby a crude titanium oxide is obtained. A rutile type and an anatase type are separated by the kind of nucleating agent added at hydrolysis. This crude titanium oxide is pulverized, graded, and surface treated. In a chlorine process, a natural rutile and a synthetic rutile are used as raw ores. Ores are chlorinated in a high temperature reduction state, Ti becomes TiCl$_4$ and Fe becomes FeCl$_2$, and the iron oxide solidified by cooling is separated from the liquid TiCl$_4$. The crude TiCl$_4$ obtained is purified by fraction, then a nucleating agent is added thereto and reacted with oxygen instantaneously at 1,000° C. or more, thereby a crude titanium oxide is obtained. The finishing method for imparting to the crude titanium oxide formed in the oxidation decomposition process the property of the pigment is the same as in the sulfuric acid process.

After the above titanium oxide material is dry-ground, water and a dispersant are added thereto, particles are wet-ground, and coarse particles are classified by means of a centrifugal separator. Subsequently, a fine particle slurry is put in a surface treatment tank and surface covering with metal hydroxide is conducted here. In the first place, a predetermined amount of an aqueous solution of salts such as Al, Si, Ti, Zr, Sb, Sn, Zn is added to the tank, an acid or an alkali is added to neutralize the solution, and surfaces of titanium oxide particles are covered with the hydroxide produced. The water-soluble salts by-produced are removed by decantation, filtration and washing, the pH of the slurry is adjusted finally and filtrated, and washed with pure water. The washed cake is dried using a spray drier or a band drier.

The dried cake is finally ground by jet milling, thereby the final product is obtained.

Besides the water system, it is also possible to perform surface treatment by introducing $AlCl_3$ and $SiCl_4$ vapor to the titanium oxide powder, then flowing water vapor to conduct surface treatment with Al and Si.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring, acetylene blacks, etc., can be used therefor. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of from 100 to 500 $m^2$/g, preferably from 150 to 400 $m^2$/g, a DBP oil absorption amount of from 20 to 400 ml/100 g, preferably from 30 to 400 ml/100 g, an average particle size of from 5 to 80 nm, preferably from 10 to 50 nm, and more preferably from 10 to 40 nm, and a small amount of carbon blacks having an average particle size of larger than 80 nm may be contained in the lower layer. Carbon blacks for use in the lower layer have pH of from 2 to 10, a water content of from 0.1 to 10%, and a tap density of from 0.1 to 1 g/ml. Specific examples of carbon blacks for use in the present invention include BLACKPEARLES 2000 (average particle size: 15 nm), 1400 (average particle size: 13 nm), 1300 (average particle size: 13 nm), 1100 (average particle size: 14 nm), 1000, 900 (average particle size: 15 nm), 800, 880 and 700, L (average particle size: 24 nm), VULCAN XC-72 (average particle size: 30 nm), and P (average particle size: 19 nm) (manufactured by Cabot Co., Ltd.), #3050B, #3150B, #3250B (average particle size: 30 nm), #3750B, #3950B (average particle size: 16 nm), #950 (average particle size: 16 nm), #650B, #970B, #850B (average particle size: 18 nm), MA-600 (average particle size: 18 nm), MA-230, #4000 and #4010 (manufactured by Mitsubishi Kasei Corp.), CONDUCTEX SC (average particle size: 17 nm), SC-U (average particle size: 20 nm), 975 (average particle size: 20 nm), RAVEN 8800 (average particle size: 13 nm), 8000 (average particle size: 13 nm), 7000 (average particle size: 14 nm), 5750 (average particle size: 17 nm), 5250 (average particle size: 19 nm), 5000 (average particle size: 12 nm), 3500 (average particle size: 16 nm), 2100 (average particle size: 17 nm), 2000 (average particle size: 18 nm), 1800 (average particle size: 18 nm), 1500 (average particle size: 18 nm), 1255 (average particle size: 23 nm), 1250 (average particle size: 21 nm), and 1035 (average particle size; 27 nm) (manufactured by Columbia Carbon Co., Ltd.), Ketjen Black EC (average particle size: 30 nm) (manufactured by Akzo Co., Ltd.), and #80 (average particle size: 20 nm), #70 (average particle size: 27 nm), #60 (average particle size: 49 nm), #55 (average particle size: 68 nm), and Asahi Thermal (average particle size: 72 nm) (manufactured by Asahi Carbon Co., Ltd.). Carbon blacks having an average particle size of larger than 80 nm which may be used in the lower layer include #50 (average particle size: 94 nm) and #35 (average particle size: 82 nm) (manufactured by Asahi Carbon Co., Ltd.). Carbon blacks for use in the present invention may previously be surface-treated with a dispersant, may be grafted with a resin, or a part of the surface thereof may be graphitized before use. Carbon blacks may be previously dispersed in a binder before addition to the coating solution. Carbon blacks can be used within the range not exceeding 50% by weight based on the above inorganic powders and not exceeding 40% by weight based on the total weight of the nonmagnetic layer. These carbon blacks can be used alone or in combination. Regarding carbon blacks for use in the present invention, for example, the disclosure in *Handbook of Carbon Blacks* (edited by Carbon Black Association of Japan) can be referred to.

Organic powders can be used in the lower layer according to the purpose. Examples of such organic powders include an acryl styrene resin powder, a benzoguanamine resin powder, a melamine resin powder, and a phthalocyanine pigment. In addition, at least one of a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827.

Binder

Binder resins, lubricants, dispersants, additives, solvents, dispersing methods, etc., used for the magnetic layer described below can be used in the lower layer and the backing layer. In particular, with respect to the amounts and the kinds of binder resins, and the amounts and the kinds of additives and dispersants, well-known prior art techniques regarding the magnetic layer can be applied to the lower layer and backing layer according to the present invention.

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the present invention.

Examples thereof include polymers or copolymers containing as a constituting unit the compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook*, published by Asakura Shoten. It is also possible to use well-known electron beam curable type resins in each layer. Examples of these resins and producing methods are disclosed in detail in JP-A-62-256219. These resins can be used alone or in combination. Examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —NR$_2$, —N$^+$R$_3$ (wherein R represents a hydrocarbon group), an epoxy group, —SH, or —CN. The content of the polar group is from $10^{-1}$ to $10^{-8}$ mol/g, preferably from $10^{-2}$ to $10^{-6}$ mol/g. It is preferred that polyurethane resins have at least one OH group at each terminal of polyurethane molecule, i.e., two or more in total, in addition to the above polar groups. As OH groups form three dimensional network structure by cross-linking with the polyisocyanate curing agent, they are preferably contained in the molecule as many as possible. In particular, as the reactivity with the curing agent is high, OH groups are preferably present at terminals of the molecule. It is preferred for polyurethane to have 3 or more OH groups, particularly preferably 4 or more OH groups, at terminals of the molecule. When polyurethane is used in the present invention, the polyurethane has a glass transition temperature of from −50 to 150° C., preferably from 0 to 100° C., and particularly preferably from 30 to 100° C., breaking extension of from 100 to 2,000%, breaking stress of from 0.05 to 10 kg/mm$^2$, and a yielding point of from 0.05 to 10 kg/mm$^2$. Due to these physical properties, coated film exhibiting good mechanical properties at high rotation rate of preferably 1,800 rpm or more, more preferably 3,000 rpm or more, can be obtained.

Specific examples of binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.) as vinyl chloride copolymers; Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink.), Vylon UR8200, UR8300, UR8700, RV530 and RV280 (manufactured by Toyobo Co., Ltd.), polycarbonate polyurethane, Daipheramine 4020, 5020, 5100, 5300, 9020, 9022 and 7020 (manufactured by Dainichi Seika K.K.), polyurethane, MX5004 (manufactured by Mitsubishi Kasei Corp.), polyurethane, Sunprene SP-150 (manufactured by Sanyo Chemical Industries Co. Ltd.), polyurethane, Salan F310 and F210 (manufactured by Asahi Chemical Industry Co., Ltd.) as polyurethane resins, etc.

The amount of the binder for use in the nonmagnetic layer and the magnetic layer according to the present invention is from 5 to 50% by weight, preferably from 10 to 30% by weight, based on the weight of the nonmagnetic powder or the magnetic powder. When vinyl chloride resins are used, the amount of the vinyl chloride resin is from 5 to 30% by weight, when polyurethane resins are used, the amount of the polyurethane resin is from 2 to 20% by weight, and it is preferred polyisocyanate is used in an amount of from 2 to 20% by weight in combination with these resins. However, for instance, when head corrosion is caused by a slight amount of chlorine due to dechlorination, it is possible to use polyurethane alone or a combination of polyurethane and isocyanate alone.

The magnetic recording medium according to the present invention may comprise two or more layers. Accordingly, the amount of the binder, the amounts of vinyl chloride resins, polyurethane resins, polyisocyanate or other resins contained in the binder, the molecular weight of each resin constituting the magnetic layer, the amount of polar groups, or the above-described physical properties of resins can of course be varied in the nonmagnetic layer and the magnetic layer, according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to impart flexibility.

Examples of the polyisocyanates which can be used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophorone-diisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone or in combinations of two or more thereof in each layer, taking advantage of a difference in curing reactivity.

Carbon Black, Abrasive

Examples of carbon blacks for use in the magnetic layer according to the present invention include furnace blacks for rubbers, thermal blacks for rubbers, carbon blacks for coloring, acetylene blacks, etc. Carbon blacks for use in the magnetic layer of the present invention preferably have a specific surface area ($S_{BET}$) of from 5 to 500 m$^2$/g, a DBP oil absorption amount of from 10 to 400 ml/100 g, an average particle size of from 5 to 300 nm, pH of from 2 to 10, a water content of from 0.1 to 10%, and a tap density of from 0.1 to 1 g/ml. Specific examples of carbon blacks for use in the magnetic layer of the present invention include BLACK-PEARLES 2000 (average particle size: 15 nm), 1300 (average particle size: 13 nm), 1000 (average particle size: 16 nm), 900 (average particle size: 15 nm), 905, 800 (average particle size: 17 nm), and 700 (average particle size: 18 nm), VULCAN XC-72 (average particle size: 30 nm), and STERLING FT (average particle size: 180 nm) (manufactured by Cabot Co., Ltd.), #80 (average particle size: 20 nm), #60 (average particle size: 49 nm), #55 (average particle size: 68 nm), #50 (average particle size: 94 nm), and #35 (average particle size: 82 nm) (manufactured by Asahi Carbon Co., Ltd.), #2400B (average particle size: 15 nm), #2300 (average particle size: 15 nm), #900 (average particle size: 16 nm), #1000 (average particle size: 18 nm), #30 (average particle size: 30 nm), #40 (average particle size: 20 nm), and #10B (average particle size: 84 nm) (manufactured by Mitsubishi Kasei Corp.), CONDUCTEX SC (average particle size: 17 nm), RAVEN 150 (average particle size: 18 ni), 50 (average particle size: 21 nm), 40 (average particle size: 24 nm), and 15 (average particle size: 27 nm), RAVEN-MTP (average particle size: 275 nm) and RAVEN-MT-P beads (average particle size: 330 nm) (manufactured by Columbia Carbon Co., Ltd.), Ketjen Black EC40 (average particle size: 30 nm) (manufactured by Akzo Co., Ltd.), and Thermal Black (average particle size: 270 nm) (manufactured by Cancarb Co., Ltd.), etc. Carbon blacks for use in the present invention may previously be surface-treated with a dispersant, may be grafted with a resin, or a part of the surface thereof may be graphitized before use. Carbon blacks may be previously dispersed in a binder before addition to the magnetic coating solution. These carbon blacks may be used alone or in combination. Carbon blacks are preferably used in an amount of from 0.1 to 30% by weight based on the amount of the ferromagnetic powder. Carbon blacks can serve various functions such as preventing static charges, reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added to the upper magnetic layer and the lower nonmagnetic layer, on the basis of the above mentioned various properties such as the particle size, the oil absorption amount, the electroconductivity and the pH value, or these should be rather optimized in respective layers. Regarding carbon blacks for use in the magnetic layer of the present invention, for example, the disclosure in *Handbook of Carbon Blacks* (edited by Carbon Black Association of Japan) can be referred to.

As the abrasive usable in the present invention, well-known materials essentially having a Mohs' hardness of 6 or more may be used alone or in combination. Examples of such abrasives include α-alumina having an alpha-conversion rate of 90% or more, β-alumina, silicon carbide, chromium oxide, cerium oxide, α-iron oxide, corundum, artificial diamond, silicon nitride, silicon carbide titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90% or more. Abrasives preferably have a particle size of from 0.01 to 2 μm and, in particular, for improving electromagnetic characteristics, abrasives having narrow particle size distribution are preferred. For improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5%, a pH value of from 2 to 11, and a specific surface area ($S_{BET}$) of from 1 to 30 m²/g. The shape of the abrasives to be used in the present invention may be any of acicular, spherical and die-like shapes. Preferably, the abrasive has a shape partly with edges, because a high abrasive property is given. Specific examples of abrasives for use in the present invention include as examples of α-alumina, AKP-12 (average particle size: 0.50 μm), AKP-15 (average particle size: 0.45 μm), AKP-20 (average particle size: 0.39 μm), AKP-30 (average particle size: 0.23 μm), AKP-50 (average particle size: 0.16 μm), HIT-20, HIT-30, HIT-55 (average particle size: 0.20 μm), HIT-60, HIT-70 (average particle size: 0.15 μm), HIT-80 and HIT-100 (average particle size: 0.11 μm) (manufactured by Sumitomo Chemical Co., Ltd.), ERC-DBM (average particle size: 0.22 μm), HP-DBM (average particle size: 0.22 μm), and HPS-DBM (average particle size: 0.19 μm) (manufactured by Reynolds International Inc.), WA10000 (average particle size: 0.29 μm) (manufactured by Fujimi Kenma K.K.), UB20 (average particle size: 0.13 μm) (manufactured by Uemura Kogyo K.K.), as examples of chromium oxide, G-5 (average particle size: 0.32 μm), Kromex U2 (average particle size: 0.18 μm), and Kromex U1 (average particle size: 0.17 μm) (manufactured by Nippon Chemical Industrial Co., Ltd.), as examples of α-iron oxide, TF100 (average particle size: 0.14 μm) and TF140 (average particle size: 0.17 μm) (manufactured by Toda Kogyo Co., Ltd.), as examples of silicon carbide, β-Random Ultrafine (average particle size: 0.16 λm) (manufactured by Ibiden Co., Ltd.), and as examples of silicon dioxide, B-3 (average particle size: 0.17 μm) (manufactured by Showa Mining Co., Ltd.). These abrasives may also be added to a nonmagnetic layer, if necessary. By incorporating abrasives into a nonmagnetic layer, it is possible to control the surface shape or prevent abrasives from protruding. Particle sizes and amounts of abrasives to be added to a magnetic layer and a nonmagnetic layer should be selected independently at optimal values.

In the case of high capacity floppy discs of rotation rate of 1,800 rpm or more, in particular 3,000 rpm or more, it is preferred to use diamond fine particles as an abrasive.

Diamond fine particles which can be used in the present invention preferably have an average particle size of from 0.10 to 1.0 μm, more preferably from 0.10 to 0.8 μm. When the average particle size is less than 0.10 μm, the effect of improving durability is liable to lower as compared to the addition amount, while when it is larger than 1.0 μm, noise is liable to increase even though durability is improved.

In the present invention, the maximum diameter of each diamond particle is taken as a particle size, and the average value of determined values of 500 particles by random sampling by means of an electron microscope is taken as an average particle size.

The addition amount of diamond particles in the present invention is from 0.01 to 10% by weight, preferably from 0.03 to 5% by weight, based on the weight of the ferromagnetic powder. If the addition amount is less than 0.01% by weight, durability is obtained with difficulty and if it exceeds 10% by weight, the effect of noise reduction by means of the addition of a diamond particle is reduced.

The addition amount and the average particle size of a diamond fine particle are regulated within the above ranges from the viewpoint of noise and durability, but the addition amount thereof is preferably as small as possible in view of noise. It is preferred in the magnetic recording medium of the present invention to appropriately select the amount and the average particle size of a diamond fine particle suitable for magnetic recording devices from the above ranges.

Further, with respect to the particle size distribution of a diamond particle, it is preferred that the number of particles having the particle size of 200% or more of the average particle size accounts for 5% or less of the entire number of diamond particles, and the number of particles having the particle size of 50% or less of the average particle size accounts for 20% or less of the entire number of diamond particles. The maximum value of the particle size of the diamond fine particle for use in the present invention is about 3.00 μm, preferably about 2.00 μm, and the minimum value is about 0.01 μm, preferably about 0.02 μm.

Particle size distribution is found by counting numbers of respective sizes based on the average particle size at the time of particle size measurement.

Particle size distribution of a diamond fine particle also influences durability and noise of the magnetic medium. If the particle size distribution is broader than the above-described range, the effect corresponding to the average particle size set up in the present invention deviates as described above, i.e., if many particles have too large particle sizes, noise is increased and the head is scratched. While when there exist many particles having too small particle sizes, abrasive effect is insufficient. Further, a diamond fine particle having extremely narrow particle size distribution is expensive, therefore, the above-described range is economically advantageous as well.

Diamond fine particles can be used in combination with conventionally used abrasives, e.g., an alumina abrasive, in the present invention. Better effects on durability and SN ratio are obtained when a small amount of a diamond fine particle alone is used but, for economical reason, etc., an alumina abrasive can be used in combination with a diamond fine particle in an amount of preferably from 1 to 30% by weight, more preferably from 3 to 25% by weight, based on the magnetic powder. In this case, addition amount of abrasives can be considerably reduced due to the addition of a diamond fine particle as compared with the amount necessary to ensure durability with alumina alone, which is preferred in view of the security of durability and the reduction of noise.

Methods for producing a diamond particle of a micrometer size include (1) a static high pressure method, (2) an explosion method, and (3) a vapor phase method. In a static high pressure method (1), a large crystal having a particle size of several 10 $\mu$m or more is prepared in the first place, and the resulting crystal is pulverized to obtain a diamond fine particle of a sub-micrometer size. In an explosion method (2), extra high pressure is generated by shock wave by means of the explosion of an explosive, and therby black smoke is converted to a diamond by making use of the generated extra high pressure. The diamond produced by this method is a polycrystalline diamond which is said to have a primary particle of something between 20 Å and 50 Å. In a vapor phase method (3), a gaseous compound containing a carbon such as a hydrocarbon is charged into a closed container under the condition of normal pressure or less with a hydrogen gas, a high temperature zone is formed therein by plasma, etc., and the starting compound is decomposed to precipitate a diamond on a substrate, e.g., Si or Mo.

Specific examples of diamond fine particles include LS600F, LS600T, LS600F coated products (coated products coated with 30% or 56% nickel), LS-NPM and BN2600 (manufactured by LANDS SUPERABRASIVES, CO.), which are preferred as diamond fine particles with arbitrary particle sizes of from 0 to 100 $\mu$m are available. Besides the above, IRM 0-¼ (average particle size: 0.12 $\mu$m), and IRM 0-1 (average particle size: 0.60 $\mu$m) (manufactured by Tomei Diamond Industrial Co., Ltd.) can be used.

Additive

As additives which can be used in the magnetic layer and the nonmagnetic layer of the present invention, those having a lubrication effect, an antistatic effect, a dispersing effect and a plasticizing effect may be used, and by the combined use of additives, comprehensive improvement of capacities can be contrived. As additives having a lubricating effect, lubricants giving remarkable action on adhesion caused by the friction of surfaces of materials with each other are used. Lubricants are classified into two types. Lubricants used for a magnetic recording medium cannot be judged completely whether they show fluid lubrication or boundary lubrication, but according to general concepts they are classified into higher fatty acid esters, liquid paraffins and silicon derivatives showing fluid lubrication, and long chain fatty acids, fluorine surfactants and fluorine-containing high polymers showing boundary lubrication. In a coating type magnetic recording (particulate) medium, lubricants exist in a state dispersed in a binder or in a state partly adsorbed onto the surface of a ferromagnetic powder, and they migrate to the surface of a magnetic layer. The speed of migration depends on whether the compatibility of the binder and the lubricant is good or bad. The speed of migration is slow when the compatibility of the binder and the lubricant is good and the migration speed is fast when the compatibility is bad. As one idea as to good or bad of the compatibility, there is a means of comparison of dissolution parameters of both. A nonpolar lubricant is effective for fluid lubrication and a polar lubricant is effective for boundary lubrication. In the present invention, at least three in total of these higher fatty acid ester showing fluid lubrication and long chain fatty acid showing boundary lubrication having respectively different characteristics are preferably used in combination to obtain high capacity, high density and high durability. Solid lubricants can also be used in combination with these.

Examples of solid lubricants which can be used in the present invention include molybdenum disulfide, tungsten graphite disulfide, boron nitride, and graphite fluoride. Examples of long chain fatty acids showing boundary lubrication include monobasic fatty acids having from 10 to 24 carbon atoms (which may contain an unsaturated bond or which may be branched) and metal salts thereof (e.g., with Li, Na, K or Cu). Examples of fluorine surfactants and fluorine-containing high polymers include fluorine-containing silicons, fluorine-containing alcohols, fluorine-containing esters, fluorine-containing alkyl sulfates and alkali metal salts thereof. Examples of higher fatty acid esters showing fluid lubrication include mono-fatty acid esters, di-fatty acid esters or tri-fatty acid esters composed of a monobasic fatty acid having from 10 to 24 carbon atoms (which may contain an unsaturated bond or which may be branched) and any one of mono-, di-, tri-, tetra-, penta- and hexa-alcohols having from 2 to 12 carbon atoms (which may contain an unsaturated bond or which may be branched), and fatty acid esters of monoalkyl ethers of alkylene oxide polymers. In addition to the above, examples further include liquid paraffins, and as silicon derivatives, silicone oils such as dialkylpolysiloxane (the alkyl has from 1 to 5 carbon atoms), dialkoxypolysiloxane (the alkoxy has from 1 to 4 carbon atoms), monoalkylmonoalkoxypolysiloxane (the alkyl has from 1 to 5 carbon atoms and the alkoxy has from 1 to 4 carbon atoms), phenylpolysiloxane, and fluoroalkylpolysiloxane (the alkyl has from 1 to 5 carbon atoms), silicons having a polar group, fatty acid-modified silicons and fluorine-containing silicons.

Examples of other lubricants which can be used in the present invention include alcohols such as mono-, di-, tri-, tetra-, penta- or hexa-alcohols having from 12 to 22 carbon atoms (which may contain an unsaturated bond or which may be branched), alkoxy alcohols having from 12 to 22 carbon atoms (which may contain an unsaturated bond or which may be branched), and fluorine-containing alcohols, polyethylene waxes, polyolefins such as polypropylenes, ethylene glycols, polyglycols such as polyethylene oxide waxes, alkyl phosphates and alkali metal salts thereof, alkyl sulfates and alkali metal salts thereof, polyphenyl ethers, fatty acid amides having from 8 to 22 carbon atoms, and aliphatic amines having from 8 to 22 carbon atoms.

Examples of additives having an antistatic effect, a dispersing effect and a plasticizing effect which can be used in the present invention include phenylphosphonic acids, specifically PPA (manufactured by Nissan Chemical Industries, Ltd.), etc., α-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metal salts thereof.

Lubricants particularly preferably used in the present invention are fatty acids and fatty acid esters, in addition, other different lubricants and additives can be used in combination with them as well. Specific examples thereof are exemplified below. As fatty acids, examples of saturated fatty acids include caprylic acid ($C_7H_{15}COOH$, melting point: 16° C.), pelargonic acid ($C_8H_{17}COOH$, melting point: 15° C.), capric acid ($C_9H_{19}COOH$, melting point: 31.5° C.), undecylic acid ($C_{10}H_{21}COOH$, melting point: 28.6° C.), lauric acid ($C_{11}H_{23}COOH$, melting point: 44° C.), specifically NAA-122 (manufactured by Nippon Oils and Fats Co., Ltd.), tridecylic acid ($C_{12}H_{25}COOH$, melting point: 45.5° C.), myristic acid ($C_{13}H_{27}COOH$, melting point: 58° C.), specifically NAA-142 (manufactured by Nippon Oils and Fats Co., Ltd.), pentadecylic acid ($C_{14}H_{29}COOH$, melting point: 53 to 54° C.), palmitic acid ($C_{15}H_{31}COOH$, melting point: 63 to 64° C.), specifically NAA-160 (manufactured by Nippon Oils and Fats Co., Ltd.), heptadecylic acid ($C_{16}H_{33}COOH$, melting point: 60 to 61° C.), stearic acid ($C_{17}H_{35}COOH$, melting point: 71.5 to 72° C.), specifically NAA-173K (manufactured by Nippon Oils and Fats Co., Ltd.), nonadecanoic acid ($C_{18}H_{37}COOH$, melting point: 68.7° C.), arachic acid ($C_{19}H_{39}COOH$, melting point: 77° C.), and behenic acid ($C_{21}H_{43}COOH$, melting point: 81 to 82° C.). Examples of unsaturated fatty acids include oleic acid ($C_{17}H_{33}COOH$(cis), melting point: 16° C.), specifically oleic acid manufactured by Kanto Kagaku Co., Ltd., elaidic acid ($C_{17}H_{33}COOH$(trans), melting point: 44 to 45° C.), specifically elaidic acid manufactured by Wako Pure Chemical Industries Ltd., cetoleic acid ($C_{21}H_{41}COOH$, melting point: 33.7° C.), erucic acid ($C_{21}H_{41}COOH$, melting point: 33.4 to 34° C.), specifically erucic acid manufactured by Nippon Oils and Fats Co., Ltd., brassidic acid ($C_{21}H_{41}COOH$(trans), melting point: 61.5° C.), linoleic acid ($C_{17}H_{31}COOH$, boiling point: 228° C. (14 mm)), and linolenic acid ($C_{17}H_{29}COOH$, boiling point: 197° C. (4 mm)). Examples of branched saturated fatty acids include isostearic acid ($CH_3CH(CH_3)(CH_2)_{14}COOH$, melting point: 67.6 to 68.1° C.).

Examples of esters are described below. Examples of laurates include isocetyl laurate ($C_{11}H_{23}COOCH_2CH(C_6H_{13})C_8H_{17}$), oleyl laurate ($C_{11}H_{23}COOC_{18}H_{35}$), and stearyl laurate ($C_{11}H_{23}COOC_{18}H_{37}$); examples of myristates include isopropyl myristate ($C_{13}H_{27}COOCH(CH_3)_2$), specifically Enujerubu IPM (manufactured by Shin-Nihon Rika Co., Ltd.), butyl myristate ($C_{13}H_{27}COOC_4H_9$), isobutyl myristate ($C_{13}H_{27}COO$-iso-$C_4H_9$), specifically Enujerubu IBM (manufactured by Shin-Nihon Rika Co., Ltd.), heptyl myristate ($C_{13}H_{27}COOC_7H_{15}$), octyl myristate ($C_{13}H_{27}COOC_8H_{17}$), isooctyl myristate ($C_{13}H_{27}COOCH_2CH(C_2H_5)C_4H_9$), and isocetyl myristate ($C_{13}H_{27}COOCH_2CH(C_6H_{13})C_8H_{17}$).

Examples of palmitates include octyl palmitate ($C_{15}H_{31}COOC_8H_{17}$), decyl palmitate ($C_{15}H_{31}COOC_{10}H_{21}$), isooctyl palmitate ($C_{15}H_{31}COOCH_2CH(C_2H_5)C_4H_9$), isocetyl palmitate ($C_{15}H_{31}COOCH_2CH(C_6H_{13})C_8H_{17}$), 2-octyldodecyl palmitate ($C_{15}H_{31}COOCH_2CH(C_8H_{17})C_{12}H_{25}$), 2-hexyldodecyl palmitate ($C_{15}H_{31}COOCH_2CH(C_6H_{13})C_{12}H_{25}$), and oleyl palmitate ($C_{15}H_{31}COOC_{18}H_{35}$).

Examples of stearates include propyl stearate ($C_{17}H_{35}COOC_3H_7$), isopropyl stearate ($C_{17}H_{35}COOCH(CH_3)_2$), butyl stearate ($C_{17}H_{35}COOC_4H_9$), specifically butyl stearate manufactured by Nippon Oils and Fats Co., Ltd., sec-butyl stearate ($C_{17}H_{35}COOCH(CH_3)C_2H_5$), tert-butyl stearate ($C_{17}H_{35}COOC(CH_3)_3$), amyl stearate ($C_{17}H_{35}COOC_5H_{11}$), isoamyl stearate ($C_{17}H_{35}COOCH_2CH_2CH(CH_3)_2$), hexyl stearate ($C_{17}H_{35}COOC_6H_{13}$), heptyl stearate ($C_{17}H_{35}COOC_7H_{15}$), specifically MYB-185 (manufactured by Matsumoto Yushi Co., Ltd.), octyl stearate ($C_{17}H_{35}COOC_8H_{17}$), specifically N-octyl stearate manufactured by Nippon Oils and Fats Co., Ltd., isooctyl stearate ($C_{17}H_{35}COO$-iso-$C_8H_{17}$), decyl stearate ($C_{17}H_{35}COOC_{10}H_{21}$), isodecyl stearate ($C_{17}H_{35}COO$-iso-$C_{10}H_{21}$), dodecyl stearate ($C_{17}H_{35}COOC_{12}H_{25}$), isotridecyl stearate ($C_{17}H_{35}COO$-iso-$C_{13}H_{27}$), 2-ethylhexyl stearate ($C_{17}H_{35}COOCH_2CH(C_2H_5)C_4H_9$), isohexadecyl stearate ($C_{17}H_{35}COOCH_2CH(C_2H_5)C_4H_9$) or isocetyl stearate ($C_{17}H_{35}COOCH_2CH(C_6H_{13})C_8H_{17}$), specifically Enujerubu HDS (manufactured by Shin-Nihon Rika Co., Ltd.), isostearyl stearate ($C_{17}H_{35}COO$-iso-$C_{18}H_{37}$), and oleyl stearate ($C_{17}H_{35}COOC_{18}H_{37}$).

Examples of behenates include isotetracosyl behenate ($C_{21}H_{43}COOCH_2CH(C_6H_{13})C_{12}H_{25}$), specifically Enujerubu DTB (manufactured by Shin-Nihon Rika Co., Ltd.).

Examples of glycol type esters include those disclosed in JP-A-59-227030 and JP-A-59-65931, e.g., butoxyethyl stearate ($C_{17}H_{35}COOCH_2CH_2OC_4H_9$), butoxyethyl oleate ($C_{17}H_{33}COOCH_2CH_2OC_4H_9$), diethylene glycol monobutyl ether stearate or butoxyethoxyethyl stearate ($C_{17}H_{35}COO(CH_2CH_2O)_2C_4H_9$), tetraethylene glycol monobutyl ether stearate ($C_{17}H_{35}COO(CH_2CH_2O)_4C_4H_9$), diethylene glycol monophenyl ether stearate ($C_{17}H_{35}COO(CH_2CH_2O)_2C_6H_6$), and diethylene glycol mono-2-ethylhexyl ether stearate ($C_{17}H_{35}COO(CH_2CH_2O)_2CH_2CH(C_2H_5)C_4H_9$).

Examples of isostearates include isocetyl isostearate (iso-$C_{17}H_{35}COOCH_2CH(C_6H_{13})C_8H_{17}$), specifically I.C.I.S. (manufactured by Higher Alcohol Co., Ltd.), oleyl isostearate (iso-$C_{17}H_{35}COOC_{18}H_{37}$), stearyl isostearate (iso-$C_{17}H_{35}COOC_{18}H_{37}$), isostearyl isostearate (iso-$C_{17}H_{35}COO$-iso-$C_{18}H_{37}$), and eicosenyl isostearate (iso-$C_{17}H_{35}COOC_{22}H_{43}$).

Examples of oleates include butyl oleate ($C_{17}H_{33}COOC_4H_9$), specifically Enujerubu BO (manufactured by Shin-Nihon Rika Co., Ltd.), oleyl oleate ($C_{17}H_{33}COOC_{18}H_{35}$), and ethylene glycol dioleyl ($C_{17}H_{33}COOCH_2CH_2OCOC_{17}H_{33}$).

Examples of erucates include oleyl erucate ($C_{21}H_{41}COOC_{18}H_{35}$).

Examples of diesters include dioleyl maleate ($C_{18}H_{35}OCOCH=CHCOOC_{18}H_{35}$), neopentyl glycol didecanoate ($C_{10}H_{21}COOCH_2C(CH_3)_2CH_2OCOC_{10}H_{21}$), ethylene glycol dilaurate ($C_{11}H_{23}COOCH_2CH_2OCOC_{11}H_{23}$), ethylene glycol dioleyl ($C_{17}H_{33}COOCH_2CH_2OCOC_{17}H_{33}$), 1,4-butanediol distearate ($C_{17}H_{35}COO(CH_2)_4OCOC_{17}H_{35}$), 1,4-butanediol dibehenate ($C_{21}H_{43}COO(CH_2)_4OCOC_{21}H_{43}$), 1,10-decanediol dioleyl ($C_{17}H_{33}COO(CH_2)_{10}OCOC_{17}H_{33}$), and 2-butene-1,4-diol cetoleyl ($C_{21}H_{41}COOCH_2CH=CHCH_2OCOC_{21}H_{41}$).

Examples of triesters include caprylic acid triglyceride ($C_7H_{15}COOCH_2CH(OCOC_7H_{15})CH_2OCOC_7H_{15}$.

In addition to the above-described fatty acid esters and fatty acids, examples of additives which can be used include alcohols such as oleyl alcohol ($C_{18}H_{35}OH$), stearyl alcohol ($C_{18}H_{37}OH$), and lauryl alcohol ($C_{12}H_{25}OH$).

Examples of fatty acid amides include lauric acid amide ($C_{11}H_{23}CONH_2$), specifically lauric acid amide manufactured by Tokyo Kasei Co., Ltd., myristic acid amide ($C_{13}H_{27}CONH_2$), palmitic acid amide ($C_{15}H_{31}CONH_2$), oleic acid amide (cis-$C_8H_{17}CH=CH(CH_2)_7CONH_2$), specifically Armoslip CP-P (manufactured by Lion Akzo Co., Ltd.), erucic acid amide (cis-$C_8H_{17}CH=CH(CH_2)_{11}CONH_2$), specifically Armoslip E (manufactured by Lion Akzo Co., Ltd.), and stearic acid amide ($C_{17}H_{35}CONH_2$), specifically Armide HT (manufactured by Lion Akzo Co., Ltd.).

Examples of silicone compounds include TAV-3630, TA-3 and KF-69 (manufactured by Shin-Etsu Chemical Co., Ltd.).

Additionally, examples of other additives which may be used include nonionic surfactants such as alkylene oxides, glycerols, glycidols and alkylphenol-ethylene oxide adducts; cationic surfactants such as cyclic amines, ester amides, quaternary ammonium salts, hydantoin derivatives, heterocyclic compounds, phosphoniums and sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols, and alkylbetains. The details of these surfactants are described in *Handbook of Surfactants* (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

As described in Example 35 below, particularly preferred results of the present invention can be obtained when a monoester and a diester is used in combination as a fatty acid ester. The details are described below.

That is, the magnetic recording medium of the present invention is a high density and high capacity recording medium comprising a hyper-smooth magnetic layer and capable of obtaining stable running durability at initial stage of running and after running. Monoesters and diesters are conventionally used as a lubricant. The present inventors have earnestly examined characteristics of these lubricants aiming at ester groups. As a result of minute examination of behaviors of ester groups in the lower nonmagnetic layer and the magnetic layer, it has been found that as the monoester lubricant has one ester group, which is a polar group, in the molecule, the affinity with a binder is not so high, does not remain in the layer and is liable to come out on the surface of the magnetic layer. On the other hand, as the diester lubricant has two ester groups, which are polar groups, in the molecule, the affinity with a binder is high, is liable to remain in the layer and is reluctant to come out on the surface of the magnetic layer. Accordingly, it can be presumed that remarkably good running durability can be ensured by contribution of the monoester lubricant at the initial stage of running and by contribution of the diester lubricant after running. Further, the diester lubricant is excellent in low temperature durability and the monoester lubricant is excellent in high temperature durability. Therefore, when the diester lubricant and the monoester lubricant are used in combination, markedly excellent running durability of from low temperature to high temperature can be obtained. These effects are not merely obtained by the effect of the monoester lubricant plus the effect of the diester lubricant and it is thought to be synergistic effect of two lubricants.

A diester lubricant for use in the present invention is preferably represented by formula (1):

$$R1-COO-R2-OCO-R3 \tag{1}$$

wherein R2 represents —$(CH_2)_n$—, a divalent group derived from —$(CH_2)_n$— which may contain an unsaturated bond (wherein n represents an integer of from 1 to 12), —[$CH_2CH(CH_3)$]—, or —[$CH_2C(CH_3)_2CH_2$]—; R1 and R3, which may be the same or different, each represents a chain-like, saturated or unsaturated hydrocarbon group having from 12 to 30 carbon atoms.

Herein, "chain-like" of the chain-like hydrocarbon group may be straight chain or branched chain, but it is preferred that both R1 and R3 are straight and unsaturated, and particularly preferably R1 and R3 have the same structure. The unsaturated bond may be a double bond or a triple bond but a double bond is preferred and may be one, two or three. The double bond may be either cis or trans.

Carbon atoms of R1 and R3 are respectively from 12 to 30, preferably from 14 to 26, and more preferably from 14 to 20. If carbon atoms are less than 12, the lubricant becomes highly volatile and volatilizes from the surface of the magnetic layer during running, which sometimes leads to running stopping. While when carbon atoms are more than 30, as the mobility of the molecule becomes low, it is difficult for the lubricant to bleed out on the surface of the magnetic layer, which sometimes leads to durability failure.

The C/Fe peak ratio, which is described later, is preferably from 5 to 120, more preferably from 5 to 100, and particularly preferably from 5 to 80. To make the C/Fe peak ratio from 5 to 100, conditions of R1 and R3 are preferably as follows, that is, R1 and R3 are alkyl or alkenyl groups, which may be straight or branched but preferably these groups are groups containing unsaturated bonds which can be represented by C=C, and more preferably both groups have the same structure. R1 and R3 have carbon atoms of from 5 to 21, preferably from 7 to 17, and more preferably from 9 to 13. Too short carbon chain lengths of R1 and R3 are not preferred. If carbon chain length is too short, the lubricant becomes liable to volatilize, and if the lubricant is liable to volatilize, the lubricant volatilizes and the amount of the lubricant on the surface of the magnetic layer is reduced when the temperature of the magnetic layer becomes high by the frictional heat generated between the magnetic layer and the head. As a result, durability lowers. If carbon chain length is too long, the viscosity increases and the fluid lubrication performance lowers, as a result, the durability might be disadvantageously reduced.

R2 is preferably a straight chain divalent alcohol residue having OH groups on both terminals; and n is preferably from 3 to 12. If n is small, repeating running durability is deteriorated and, if too large, the viscosity increases and is hard to use as well as durability is liable to fail. Specifically, residues of ethylene glycol, neopentyl glycol, propanediol, propylene glycol and butanediol are preferably used.

The compound represented by formula (1) of the present invention is a diester of a diol represented by HO—R2—OH and an unsaturated fatty acid represented by R1—COOH or R3—COOH.

Examples of unsaturated fatty acids represented by R1—COOH or R3—COOH include straight chain unsaturated fatty acids, e.g., 4-dodecenoic acid, 5-dodecenoic acid, 11-dodecenoic acid, cis-9-tridecenoic acid, myristoleic acid, 5-myristoleic acid, 6-pentadecenoic acid, 7-palmitoleic acid, cis-9-palmitoleic acid, 7-heptadecenoic acid, oleic acid, elaidic acid, cis-6-octadecenoic acid, trans-11-octadecenoic acid, cis-11-eicosenoic acid, cis-13-docosenoic acid, 15-tetracosenoic acid, 17-hexacosenoic acid, cis-9-octadienoic acid, cis-12-octadienoic acid, trans-9-octadienoic acid, trans-12-octadienoic acid, cis-9-octadecatrienoic acid, trans-11-octadecatrienoic acid, trans-13-octadecatrienoic acid, cis-9-octadecatrienoic acid, cis-12-octadecatrienoic acid, cis-15-octadecatrienoic acid, and stearolic acid; and branched unsaturated fatty acids, e.g., 5-methyl-2-tridecenoic acid, 2-methyl-9-octadecenoic acid, 2-methyl-2-eicosenoic acid, and 2,2-dimethyl-11-eicosenoic acid.

Examples of diols represented by HO—R2—OH include straight saturated terminal diols, e.g., ethylene glycol, trimethylene glycol, 1,4-butanediol, 1,5-pentanediol, 1,6-hexanediol, 1,7-pentanediol, 1,8-octanediol, 1,9-nonanediol, and 1,10-decanediol; branched saturated diols, e.g., propylene glycol, 1,2-butanediol, 1,3-butanediol, 2,4-pentanediol, 2,2-dimethyl-1,3-propanediol, 2,5-hexanediol, 2-ethyl-1,3-hexanediol, 3-methyl-1,6-hexanediol, 1-methyl-1,7-pentanediol, 2,6-dimethyl-1,7-pentanediol, and 1-methyl-1,8-nonanediol; straight unsaturated diols, e.g., 2-butene-1,4-diol, 2,4-hexadiene-1,6-dienediol, and 3-pentene-1,7-diol; and branched unsaturated diols, e.g., 2-methyl-2-butene-1,4-diol, 2,3-dimethyl-2-butene-1,4-diol, and 2,6-dimethyl-3-hexene-1,6-diol.

Of these, particularly preferred compounds according to the present invention are straight chain unsaturated fatty acid esters. Specifically, esters of straight chain unsaturated fatty acids, e.g., myristoleic acid, 5-myristoleic acid, 7-palmitoleic acid, cis-9-palmitoleic acid, oleic acid, elaidic acid, cis-6-octadecenoic acid (petroselinic acid), trans-6-octadecenoic acid (petroseelaidic acid), trans-11-octadecenoic acid (vaccenic acid), cis-11-eicosenoic acid, cis-13-docosenoic acid (erucic acid), cis-9-octadienoic acid, cis-12-octadienoic acid (linoleic acid), etc., and diethylene glycol, trimethylene glycol, 1,4-butanediol, 1,5-pentanediol, 1,6-hexanediol, 1,7-pentanediol, 1,8-octanediol, 1,9-nonanediol, or 1,10-decanediol; more preferably esters of the above straight chain unsaturated fatty acids and 1,4-butanediol, 1,5-pentanediol, 1,6-hexanediol, 1,7-pentanediol, 1,8-octanediol, 1,9-nonanediol, or 1,10-decanediol. Specifically, neopentyl glycol didecanoate, ethylene glycol dioleyl, and diesters shown below can be exemplified. Examples of diesters are as follows.

L-a1: $C_{17}H_{35}COO(CH_2)_4OCOC_{17}H_{35}$
L-a2: $C_{11}H_{21}COO(CH_2)_4OCOC_{11}H_{21}$
L-a3: $C_{17}H_{33}COO(CH_2)_2OCOC_{17}H_{33}$
L-a4: $C_{11}H_{23}COO(CH_2)_4OCOC_{11}H_{23}$
L-a5: $C_{27}H_{53}COO(CH_2)_4OCOC_{27}H_{53}$
L-a6: $C_{11}H_{21}COO(CH_2)_4OCOC_{17}H_{33}$
L-a7: $C_{17}H_{33}COO(CH_2)_{11}OCOC_{17}H_{33}$
L-a8: $C_{17}H_{33}COOCH_2CH=CHCH_2OCOC_{17}H_{33}$
L-a9: $C_{14}H_{27}COOCH_2CH=CHCH_2OCOC_{14}H_{27}$
L-a10: $C_{17}H_{33}COO(CH_2)_8OCOC_{14}H_{27}$

Diesters of dicarboxylic acids and chain-like unsaturated alcohols may also be used.

Specific examples of dicarboxylic acids include saturated dicarboxylic acids, e.g., malonic acid, succinic acid, glutaric acid, adipic acid, pimelic acid, suberic acid, azelaic acid, sebacic acid, methylmalonic acid, ethylmalonic acid, propylmalonic acid, and butylmalonic acid; and unsaturated dicarboxylic acids, e.g., maleic acid, fumaric acid, glutaconic acid, itaconic acid, and muconic acid.

Specific examples of chain-like unsaturated alcohols include cis-9-octadecen-1-ol (oleyl alcohol), trans-9-octadecen-1-ol (elaidyl alcohol), 9,10-octadecedien-1-ol (linoleyl alcohol), 9,12,15-octadecetrien-1-ol (linolenyl alcohol), cis-9-trans-11,13-octadecetrien-1-ol (eleostearyl alcohol), 2-pentadecen-1-ol, 2-hexadecen-1-ol, 2-heptadecen-1-ol, 2-octadecen-1-ol, and 15-hexadecen-1-ol.

Of the above, particularly preferred compounds according to the present invention are esters of straight unsaturated alcohols and saturated dicarboxylic acids. Specifically, preferred compounds are diesters of, as the alcohol ingredient, oleyl alcohol, elaidyl alcohol, linoleyl alcohol, linolenyl alcohol, or eleostearyl alcohol, and as the dicarboxylic acid ingredient, malonic acid, succinic acid, glutaric acid, adipic acid, methylmalonic acid, ethylmalonic acid, propylmalonic acid, or butylmalonic acid, and more preferred are diesters of malonic acid or succinic acid, with oleyl alcohol, elaidyl alcohol, linoleyl alcohol, or linolenyl alcohol.

Preferred examples of diesters for obtaining C/Fe peak ratio, which is described later, of from 5 to 100 include neopentyl glycol dioleate (L-a11), ethylene glycol dioleate (L-a3), neopentyl glycol didecanoate (L-a12), and propanediol dimyristate (L-a13). In addition to these, the following compounds can be exemplified.

$C_5H_{11}COOCH_2C(CH_3)_2CH_2OCOC_5H_{11}$
$C_7H_{15}COOCH_2C(CH_3)_2CH_2OCOC_7H_{15}$
$C_9H_{19}COOCH_2C(CH_3)_2CH_2OCOC_9H_{19}$
$C_{11}H_{23}COOCH_2C(CH_3)_2CH_2OCOC_{11}H_{23}$
$C_{13}H_{27}COOCH_2C(CH_3)_2CH_2OCOC_{13}H_{27}$
$C_{17}H_{35}COOCH_2C(CH_3)_2CH_2OCOC_{17}H_{35}$
$C_{21}H_{43}COOCH_2C(CH_3)_2CH_2OCOC_{21}H_{43}$
$C_4H_7COOCH_2C(CH_3)_2CH_2OCOC_4H_7$
$C_{22}H_{45}COOCH_2C(CH_3)_2CH_2OCOC_{22}H_{45}$
$C_{17}H_{35}COOCH_2C(CH_3)_2CH_2OCOC_{13}H_{27}$

A monoester lubricant for use in the present invention is preferably represented by formula (2) or (3):

$$R4—COO—(R5—O)_m—R6 \quad (2)$$

$$R7—COO—R8 \quad (3)$$

wherein m represents an integer of from 1 to 10; R5 represents —$(CH_2)_n$—, or a divalent group derived from —$(CH_2)_n$— which may contain an unsaturated bond (wherein n represents an integer of from 1 to 10); R4 and R7, which may be the same or different, each represents a chain-like, saturated or unsaturated hydrocarbon group having from 12 to 26 carbon atoms; and R6 and R8, which may be the same or different, each represents a chain-like or branched, saturated or unsaturated hydrocarbon group having from 1 to 26 carbon atoms.

Monofatty acid esters comprising a monobasic fatty acid having from 10 to 24 carbon atoms (which may contain an unsaturated bond or may be branched) and a monovalent alcohol having from 2 to 24 carbon atoms (which may contain an unsaturated bond or may be branched) may be used.

Specific examples of monoesters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, and oleyl erucate.

In addition to the above compounds, as is well known, as disclosed in JP-B-51-39081, monoesters of saturated and unsaturated fatty acids and alcohols, and oleyl oleate as a fatty acid monoester having an unsaturated bond, as disclosed in JP-B-4-4917, can also be used. Specific examples of monoesters are shown below.

L-b1: $C_{17}H_{35}COOC_{17}H_{35}$
L-b2: $C_{17}H_{35}COOC_4H_9$

L-b3: $C_{17}H_{35}COOCH_2CH_2OC_4H_9$
L-b4: $C_{17}H_{35}COO(CH_2CH_2O)_2C_4H_9$

Ester lubricants which are used in the present invention are added to the upper magnetic layer in an amount of 1 weight part or more, preferably 3 weight parts or more, and more preferably 5 weight parts or more, per 100 weight parts of the ferromagnetic metal powder contained in the upper magnetic layer, and to the lower nonmagnetic layer in an amount of 1 weight part or more, preferably 3 weight parts or more, and more preferably 5 weight parts or more, per 100 weight parts of the nonmagnetic powder contained in the lower layer. Ester lubricants are preferably added to both of the upper layer and the lower layer. The upper limit of the eaddition amount is 20% with each layer. Too much an amount coarsens the magnetic layer surface thereby the magnetic characteristics lowers, and too small an amount deteriorates the durability. Diester lubricants and ester lubricants are contained in an amount of from 3 to 30 weight parts, preferably from 5 to 20 weight parts, per 100 weight parts of the ferromagnetic powder contained in the magnetic layer or per 100 weight parts of the nonmagnetic powder contained in the lower layer. Diester lubricants and ester lubricants may be used in admixture. In this case, the proportion of diester lubricants is preferably 30% or more based on the total amount of the diester and ester lubricants.

Further, the present invention is a magnetic recording medium which comprises a support having thereon a substantially nonmagnetic lower layer and a magnetic layer comprising a ferromagnetic metal powder dispersed in a binder provided on the lower layer, wherein the magnetic layer contains from 3 to 30 weight parts, preferably from 5 to 20 weight parts, of a fatty acid ester per 100 weight parts of the ferromagnetic metal powder and/or the nonmagnetic lower layer contains from 3 to 30 weight parts, preferably from 5 to 20 weight parts, of a fatty acid ester per 100 weight parts of the nonmagnetic powder contained in the lower layer, the surface of the magnetic layer has a C/Fe peak ratio of from 5 to 120, preferably from 5 to 100, and more preferably from 5 to 80, when the surface is measured by the Auger electron spectroscopy, and the magnetic recording medium is a disc-like medium. Although the amount of the ester or diester lubricant contained in the magnetic layer and the lower layer is almost the same with that of conventional floppy discs, extremely high durability, high hardness of the magnetic layer surface and high scratch resistance can be ensured by the construction of the present invention by suppressing the amount of the lubricant existing on the magnetic layer surface within a low value. It has been found that the magnetic recording medium according to the present invention has achieved conspicuous durability above all in a high rotation recording system of 1,800 rpm or more (e.g., ZIP), in particular, 3,000 rpm or more (e.g., HiFD®).

The C/Fe peak ratio of the magnetic layer surface by the Auger electron spectroscopy in the present invention is an index which shows the existing amount of the lubricant on the magnetic layer surface.

This is a method making use of a principle of determination of the amount of the element from the amount of Auger electron beam by applying electron beam to the sample and deciding the kind of element from the kinetic energy of Auger electron coming from the sample.

When the magnetic layer surface is spectrally analyzed by the Auger electron spectroscopy, the peak of iron atom coming from the magnetic powder and the peak of carbon atom coming from the binder and the lubricant appear. However, the carbon atom peak mostly originates in the lubricant. The basis for this is the fact that when the magnetic layer surface of the magnetic disc of the present invention is determined by the Auger electron spectroscopy with the lubricant of the present invention being removed by hexane treatment, Fe peak appears strongly but C peak to which the binder contributes to is weak; on the contrary, when the determination is conducted without subjecting to hexane treatment, C peak appears strongly. That is, when the magnetic layer surface is spectrally analyzed by the Auger electron spectroscopy, the peak of iron atom coming from the magnetic powder and the peak of carbon atom coming from the binder and the lubricant appear, however, the carbon atom peak can be considered to mostly originate in the lubricant according to the present invention.

In the present invention, determination of the C/Fe peak by the Auger electron spectroscopy is conducted as follows. Apparatus: PHI-660 type manufactured by Φ Co. Conditions of determination:

Primary electron beam, accelerating voltage: 3 KV
Electric current of sample: 130 nA
Magnification: 250-fold
Inclination angle: 30°

The value of C/Fe peak is obtained as the C/Fe ratio by integrating the values obtained under the above conditions in the region of kinetic energy of 130 eV to 730 eV three times and finding the strengths of KLL peak of the carbon and LMM peak of the iron as differentials.

The C/Fe peak ratio of the magnetic layer surface of the disc-like magnetic recording medium according to the present invention determined by the Auger electron spectroscopy is preferably from 5 to 100, particularly preferably from 5 to 80. On the contrary, C/Fe peak ratios of conventional floppy discs are 100 or more. From this fact, it can be seen that the amount of the lubricant present on the magnetic layer surface of the disc-like magnetic recording medium according to the present invention is markedly small as compared with the amount in conventional floppy discs.

On the other hand, the amount of the lubricants contained in each of the magnetic layer and the lower layer of the disc-like magnetic recording medium according to the present invention is from 5 to 30 weight parts respectively per 100 weight parts of the ferromagnetic powder or nonmagnetic powder. This is almost the same amount as the amount contained in conventional floppy discs.

Accordingly, although the amount of the lubricant contained in the magnetic layer and the lower layer of the disc-like magnetic recording medium according to the present invention is almost the same with that of conventional floppy discs, the amount of the lubricant present on the magnetic layer surface is markedly small as compared with the amount in conventional floppy discs.

Conventional floppy discs have drawbacks such that if the amount of a lubricant is increased to improve durability, the amount of the lubricant on the surface increases, as a result, the magnetic layer surface adheres to the magnetic head at still time and the starting torque becomes large. If the amount of the lubricant is reduced to lower the starting torque, friction coefficient increases and durability is deteriorated. These drawbacks are more conspicuous by high rotation driving for high density recording.

Although the amount of the ester or diester lubricant contained in the magnetic layer and the lower layer of the disc-like magnetic recording medium according to the present invention is almost the same with that of conventional floppy discs, extremely high durability, high hardness of the magnetic layer surface and high scratch resistance can be ensured by suppressing the amount of the lubricant existing on the magnetic layer surface within a low value.

Above all, the magnetic recording medium according to the present invention has achieved conspicuous durability in a high rotation recording system of 1,800 rpm or more (e.g., ZIP), in particular, 3,000 rpm or more (e.g., HiFD®).

Moreover, as a large amount of lubricant is contained in the inside of the magnetic layer and the lower layer and it comes out on the surface gradually and exhibits lubricating function, the magnetic recording medium of the present invention is excellent in long term storage stability.

To realize the existing mode of the lubricant according to the present invention, i.e., a large amount of lubricant is contained in the inside of the magnetic layer and the lower layer and an appropriate amount is present on the magnetic layer surface (preferably from 5 to 100, particularly preferably from 5 to 80, in terms of C/Fe value obtained mainly from the detected amount of the carbon atom of the lubricant and the iron atom of the magnetic powder by the Auger electron spectroscopy), the following means can be exemplified.

1. The lubricant comprises ester compounds and diester compounds, in particular, diester compounds having an unsaturated C=C bond, and ester compounds have affinity with the binder and the surface of the nonmagnetic powder and preferred. The amount of the lubricant in each layer is from 3 to 30 weight parts per 100 weight parts of the ferromagnetic powder and the nonmagnetic powder, respectively.
2. It is preferred that the amount of the binder in the lower layer is larger than the amount contained in the upper magnetic layer, i.e., the amount of the binder including the curing agent contained in the magnetic layer is from 10 to 25 weight parts per 100 weight parts of the ferromagnetic powder and the amount of the binder contained in the lower layer is from 25 to 40 weight parts per 100 weight parts of the nonmagnetic powder.
3. The binder for the lower layer particularly preferably comprises the structure having a strong polar group such as $SO_3Na$ and the skeleton containing many aromatic rings, thereby the affinity of the lubricant with the lower layer binder increases and much lubricant can be present in the lower layer stably. If the affinity of the lubricant with the binder is too high and the binder is completely compatible with the lubricant at the molecular level, the lubricant disadvantageously cannot migrate to the upper layer.

On the surface of the disc-like recording medium of the present invention, ester and diester compounds exist in sufficient amount, although the amount thereof is not more than the amount contained in conventional discs. Therefore, if the temperature increases due to the frictional heat between the disc and the magnetic head generated by high rotation, the lubricant is difficult to volatilize by virtue of strong intermolecular interaction. Accordingly, stable fluid lubrication can be maintained without causing breaking of a lubricant film.

In the present invention, the storage stability of the magnetic recording medium at high temperature and high humidity can be improved when the Al/Fe ratio of the ferromagnetic metal powder is from 1.5 atomic % to 30 atomic %. A diester compound is originally highly hydrophilic and hygroscopic and is susceptible to hydrolysis in nature. This property is heightened by the catalytic activity of surfaces of magnetic powders, and when stored at high temperature high humidity, diester is further susceptible to hydrolysis. When the Al/Fe ratio of the ferromagnetic metal powder is in the range of from 1.5 atomic % to 30 atomic %, the influence is small and insusceptible to decomposition. As a result, the durability of the disc is hardly reduced and characteristics of the disc can be exhibited even after being stored under high temperature and high humidity conditions.

Lubricants and surfactants for use in the present invention respectively have different physical functions. The kinds, amounts and proportions of combination generating synergistic effect of these lubricants should be determined optimally in accordance with the purpose. The nonmagnetic layer and the magnetic layer can separately contain different fatty acids each having a different melting point so as to control bleeding out of the fatty acids to the surface, or different esters each having a different boiling point, a different melting point or a different polarity so as to control bleeding out of the esters to the surface. Also, the amounts of surfactants are controlled so as to improve the coating stability, or the amount of the lubricant in the lower layer is made larger than the amount in the magnetic layer so as to improve the lubricating effect of the surface thereof. Examples are by no means limited thereto. In general, the total amount of the lubricants is from 0.1 to 50% by weight, preferably from 2 to 25% by weight, based on the weight of the magnetic powder or the nonmagnetic powder.

All or a part of the additives to be used in the present invention may be added to the magnetic coating solution or the nonmagnetic coating solution in any step of the preparation. For example, additives may be blended with the magnetic powder before the kneading step, may be added during the step of kneading the magnetic powder, the binder and the solvent, may be added during the dispersing step, may be added after the dispersing step, or may be added just before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment or after the completion of slitting.

Layer Construction

The thickness of the nonmagnetic support in the magnetic recording medium of the present invention is, for example, from 2 to 100 $\mu$m, preferably from 2 to 80 $\mu$m. Particularly, the thickness of the nonmagnetic support for a computer tape is from 3.0 to 6.5 $\mu$m, preferably from 3.0 to 6.0 $\mu$m, and more preferably from 4.0 to 5.5 $\mu$m.

An undercoating layer (or a subbing layer) may be provided between the support, preferably a nonmagnetic flexible support, and the nonmagnetic or magnetic layer for adhesion improvement. The thickness of this undercoating layer is from 0.01 to 0.5 $\mu$m, preferably from 0.02 to 0.5 $\mu$m. The nonmagnetic layer and the magnetic layer of the disc-like magnetic recording medium according to the present invention may be provided on both surface sides of the support or may be provided on either one surface side. When the nonmagnetic layer and the magnetic layer are provided on only one surface side of the support, a back coating layer may be provided on the surface side of the support opposite to the side having the nonmagnetic layer and magnetic layer for the purpose of static charge prevention and curling correction. The thickness of this back coating layer is from 0.1 to 4 $\mu$m, preferably from 0.3 to 2.0 $\mu$m. Well-known undercoating layers and back coating layers can be used for this purpose.

The thickness of the magnetic layer of the magnetic recording medium of the present invention can be optimally selected according to the saturation magnetization amount of the head used, the head gap length, and the recording signal zone, and is generally from 0.05 to 0.5 $\mu$m, preferably from 0.05 to 0.30 μm. The magnetic layer may comprise two or more layers each having different magnetic characteristics and well-known multilayer magnetic layer constitutions can be applied to the present invention.

The thickness of the lower nonmagnetic layer of the medium according to the present invention is generally from 0.2 to 5.0 μm, preferably from 0.3 to 3.0 μm, and more preferably from 1.0 to 2.5 μm. The lower layer of the magnetic recording medium of the present invention exhibits the effect of the present invention so long as it is substantially a nonmagnetic layer even if, or intendedly, it contains a small amount of a magnetic powder as an impurity, which is as a matter of course regarded as essentially the same construction as in the present invention. The term "substantially a nonmagnetic layer" means that the residual magnetic flux density of the lower layer is 100 G (Gauss) or less and the coercive force of the lower layer is 100 Oe or less, preferably the residual magnetic flux density and the coercive force are zero. If the lower layer contains a magnetic powder, the content of the magnetic layer is preferably less than ½ of the entire inorganic powder contained in the lower layer.

Back Coating Layer

In general, a magnetic tape for a computer data recording is decidedly required to have an excellent repeating-running property as compared with a video tape and an audio tape. For maintaining such a high running durability, it is preferred for the back coating layer to contain a carbon black and an inorganic powder.

Two kinds of carbon blacks respectively having different average particle sizes are preferably used in combination. In this case, a combined use of a fine carbon black having an average particle size of from 10 to 20 nm and a coarse carbon black having an average particle size of from 230 to 300 nm is preferred. In general, by the incorporation of a fine carbon black as above, the surface electrical resistance of the back coating layer and light transmittance can be set up at low values. There are many kinds of magnetic recording apparatuses making use of light transmittance of a tape and making it as signals of operation, therefore, the addition of fine carbon blacks are particularly effective in such a case. In addition, a fine carbon black is in general excellent in retention of a liquid lubricant and contributes to the reduction of a friction coefficient when a lubricant is used in combination. On the other hand, a coarse carbon black having an average particle size of from 230 to 300 nm has a function as a solid lubricant and forms minute protrusions on the surface of a back coating layer to reduce the contact area and contributes to the reduction of a friction coefficient. However, a coarse carbon black has a drawback such that particles are liable to drop out from the back coating layer due to the tape sliding during severe running leading to the increase of the error rate.

Specific examples of fine carbon blacks commercially available include RAVEN 2000B (average particle size: 18 nm) and RAVEN 1500B (average particle size: 17 nm) (manufactured by Columbia Carbon Co., Ltd.), BP800 (average particle size: 17 nm) (manufactured by Cabot Co., Ltd.), PRINTEX90 (average particle size: 14 nm), PRINTEX85 (average particle size:. 15 nm), PRINTEX75 (average particle size: 16 nm), PRINTEX75 (average particle size: 17 nm) (manufactured by Degussa Co., Ltd.), and #3950 (average particle size: 16 nm) (manufactured by Mitsubishi Kasei Corp.).

Specific examples of coarse carbon blacks commercially available include THERMAL BLACK (average particle size: 270 nm) (manufactured by Cancarb Co., Ltd.) and RAVEN MTP (average particle size: 275 nm) (manufactured by Columbia Carbon Co., Ltd.).

When two kinds of carbon blacks respectively having different average particle sizes are used in combination in a back coating layer, the proportion of the contents (by weight) of a fine carbon black having a particle size of from 10 to 20 nm and a coarse carbon black having a particle size of from 230 to 300 nm is preferably the former/the latter of from 98/2 to 75/25, more preferably from 95/5 to 85/15.

The content of the carbon black in a back coating layer (the total amount when two kinds are used) is generally from 30 to 80 weight parts, preferably from 45 to 65 weight parts, based on 100 weight parts of the binder.

It is preferred to use two kinds of inorganic powders respectively having different hardness.

Specifically, a soft inorganic powder having a Mohs' hardness of from 3 to 4.5 and a hard inorganic powder having a Mohs' hardness of from 5 to 9 are preferably used in combination.

By the addition of a soft inorganic powder having a Mohs' hardness of from 3 to 4.5, a friction coefficient can be stabilized against repeating-running. Moreover, a sliding guide pole is not scratched off in hardness within this range. The average particle size of such a soft inorganic powder is preferably from 30 to 50 nm.

Examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. They can be used alone or in combination of two or more. Of these, calcium carbonate is particularly preferred.

The content of the soft inorganic powder in a back coating layer is preferably from 10 to 140 weight parts, more preferably from 35 to 100 weight parts, based on 100 weight parts of the carbon black.

By the addition of a hard inorganic powder having a Mohs' hardness of from 5 to 9, the strength of the back coating layer is increased and running durability is improved. When such hard inorganic powders are used together with carbon blacks and the above-described soft inorganic powders, deterioration due to repeating sliding is reduced and strong back coating layer can be obtained. Appropriate abrasive capability is imparted to the back coating layer by the addition of the hard inorganic powder and the adhesion of scratched powders to a tape guide pole is reduced. In particular, when the hard inorganic powder is used in combination with a soft inorganic powder (in particular, calcium carbonate), sliding characteristics against a guide pole having a rough surface is improved and the stabilization of a friction coefficient of the back coating layer can also be brought about.

The average particle size of hard inorganic powders is preferably from 80 to 250 nm, more preferably from 100 to 210 nm.

Examples of hard inorganic powders having a Mohs' hardness of from 5 to 9 include, e.g., α-iron oxide, α-alumina, and chromium oxide ($Cr_2O_3$). These powders may be used alone or in combination. Of the above, α-iron oxide and α-alumina are preferred. The content of hard inorganic powders in the back coating layer is generally from 3 to 30 weight parts, preferably from 3 to 20 weight parts, based on 100 weight parts of the carbon black.

When the above soft inorganic powder and hard inorganic powder are used in combination in the back coating layer, it is preferred to use them selectively such that the difference of hardness between soft and hard inorganic powders is 2 or more, more preferably 2.5 or more, and particularly preferably 3 or more.

It is preferred that the above-described two kinds of inorganic powders respectively having different hardness and specific average particle sizes and the above-described two kinds of carbon blacks respectively having different specific average particle sizes are contained in the back coating layer. In particular, in this combination, calcium carbonate is preferably contained as a soft inorganic powder.

Lubricants may be contained in the back coating layer. Lubricants can be arbitrarily selected from those which can be used in a magnetic layer or a nonmagnetic layer as described above. The content of lubricants added to the back coating layer is generally from 1 to 5 weight parts based on 100 weight parts of the binder.

Support

The support for use in the present invention is preferably a nonmagnetic flexible support, and essentially has a thermal shrinkage factor of preferably 0.5% or less, more preferably 0.2% or less, both at 100° C. for 30 minutes and at 80° C. for 30 minutes in every direction of in-plane of the support. Moreover, the above-described thermal shrinkage factors of the support at 100° C. for 30 minutes and at 80° C. for 30 minutes are preferably almost equal in every direction of in-plane of the support with difference of not more than 10%. The support is preferably a nonmagnetic support. As a nonmagnetic support for use in the present invention, well-known films such as polyesters (e.g., polyethylene terephthalate or polyethylene naphthalate), polyolefins, cellulose triacetate, polycarbonate, polyamide, polyimide, polyamideimide, polysulfone, polyaramide, aromatic polyamide, or polybenzoxazole can be used. Highly strong supports such as polyethylene naphthalate or polyamide are preferably used. If necessary, a lamination type support as disclosed in JP-A-3-224127 can be used to vary the surface roughnesses of the magnetic layer surface and the base surface. The support may be previously subjected to surface treatments, such as a corona discharge treatment, a plasma treatment, an adhesion assisting treatment, a heat treatment, and a dust removing treatment. Aluminum or glass substrate can also be used as a support in the present invention.

For attaining the object of the present invention, it is necessary to use the support having a central plane average surface roughness (SRa) of 4.0 nm or less, preferably 2.0 nm or less, measured by a surface roughness meter "TOPO-3D" (a product of WYKO Co., Ltd., U.S.A.) by MIRAU method. It is preferred that the nonmagnetic support not only has a small central plane average surface roughness but also is free from coarse protrusions (having a height) of 0.5 $\mu$m or more. Surface roughness configuration is freely controlled by the size and the amount of fillers added to the support. Examples of such fillers include acryl-based organic powders, as well as oxides or carbonates of Ca, Si and Ti. The support for use in the present invention preferably has the maximum height (SRmax) of 1 $\mu$m or less, ten point average roughness (SRz) of 0.5 $\mu$m or less, central plane peak height (SRp) of 0.5 $\mu$m or less, central plane valley depth (SRv) of 0.5 $\mu$m or less, central plane area factor (SSr) of from 10% to 90%, and average wavelength (S$\lambda$a) of from 5 $\mu$m to 300 $\mu$m. For obtaining desired electromagnetic characteristics and durability, surface protrusion distribution of the support can be controlled arbitrarily by fillers, e.g., the number of protrusions having sizes of from 0.01 $\mu$m to 1 $\mu$m can be controlled each within the range of from 0 to 2,000 per 0.1 mm$^2$.

The F-5 value of the support for use in the present invention is preferably from 5 to 50 kg/mm$^2$, a thermal shrinkage factor of the support at 100° C. for 30 minutes is preferably 3% or less, more preferably 1.5% or less, and a thermal shrinkage factor at 80° C. for 30 minutes is preferably 1% or less, more preferably 0.5% or less. The support has a breaking strength of from 5 to 100 kg/mm$^2$, an elastic modulus of from 100 to 2,000 kg/mm$^2$, a temperature expansion coefficient of from $10^{-4}$ to $10^{-8}$/° C., preferably from $10^{-5}$ to $10^{-6}$ /° C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of the support with difference of not more than 10%.

Producing Method

Processes of preparing the magnetic coating solution for use in the magnetic recording medium of the present invention comprises at least a kneading step, a dispersing step and, optionally, blending steps to be carried out before and/or after the kneading and dispersing steps. Any of these respective steps may be composed of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventionally well-known techniques. Powerful kneading machines such as an open kneader, a continuous kneader, a pressure kneader or an extruder are preferably used in a kneading step. When a kneader is used, all or a part of the binder (preferably 30% or more of the total binders) are kneading-treated in the range of from 15 parts to 500 parts per 100 parts of the magnetic powder or nonmagnetic powder together with a magnetic powder or a nonmagnetic powder. Details of these kneading are disclosed in JP-A-1-106338 and JP-A-1-79274. When dispersing a magnetic layer solution and a nonmagnetic layer solution, glass beads can be used but dispersing media having a high specific gravity is preferably used and zirconia beads, titania beads and steel beads are suitable for this purpose. Optimal particle size and packing density of these dispersing media should be selected. Well-known dispersing apparatuses can be used in the present invention.

The following methods are preferably used for coating the magnetic recording medium having a multilayer construction of the present invention. As the first method, the lower layer is coated by any of gravure coating, roll coating, blade coating, and extrusion coating apparatuses, which are ordinarily used in the coating of a magnetic coating solution, and the upper layer is coated while the lower layer is still wet by means of the support pressing type extrusion coating apparatus disclosed in JP-B-1-46186, JP-A-60-238179 and JP-A-2-265672. As the second method, the upper layer and the lower layer are coated almost simultaneously using the coating head equipped with two slits for feeding coating solution as disclosed in JP-A-63-88080, JP-A-2-17971 and JP-A-2-265672. And as the third method, the upper layer and the lower layer are coated almost simultaneously using the extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in the coating head by the methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, successive multilayer coating method in which the magnetic layer is coated on the lower layer after the lower layer has been coated and dried can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without conducting orientation using orientating apparatus, but it is preferred to use well-known random orientation apparatuses, such as disposing cobalt magnets diagonally and alternately or applying an alternating current magnetic field using a solenoid. Isotropic orientation in a ferromagnetic metal fine powder is in general preferably in-plane two dimensional random orientation, but it may be three dimensional random orientation having vertical components. Hexagonal ferrites in general have an inclination for three dimensional random orientation of in-plane and in the vertical direction but it can be made in-plane two dimensional random orientation. Further, it is possible to impart isotropic magnetic characteristics in the circumferential direction by vertical orientation using well-known methods, e.g., using different pole and counter position magnets. In particular, vertical orientation is preferred when the disc is used in high density recording. Circumferential orientation can be conducted using spin coating.

In the case of a magnetic tape, orientation is conducted in the machine direction using a cobalt magnet and a solenoid. In orientation, it is preferred that the drying position of the coated film can be controlled by controlling the temperature and the amount of drying air and coating rate. Coating rate is preferably from 20 to 1,000 m/min. and the temperature of drying air is preferably 60° C. or more. Preliminary drying can be performed appropriately before entering the magnet zone.

Use of heat resisting plastic rolls such as epoxy, polyimide, polyamide and polyimideamide, or metal rolls is effective for calendering treatment. Metal rolls are usable for the treatment particularly when magnetic layers are coated on both surface sides. Treatment temperature is preferably 50° C. or more, more preferably 100° C. or more. Line pressure is preferably 200 kg/cm or more, more preferably 300 kg/cm or more.

Physical Properties

Saturation magnetic flux density of the magnetic layer of the magnetic recording medium according to the present invention is from 2,000 to 5,000 G when a ferromagnetic metal powder is used, and from 1,000 to 3,000 G when a hexagonal ferrite powder is used. Coercive force (Hc) and (Hr) are from 1,800 to 5,000 Oe, preferably from 1,800 to 3,000 Oe. Coercive force distribution is preferably narrow, and SFD and SFDr are preferably 0.6 or less. Squareness ratio is from 0.55 to 0.67, preferably from 0.58 to 0.64, in the case of two dimensional random orientation, from 0.45 to 0.55 in the case of three dimensional random orientation, and in the case of vertical orientation, 0.6 or more, preferably 0.7 or more in the vertical direction, and when diamagnetical correction is conducted, 0.7 or more, preferably 0.8 or more. Orientation ratio of two dimensional random orientation and three dimensional random orientation is preferably 0.8 or more. In the case of two dimensional random orientation, squareness ratio, Br, Hc and Hr in the vertical direction are preferably from 0.1 to 0.5 times of those in the in-plane direction.

In the case of a magnetic tape, squareness ratio is 0.7 or more, preferably 0.8 or more.

The friction coefficient of the magnetic recording medium according to the present invention against a head at temperature of −10° C. to 40° C. and humidity of 0% to 95% is 0.5 or less, preferably 0.3 or less, the surface inherent resistivity of the magnetic surface is preferably from $10^4$ to $10^{12}$ Ω/sq, the charge potential is preferably from −500 V to +500 V, the elastic modulus at 0.5% elongation of the magnetic layer is preferably from 100 to 2,000 kg/mm² in every direction of in-plane, the breaking strength is preferably from 10 to 70 kg/mm², the elastic modulus of the magnetic recording medium is preferably from 100 to 1,500 kg/mm² in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic visco-elasticity measurement at 110 Hz) is preferably from 50° C. to 120° C., and that of the lower nonmagnetic layer is preferably from 0° C. to 100° C. The elastic modulus loss is preferably within the range of from $1 \times 10^6$ to $8 \times 10^9$ dyne/cm², and loss tangent is preferably 0.2 or less. If loss tangent is too large, adhesion failure is liable to occur. These thermal and mechanical characteristics are preferably almost equal in every direction of in-plane of the medium with difference of not more than 10%. The residual amount of the solvent in the magnetic layer is preferably 100 mg/m² or less, more preferably 10 mg/m$^{-2}$ or less. The void ratio of the coated layer is preferably 30% by volume or less, more preferably 20% by volume or less, with both of the lower nonmagnetic layer and the magnetic layer. The void ratio is preferably smaller for obtaining high output but in some cases a specific value should be preferably secured depending on purposes. For example, in a disc-like medium which is repeatedly used, large void ratio contributes to good running durability in many cases.

The magnetic layer has a central plane average surface roughness (Ra) of 5.0 nm or less, preferably 4.0 nm or less, and more preferably 3.5 nm or less, measured by a surface roughness meter "TOPO-3D" (a product of WYKO Co., Ltd., U.S.A.) by MIRAU method. The magnetic layer for use in the present invention preferably has the maximum height (SRmax) of 0.5 μm or less, ten point average roughness (SRz) of 0.3 μm or less, central plane peak height (SRp) of 0.3 μm or less, central plane valley depth (SRv) of 0.3 μm or less, central plane area factor (SSr) of from 20% to 80%, and average wavelength (SλA) of from 5 μm to 300 μm. For obtaining desired electromagnetic characteristics and a friction coefficient, a number of surface protrusion of the magnetic layer of sizes (i.e., height) of from 0.01 μm to 1 μm can be controlled arbitrarily within the range of from 0 to 2,000 by controlling the surface property by fillers in the support, the particle size and the amount of the magnetic powders added to the magnetic layer, or by the surface shape of rolls of calender treatment. The range of curling is preferably within ±3 mm. It can be easily presumed that these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

The present invention will be described in detail below with reference to specific examples, but it should not be construed as being limited thereto. In the examples, "part" means "weight part" unless otherwise indicated.

Examples 1 to 34, Comparative Examples 1 and 2 and Reference Examples 1 and 2

Preparation of Coating Solution

Magnetic Coating Solution: ML-1 (acicular magnetic powder was used)

| | |
|---|---|
| Ferromagnetic metal powder: M-1 | 100 parts |
| Composition: Co/Fe (atomic ratio), 30% | |
| Hc: 2,550 Oe | |
| Specific surface area: 55 m$^2$/g | |
| $\sigma_s$: 140 emu/g | |
| Crystallite size: 120 Å | |
| Long axis length: 0.048 μm | |
| Acicular ratio: 4 | |
| Al compound (Al/Fe, atomic ratio: 8%) | |
| Y compound (Y/Fe, atomic ratio: 6%) | |
| Vinyl chloride copolymer | 12 parts |
| MR110 (manufactured by Nippon Zeon Co., .Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Average particle size: 0.20 μm | |
| Specific surface area: 8.0 to 9.0 m$^2$/g | |
| Mohs' hardness: 9 | |
| pH: 7.7 to 9.0 | |
| Carbon black | 5 parts |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

Magnetic Coating Solution: ML-2 (acicular magnetic powder was used)

| | |
|---|---|
| Ferromagnetic metal powder: M-2 | 100 parts |
| Composition: Co/Fe (atomic ratio), 30% | |
| Hc: 2,360 Oe | |
| Specific surface area: 49 m$^2$/g | |
| $\sigma_s$: 146 emu/g | |
| Crystallite size: 170 Å | |
| Average long axis length: 0.100 μm | |
| Acicular ratio: 6 | |
| SFD: 0.51 | |
| Al compound (Al/Fe, atomic ratio: 5%) | |
| Y compound (Y/Fe, atomic ratio: 5%) | |
| pH: 9.4 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT70 (manufactured by Sumitomo Chemical Co., Ltd.) | |
| Average particle size: 0.15 μm | |
| Specific surface area: 17 m$^2$/g | |
| Mohs' hardness: 9 | |
| pH: 7.7 to 9.0 | |

-continued

| | |
|---|---|
| Carbon black | 1 part |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Oleic acid | 1 part |
| Stearic acid | 0.6 part |
| Ethylene glycol dioleyl | 12 parts |
| Methyl ethyl ketone | 180 parts |
| Cyclohexanone | 180 parts |

Magnetic Coating Solution: ML-3 (acicular magnetic powder was used, comparative example)

| | |
|---|---|
| Ferromagnetic metal powder: M-3 | 100 parts |
| Composition: Fe/Ni, 96/4 | |
| Hc: 1,600 Oe | |
| Specific surface area: 45 m$^2$/g | |
| Crystallite size: 220 Å | |
| $\sigma_s$: 135 emu/g | |
| Average long axis length: 0.20 μm | |
| Acicular ratio: 9 | |
| Vinyl chloride copolymer | 12 parts |
| MR110 (manufactured by Nippon Zeon Co., Ltd.) | |
| Polyurethane resin | 5 parts |
| UR 8600 (manufactured by Toyobo Co., Ltd.) | |
| α-Alumina (average particle size: 0.65 μm) | 2 parts |
| Chromium oxide (average particle size: 0.35 μm) | 15 parts |
| Carbon black (average particle size: 0.03 μm) | 2 parts |
| Carbon black (average particle size: 0.3 μm) | 9 parts |
| Isohexadecyl stearate | 4 parts |
| n-Butyl stearate | 4 parts |
| Butoxyethyl stearate | 4 parts |
| Oleic acid | 1 part |
| Stearic acid | 1 part |
| Methyl ethyl ketone | 300 parts |

Magnetic Coating Solution: ML-4 (tabular magnetic powder was used)

| | |
|---|---|
| Barium ferrite magnetic powder: M-4 | 100 parts |
| Composition of molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 58 emu/g | |
| Average tabular diameter: 35 nm | |
| Tabular ratio: 4 | |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Average particle size: 0.20 μm | |
| Specific surface area: 8.0 to 9.0 m$^2$/g | |
| Mohs' hardness: 9 | |
| pH: 7.7 to 9.0 | |
| Carbon black | 5 parts |
| #50 (manufactured by Asahi Carbon Co., Ltd.) | |
| Average particle size: 94 nm | |
| Specific surface area: 28 m$^2$/g | |
| DBP oil absorption: 61 ml/100 g | |

-continued

| | |
|---|---|
| pH: 7.5 | |
| Volatile content: 1.0 wt % | |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Magnetic Coating Solution: ML-5 (tabular magnetic powder was used)

| | |
|---|---|
| Barium ferrite magnetic powder: M-5 | 100 parts |
| Composition of molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 58 emu/g | |
| Average tabular diameter: 35 nm | |
| Tabular ratio: 2.5 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT55 (manufactured by Sumitomo Chemical Co., Ltd.) | |
| Average particle size: 0.20 μm | |
| Specific surface area: 8.0 to 9.0 m$^2$/g | |
| Mohs' hardness: 9 | |
| pH: 7.7 to 9.0 | |
| Carbon black | 1 part |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Oleic acid | 1 part |
| Stearic acid | 0.6 part |
| Ethylene glycol dioleyl | 16 parts |
| Methyl ethyl ketone | 180 parts |
| Cyclohexanone | 180 parts |

Magnetic Coating Solution: ML-6 (acicular magnetic powder was used)

| | |
|---|---|
| Ferromagnetic metal powder: M-2 | 100 parts |
| Composition: Co/Fe (atomic ratio), 30% | |
| Hc: 2,360 Oe | |
| Specific surface area: 49 m$^2$/g | |
| $\sigma_s$: 146 emu/g | |
| Crystallite size: 170 Å | |
| Average long axis length: 0.100 μm | |
| Acicular ratio: 6 | |
| SFD: 0.51 | |
| Al compound (Al/Fe, atomic ratio: 5%) | |
| Y compound (Y/Fe, atomic ratio: 5%) | |
| pH: 9.4 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT70 (manufactured by Sumitomo Chemical Co., Ltd.) | |
| Average particle size: 0.15 μm | |
| Specific surface area: 17 m$^2$/g | |
| Mohs' hardness: 9 | |
| pH: 7.7 to 9.0 | |
| Carbon black | 1 part |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Myristic acid | 1 part |
| Stearic acid | 0.6 part |
| Butyl stearate | 4 parts |
| Cetyl palmitate | 4 parts |
| Oleyl oleate | 4 parts |
| Methyl ethyl ketone | 180 parts |
| Cyclohexanone | 180 parts |

Magnetic Coating Solution: ML-7 (acicular magnetic powder was used)

| | |
|---|---|
| Ferromagnetic metal powder: M-2 | 100 parts |
| Composition: Co/Fe (atomic ratio), 30% | |
| Hc: 2,360 Oe | |
| Specific surface area: 49 m$^2$/g | |
| $\sigma_s$: 146 emu/g | |
| Crystallite size: 170 Å | |
| Average long axis length: 0.100 μm | |
| Acicular ratio: 6 | |
| SFD: 0.51 | |
| Al compound (Al/Fe, atomic ratio: 5%) | |
| Y compound (Y/Fe, atomic ratio: 5%) | |
| pH: 9.4 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT70 (manufactured by Sumitomo Chemical Co., Ltd.) | |
| Average particle size: 0.15 μm | |
| Specific surface area: 17 m$^2$/g | |
| Mohs' hardness: 9 | |
| pH: 7.7 to 9.0 | |
| Diamond | 1 part |
| LS600F (manufactured by LANDS SUPERABRASIVES, CO.) | |
| Average particle size: 0.15 μm | |
| Carbon black | 1 part |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Amyl stearate | 4 parts |
| Butoxyethyl stearate | 6 parts |
| Oleyl oleate | 4 parts |
| Methyl ethyl ketone | 180 parts |
| Cyclohexanone | 180 parts |

Magnetic Coating Solution: ML-8 (acicular magnetic powder was used)

| | |
|---|---|
| Ferromagnetic metal powder: M-2 | 100 parts |
| Composition: Co/Fe (atomic ratio), 30% | |
| Hc: 2,360 Oe | |
| Specific surface area: 46 m$^2$/g | |

-continued

| | |
|---|---|
| $\sigma_s$: 153 emu/g | |
| Crystallite size: 160 Å | |
| Average long axis length: 0.100 μm | |
| Acicular ratio: 6 | |
| SFD: 0.51 | |
| pH: 9.4 | |
| Al compound (Al/Fe, atomic ratio: 11%) | |
| Y compound (Y/Fe, atomic ratio: 7%) | |
| Mg compound (Mg/Fe, atomic ratio: 1%) | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT55 (manufactured by Sumitomo Chemical Co., Ltd.) | |
| (dispersion product of 5 parts/ 1 part/4 parts of HIT55/MR110/MEK, which were previously dispersed) | |
| Average particle size: 0.20 μm | |
| Specific surface area: 8.0 to 9.0 m$^2$/g | |
| Mohs' hardness: 9 | |
| pH: 7.7 to 9.0 | |
| Diamond | 1 part |
| LS600F (manufactured by LANDS SUPERABRASIVES, CO.) | |
| Average particle size: 0.27 μm | |
| Carbon black | 1 part |
| #50 (manufactured by Asahi Carbon Co., Ltd.) | |
| Average particle size: 94 nm | |
| Specific surface area: 28 m$^2$/g | |
| DBP oil absorption: 61 ml/100 g | |
| pH: 7.5 | |
| Volatile content: 1.0 wt % | |
| Phenylphosphonic acid | 3 parts |
| Stearic acid | 1 part |
| Oleic acid | 1 part |
| Butyl stearate | 4 parts |
| Butoxyethyl stearate | 4 parts |
| Neopentyl glycol dioleyl | 2 parts |
| Ethylene glycol dioleyl | 2 parts |
| Methyl ethyl ketone | 180 parts |
| Cyclohexanone | 180 parts |

Nonmagnetic Coating Solution: NU-1 (spherical inorganic powder was used)

| | |
|---|---|
| Nonmagnetic powder, TiO$_2$, crystal system rutile | 80 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$, 8 wt % based on total particles | |
| Carbon black | 20 parts |
| CONDUCTEX SC-U (manufactured by Columbia Carbon Co., Ltd.) | |
| Average primary particle size: 20 nm | |
| DBP oil absorption: 115 ml/100 g | |
| pH: 7.0 | |
| Specific surface area (S$_{BET}$): 220 m$^2$/g | |
| Volatile content: 1.5% | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |

-continued

| | |
|---|---|
| Methyl ethyl ketone/cyclohexanone (8/2 mixed solvent) | 250 parts |

Nonmagnetic Coating Solution: NU-2 (spherical inorganic powder was used)

| | |
|---|---|
| Nonmagnetic powder, TiO$_2$, crystal system rutile | 100 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$ and SiO$_2$ | |
| Carbon black | 13 parts |
| Ketjen Black EC (manufactured by Akzo Nobel Co., Ltd.) | |
| Average particle size: 30 nm | |
| DBP oil absorption: 350 ml/100 g | |
| pH: 9.5 | |
| Specific surface area (S$_{BET}$): 950 m$^2$/g | |
| Volatile content: 1.0% | |
| Vinyl chloride copolymer | 16 parts |
| MR110 (manufactured by Nippon Zeon Co., Ltd.) | |
| Polyurethane resin | 6 parts |
| UR 8200 (manufactured by Toyobo Co., Ltd.) | |
| Phenylphosphonic acid | 4 parts |
| Ethylene glycol dioleyl | 16 parts |
| Oleic acid | 1 part |
| Stearic acid | 0.8 part |
| Methyl ethyl ketone/cyclohexanone (8/2 mixed solvent) | 250 parts |

Nonmagnetic Coating Solution: NU-3 (spherical inorganic powder was used, comparative example)

| | |
|---|---|
| Nonmagnetic powder, TiO$_2$, crystal system rutile | 75 parts |
| Average particle size: 0.035 μm | |
| Specific surface area: 40 m$^2$/g | |
| pH: 7 | |
| TiO$_2$ content: 90% or more | |
| DBP Oil absorption: 27 to 38 ml/100 g | |
| Surface-covering compound: Al$_2$O$_3$ and SiO$_2$ | |
| Carbon black | 10 parts |
| Ketjen Black EC (manufactured by Akzo Nobel Co., Ltd.) | |
| Average particle size: 30 nm | |
| DBP oil absorption: 350 ml/100 g | |
| pH: 9.5 | |
| Specific surface area (S$_{BET}$): 950 m$^2$/g | |
| Volatile content: 1.0% | |
| α-Alumina | 15 parts |
| AKP-15 (manufactured by Sumitomo Chemical Co., Ltd.) | |
| Average particle size: 0.65 μm | |
| Vinyl chloride copolymer | 12 parts |
| MR110 (manufactured by Nippon Zeon Co., Ltd.) | |
| Polyurethane resin | 5 parts |
| UR 8600 (manufactured by Toyobo Co., Ltd.) | |
| Isohexadecyl stearate | 4 parts |
| n-Butyl stearate | 4 parts |
| Butoxyethyl stearate | 4 parts |
| Oleic acid | 1 part |
| Stearic acid | 1 part |
| Methyl ethyl ketone | 300 parts |

Nonmagnetic Coating Solution NU-4 (acicular inorganic powder was used)

| | |
|---|---|
| Nonmagnetic powder, α-Fe₂O₃, hematite | 80 parts |
| Average long axis length: 0.15 μm | |
| Specific surface area (S$_{BET}$): 50 m²/g | |
| pH: 9 | |
| Surface-covering compound: Al₂O₃, | |
| 8 wt % based on total particles | |
| Carbon black | 20 parts |
| CONDUCTEX SC-U (manufactured by | |
| Columbia Carbon Co., Ltd.) | |
| Average particle size: 20 nm | |
| DBP oil absorption: 115 ml/100 g | |
| pH: 7.0 | |
| Specific surface area (S$_{BET}$): 220 m²/g | |
| Volatile content: 1.5% | |
| Vinyl chloride copolymer | 12 parts |
| MR110 (manufactured by Nippon Zeon | |
| Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone | 250 parts |
| (8/2 mixed solvent) | |

Nonmagnetic Coating Solution NU-5 (acicular inorganic powder was used)

| | |
|---|---|
| Nonmagnetic powder, α-Fe₂O₃, hematite | 100 parts |
| Average long axis length: 0.15 μm | |
| Specific surface area (S$_{BET}$): 50 m²/g | |
| pH: 9 | |
| Surface-covering compound: Al₂O₃, | |
| 8 wt % based on total particles | |
| Carbon black | 18 parts |
| #3250B (manufactured by Mitsubishi Kasei | |
| Corp.) | |
| Average particle size: 30 nm | |
| Specific surface area: 245 m²/g | |
| DBP oil absorption: 155 ml/100 g | |
| pH: 6.0 | |
| Volatile content: 1.5 wt % | |
| Vinyl chloride copolymer | 15 parts |
| MR104 (manufactured by Nippon Zeon | |
| Co., Ltd.) | |
| Polyurethane resin | 7 parts |
| UR 5500 (manufactured by Toyobo Co., Ltd.) | |
| Phenylphosphonic acid | 4 parts |
| Ethylene glycol dioleyl | 16 parts |
| Oleic acid | 1.3 parts |
| Stearic acid | 0.8 part |
| Methyl ethyl ketone/cyclohexanone | 250 parts |
| (8/2 mixed solvent) | |

Nonmagnetic Coating Solution NU-6 (acicular inorganic powder was used)

| | |
|---|---|
| Nonmagnetic powder, α-Fe₂O₃, hematite | 100 parts |
| Average long axis length: 0.15 μm | |
| Specific surface area (S$_{BET}$): 50 m²/g | |
| pH: 9 | |
| Surface-covering compound: Al₂O₃, | |
| 8 wt % based on total particles | |
| Carbon black | 18 parts |
| #3250B (manufactured by Mitsubishi Kasei | |
| Corp.) | |
| Average particle size: 30 nm | |
| Specific surface area: 245 m²/g | |
| DBP oil absorption: 155 ml/100 g | |
| pH: 6.0 | |
| Volatile content: 1.5 wt % | |
| Vinyl chloride copolymer | 15 parts |
| MR104 (manufactured by Nippon Zeon | |
| Co., Ltd.) | |
| Polyurethane resin | 7 parts |
| UR 5500 (manufactured by Toyobo Co., Ltd.) | |
| Phenylphosphonic acid | 4 parts |
| Myristic acid | 1 part |
| Stearic acid | 0.6 part |
| Butyl stearate | 4 parts |
| Cetyl palmitate | 4 parts |
| Oleyl oleate | 4 parts |
| Methyl ethyl ketone/cyclohexanone | 250 parts |
| (8/2 mixed solvent) | |

Nonmagnetic Coating Solution NU-7 (acicular inorganic powder was used)

| | |
|---|---|
| Nonmagnetic powder, α-Fe₂O₃, hematite | 100 parts |
| Average long axis length: 0.15 μm | |
| Specific surface area (S$_{BET}$): 50 m²/g | |
| pH: 9 | |
| Surface-covering compound: Al₂O₃, | |
| 8 wt % based on total particles | |
| Carbon black | 10 parts |
| CONDUCTEX SC-U (manufactured by | |
| Columbia Carbon Co., Ltd.) | |
| Average particle size: 20 nm | |
| DBP oil absorption: 115 ml/100 g | |
| pH: 7.0 | |
| Specific surface area (S$_{BET}$): 220 m²/g | |
| Volatile content: 1.5% | |
| Carbon black | 10 parts |
| #50 (manufactured by Asahi Carbon Co., Ltd.) | |
| Average particle size: 94 nm | |
| Specific surface area: 28 m²/g | |
| DBP oil absorption: 61 ml/100 g | |
| pH: 7.5 | |
| Volatile content: 1.0 wt % | |
| Vinyl chloride copolymer | 15 parts |
| MR104 (manufactured by Nippon Zeon | |
| Co., Ltd.) | |
| Polyurethane resin | 7 parts |
| UR 5500 (manufactured by Toyobo Co., Ltd.) | |
| Phenylphosphonic acid | 4 parts |
| Amyl stearate | 4 parts |
| Butoxyethyl stearate | 6 parts |
| Oleyl oleate | 4 parts |
| Methyl ethyl ketone/cyclohexanone | 250 parts |
| (8/2 mixed solvent) | |

Nonmagnetic Coating Solution NU-8 (acicular inorganic powder was used)

| | |
|---|---|
| Nonmagnetic powder, α-Fe₂O₃, hematite | 100 parts |
| Average long axis length: 0.16 μm | |
| Specific surface area (S$_{BET}$): 50 m²/g | |
| pH: 9 | |
| Surface-covering compound: Al₂O₃, | |
| 8 wt % based on total particles | |
| Carbon black | 25 parts |
| CONDUCTEX SC-U (manufactured by | |
| Columbia Carbon Co., Ltd.) | |
| Average particle size: 20 nm | |
| DBP oil absorption: 115 ml/100 g | |
| pH: 7.0 | |
| Specific surface area (S$_{BET}$): 220 m²/g | |
| Volatile content: 1.5% | |

-continued

| | |
|---|---|
| Vinyl chloride copolymer MR104 (manufactured by Nippon Zeon Co., Ltd.) | 16 parts |
| Polyurethane resin UR 5500 (manufactured by Toyobo Co., Ltd.) | 7 parts |
| Phenylphosphonic acid | 4 parts |
| Stearic acid | 1 part |
| Oleic acid | 1 part |
| Butyl stearate | 4 parts |
| Butoxyethyl stearate | 4 parts |
| Neopentyl glycol dioleyl | 2 parts |
| Ethylene glycol dioleyl | 2 parts |
| Methyl ethyl ketone/cyclohexanone (8/2 mixed solvent) | 250 parts |

Preparation Method 1 (disc: W/W)

Each of the above sixteen compositions of the coating solutions for the magnetic layer and the nonmagnetic layer was blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were respectively simultaneously multilayer-coated on a polyethylene terephthalate support having a thickness of 62 μm and a central plane average surface roughness of 3 nm of the surface side on which the magnetic layer was to be coated. The nonmagnetic layer coating solution was coated in a dry thickness of 1.5 μm, immediately thereafter the magnetic layer coating solution was coated on the nonmagnetic layer so as to give the magnetic layer having a thickness of 0.15 μm. The coated layers were subjected to random orientation while the magnetic layer and the nonmagnetic layer were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layers were subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch cartridge having a liner inside (a zip-disc cartridge manufactured by Iomega Co., Ltd., U.S.A.), and equipped the cartridge with prescribed mechanism parts to obtain a 3.7 inch floppy disc. A part of samples was subjected to machine direction orientation using Co magnets with the same pole and counter positions of 4,000 G before random orientation treatment.

In this case, it is preferred to increase the frequency and magnetic field intensity of the alternating current magnetic field generator so as to achieve finally sufficient random orientation, thereby 98% or more of orientation ratio can be obtained.

When a barium ferrite magnetic powder is used, vertical orientation can be performed besides the above-described orientation. Further, if necessary, discs after being punched may be subjected to post treatments, e.g., a thermal treatment at high temperature (generally from 50 to 90° C.) to accelerate curing of coated layers, or a burnishing treatment with an abrasive tape to scrape off surface protrusions.

Preparation Method 2 (computer tape: W/W)

Each of the above compositions of the coating solutions for the magnetic layer and the nonmagnetic layer were blended in a kneader, then dispersed with a sand mill. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were respectively simultaneously multilayer-coated on an aramide support (trade name: Mictron) having a thickness of 4.4 μm and a central plane average surface roughness of 2 nm of the surface side on which the magnetic layer was to be coated. The nonmagnetic layer coating solution was coated in a dry thickness of 1.7 μm, immediately thereafter the magnetic layer coating solution was coated on the nonmagnetic layer so as to give the magnetic layer having a thickness of 0.15 μm. The coated layers were oriented with a cobalt magnet having a magnetic force of 6,000 G and a solenoid having a magnetic force of 6,000 G while both layers were still wet. After drying, the coated layers were subjected to calendering treatment with calenders of 7 stages comprising metal rolls at 85° C. at a rate of 200 m/min. Subsequently, a backing layer (100 parts of a carbon black having an average particle size of 17 nm, 80 parts of calcium carbonate having an average particle size of 40 nm, and 5 parts of α-alumina having an average particle size of 200 nm were dispersed in a nitrocellulose resin, a polyurethane resin and a polyisocyanate) having a thickness of 0.5 μm was coated. The obtained web was slit to a width of 3.8 mm. The magnetic layer surface of the thus-produced tape was cleaned with a tape cleaning apparatus of a nonwoven fabric and a razor blade pressed against the surface of the tape, which was attached to a machine having delivery and winding-up movement of a slit product. The thus-obtained magnetic tape was incorporated in a cartridge for DDS.

Preparation Method 3 (disc: W/D)

Each of the above sixteen compositions of the coating solutions for the magnetic layer and the nonmagnetic layer was blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

The nonmagnetic layer coating solution was coated in a dry thickness of 1.5 μm on a polyethylene terephthalate support having a thickness of 62 μm and a central plane average surface roughness of 3 nm of the surface side on which the magnetic layer was to be coated, dried, and subjected to calendering treatment. The magnetic layer coating solution was coated by blade coating on the nonmagnetic layer so as to give the magnetic layer having a thickness of 0.15 μm. The coated layers were subjected to random orientation by passing through an alternating current magnetic field generator having two magnetic field intensities of frequency of 50 Hz, magnetic field intensity of 250 Gauss and frequency of 50 Hz, magnetic field intensity of 120 Gauss. The procedure was carried out in the same manner as in Preparation Method 1 hereafter. Calendering of the nonmagnetic layer may be omitted.

Preparation Method 4 (computer tape: W/D)

Each of the above compositions of the coating solutions for the magnetic layer and the nonmagnetic layer were blended in a kneader, then dispersed with a sand mill. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

The nonmagnetic layer coating solution was coated in a dry thickness of 1.7 μm on an aramide support (trade name: Mictron) having a thickness of 4.4 μm and a central plane average surface roughness of 2 nm of the surface side on which the magnetic layer was to be coated, dried, and subjected to calendering treatment. The magnetic layer coating solution was coated by blade coating on the nonmagnetic layer so as to give the magnetic layer having a thickness of 0.15 μm. The coated layers were oriented with a cobalt magnet having a magnetic force of 6,000 G and a solenoid having a magnetic force of 6,000 G. The procedure was carried out in the same manner as in Preparation Method 2 hereafter. Calendering of the nonmagnetic layer may be omitted.

Preparation Method 5 (disc: spin coating)

Each of the above sixteen compositions of the coating solutions for the magnetic layer and the nonmagnetic layer were blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

The nonmagnetic layer coating solution was coated in a dry thickness of 1.5 μm by spin coating on a polyethylene terephthalate support having a thickness of 62 μm and a central plane average surface roughness of 3 nm of the surface side on which the magnetic layer was to be coated and dried. The magnetic layer coating solution was coated by spin coating on the nonmagnetic layer so as to give the magnetic layer having a thickness of 0.15 μm. The coated layers were oriented using Co magnets with the same pole and counter positions of 6,000 G in the circumferential direction and the surface of the layer was smoothed by batch system rolling treatment by which the same pressure as in Preparation Method 1 can be applied. The procedure was carried out in the same manner as in Preparation Method 1 hereafter. Also, the magnetic layer may be coated by spin coating on the nonmagnetic layer while the nonmagnetic layer coated by spin coating is still wet. By using the spin coating process, not only the amount of residual magnetization in the recording direction can be made large but also vertical magnetization components of the barium ferrite powder and the ferromagnetic metal powder of short acicular ratio can be reduced and symmetric property of reproduced wave form can be improved.

Support B-11: Polyethylene Terephthalate

Thickness: 62 μm
F-5 value:
  MD: 114 MPa, TD: 107 MPa
Breaking strength:
  MD: 276 MPa, TD: 281 MPa
Breaking extension:
  MD: 174%, TD: 139%
Thermal shrinkage factor (80° C., 30 minutes):
  MD: 0.04%, TD: 0.05%
Thermal shrinkage factor (100° C., 30 minutes):
  MD: 0.2%, TD: 0.3%
Temperature expansion coefficient:
  Long axis: $15 \times 10^{-5}/°$ C.
  Short axis: $18 \times 10^{-5}/°$ C.
Central plane average surface roughness: 3 nm Support B-2: Polyethylene Naphthalate Thickness: 55 μm
Central plane average surface roughness: 1.8 nm
Thermal shrinkage factor (80° C., 30 minutes):
  MD: 0.007%, TD: 0.007%
Thermal shrinkage factor (100° C., 30 minutes):
  MD: 0.02%, TD: 0.02%
Temperature expansion coefficient:
  Long axis: $10 \times 10^{-5}/°$ C.
  Short axis: $11 \times 10^{-5}/°$ C.

Surport B-3: Polyethylene Terephthalate

Thickness: 62 μm
Central plane average surface roughness: 9 nm

Support B-4: Aramide

Thickness: 4.4 μm
Central plane average surface roughness: 2 nm

Orientation

O-1: Random orientation
O-2: Orientation in the machine direction using a Co magnet first, then random orientation
O-3: Orientation in the machine direction using a Co magnet first, then in the machine direction using a solenoid
O-4: Orientation in the vertical direction using a Co magnet
O-5: Orientation in the circumferential direction using a Co magnet Backing Layer Coating Solution: BL-1

| | |
|---|---|
| Fine carbon black powder BP-800 (average particle size: 17 nm, manufactured by Cabot Co., Ltd.) | 100 parts |
| Coarse carbon black powder Thermal Black (average particle size: 270 nm, manufactured by Cancarb Co., Ltd.) | 10 parts |
| Calcium carbonate (soft inorganic powder) Hakuenka O (average particle size: 40 nm, Mohs' hardness: 3, manufactured by Shiraishi Kogyo Co., Ltd.) | 80 parts |
| α-Alumina (hard inorganic powder) (average particle size: 200 nm, Mohs' hardness: 9) | 5 parts |
| Nitrocellulose resin | 140 parts |
| Polyurethane resin | 15 parts |
| Polyisocyanate | 40 parts |
| Polyester resin | 5 parts |

-continued

Dispersant:

| | |
|---|---|
| Copper oleate | 5 parts |
| Copper phthalocyanine | 5 parts |
| Barium sulfate | 5 parts |
| Methyl ethyl ketone | 2,200 parts |
| Butyl acetate | 300 parts |
| Toluene | 600 parts |

The above compositions of the coating solution for the backing layer were blended in a continuous kneader, then dispersed with a sand mill. The resulting dispersion solution was filtered through a filter having an average pore diameter of 1 µm to obtain a coating solution for forming the backing layer.

With respect to samples obtained by combining the above-described each method arbitrarily as shown in Table 1 or 3, magnetic characteristics, central plane average surface roughness, areal recording density, etc., were determined and the results obtained are shown in Table 2 or 4.

(1) Magnetic Characteristics (Hc):

Magnetic characteristics were measured using a vibrating sample magnetometer (a product of Toei Kogyo Co., Ltd.) at Hm 10 KOe.

(2) Central Plane Average Surface Roughness (Ra):

Surface roughness (Ra) of the area of about 250 µm×250 µm was measured using "TOPO3D" (a product of WYKO Co., Ltd., U.S.A.) by 3D-MIRAU method. The wavelength of measurement was about 650 nm and spherical compensation and cylindrical compensation were applied. Measurement was performed using a light interference type non-contact surface roughness meter.

(3) Areal Recording Density:

Areal recording density means a value obtained by multiplying linear recording density by track density.

(4) Linear Recording Density:

Linear recording density means a bit number of signals recorded per 1 inch in the recording direction.

(5) Track Density:

Track density means a track number per 1 inch.

(6) φm:

φm is the amount of magnetization per unit area of a magnetic recording medium, which is represented by Bm (Gauss) multiplying thickness. This is the value obtained by using a vibrating sample magnetometer (a product of Toei Kogyo Co., Ltd.) at Hm 10 KOe, which can be directly measured.

(7) Error Rate of Tape:

The above signals of linear recording density were recorded on the tape by 8–10 conversion PR1 equalization system and error rate of the tape was measured using a DDS drive.

(8) Error Rate of Disc:

The above signals of linear recording density were recorded on the disc by (2,7) RLL modulation system and error rate of the disc was measured.

(9) Thickness of Magnetic Layer:

A sample having a thickness of about 0.1 µm was cut out with a diamond cutter in the machine direction of the magnetic medium, observed with a transmission type electron microscope of from 10,000 to 100,000, preferably from 20,000 to 50,000 magnifications and photographed. The print size of the photograph was from A4 (i.e., 297×210 mm) to A5 (i.e., 210×148 mm) sizes. The present inventors paid attentions to the difference of the shapes of the ferromagnetic powders and the nonmagnetic powders of the magnetic layer and the nonmagnetic layer and rimmed the interface of the magnetic layer and the nonmagnetic layer and also the surface of the magnetic layer with black color by visual judgement. Thereafter, the distance of the rimmed lines was measured by the image processing apparatus "IBAS2" (manufactured by Zeiss Corp.). Measurement was conducted from 85 to 300 times when the length of the sample photograph was 21 cm. The average measured value at that time was taken as the magnetic layer thickness d. d was obtained according to the description in JP-A-5-298653.

(10) Measuring Methods of Particle Sizes of Magnetic Powder and Abrasive:

Measurement of particle size distribution of magnetic powder:

Particles of the magnetic powder of the sample were observed using a transmission type electron microscope, particles of the printed photograph were measured one by one with an image analyzer and particle size distribution of the magnetic powder was obtained.

1. Preparation of Sample

About one earpickful of the magnetic powder was put in a weighing bottle containing about 10 ml of water, the content was dispersed by ultrasonics for about 10 minutes, then scooped with copper mesh on which a collodion membrane was formed, and dried, which was reinforced by carbon vapor deposition and used as a sample for observation.

2. Observation of Particles and Photographic Print Observation:

Apparatus: a transmission type electron microscope

Photographing magnification: 60,000-fold

Photographic print:

Overall magnification: 200,000-fold

Overall magnification was corrected from the diffraction grating images of simultaneous observation.

3. Measurement of Particle Size

Apparatus: image analyzer KS400 manufactured by KONTRON Co., Ltd.

Method: The outline of the particle on the photograph was traced on a digitizer with a slicing pen and the long axis length and the short axis length were measured. The averages of long axis lengths and short axis lengths were respectively taken as the average long axis length and the average short axis length, and the ratio thereof (average long axis length/average short axis length) was taken as the acicular ratio.

Number of particles measured: 500

Measurement of particle size distribution of abrasive:

Particles of the abrasive of the sample were observed using a transmission type electron microscope, particles on the printed photograph were measured one by one with an image analyzer and particle size distribution of the abrasive was obtained.

1. Preparation of Sample

About one earpickful of the abrasive was put in a weighing bottle containing about 10 ml of water, the content was dispersed by ultrasonics for about 10 minutes, then scooped with copper mesh on which a collodion membrane was formed, and dried, which was reinforced by carbon vapor deposition and used as a sample for observation.

2. Observation of Particles and photographic Print Observation:

Apparatus: a transmission type electron microscope

Photographing magnification: 10,000-fold

Photographic print:

Overall magnification: 30,000-fold

Overall magnification was corrected from the diffraction grating images of simultaneous observation.

3. Measurement of Particle Size

Apparatus: image analyzer KS400 manufactured by KONTRON Co., Ltd.

Method: The outline of the particle on the photograph was traced on a digitizer with a slicing pen and the particle size was measured. The average value of determined particles was taken as the average particle size.

Parameter of measurement: equivalent-circle diameter

Number of particles measured: 500

(11) Running Durability:

A floppy disc drive ("ZIP100", a product of IOMEGA CORP., U.S.A., rotation number: 2,968 rpm) was used. The head was fixed at the position of radius of 38 mm. Recording was conducted at recording density of 34 kfci, then reproduced the signals recorded and this was taken as 100%. The disc was run for 1,500 hours under the following thermo-cycle condition, which being taken as one cycle. Output was monitored every 24 hours of running and the point when the initial reproduction output became 70% or less was taken as NG.

Thermo-Cycle Flow

25° C., 50% RH, 1 hr→(temperature up, 2 hr)→60° C., 20% RH, 7 hr→(temperature down, 2 hr)→25° C., 50% RH, 1 hr→(temperature down, 2 hr)→5° C., 50% RH, 7 hr→ (temperature up, 2 hr)→(this cycle was repeated).

(12) Liner Wear:

A sample was run for 1,000 hours under the same condition as in the evaluation of running durability with the head being off, and after completion of running, cartridge a case of the sample was opened and the surface of the magnetic layer was visually evaluated by the following criteria.

o: No defect was observed on the surface of the magnetic layer.

Δ: Fine scratches were generated on a part of the surface of the magnetic layer.

x: Fine scratches were generated on the entire surface of the magnetic layer.

(13) Liner Adhesion:

A sample was run for 1,000 hours under the same condition as in the evaluation of running durability with the head being off, and after completion of running, cartridge case of the sample was opened and the surface of the magnetic layer was visually evaluated by the following criteria.

o: Liner was not adhered on the surface of the magnetic layer.

Δ: Liner was adhered on a part of the surface of the magnetic layer.

x: Liner was adhered on the entire surface of the magnetic layer.

(14) Starting Torque:

Starting torque at the time of head-on in LS-102 drive (a product of Imation Co., Ltd.) was determined using torque gauge model 300 ATG (a product of Tonichi Seisakusho Co., Ltd.) (unit: g·cm).

(15) Measurement of C/Fe

C/Fe value was determined using Auger electron spectrometer PHI-660 type manufactured by Φ Co. Conditions of measurement were as follows.

Accelerating voltage of primary electron beam: 3 KV

Electric current of sample: 130 nA

Magnification: 250-fold

Inclination angle: 30°

The C/Fe ratio was obtained as the C/Fe peak by integrating the values obtained by the above conditions in the region of kinetic energy of 130 eV to 730 eV three times and finding the strengths of KLL peak of the carbon and LMM peak of the iron as differentials.

TABLE 1

| | | Disc | | | | | | | |
|---|---|---|---|---|---|---|---|---|---|
| | | Magnetic Layer | | | | | | | |
| Sample No. | Prescription | Thickness ($\mu$m) | Hc (Oe) | Surface Roughness (nm) | $\phi$m (emu/cm$^2$) | Lower Layer | Support | Preparation Method | Orientation |
| Example 1 | ML-2 | 0.15 | 2,360 | 3.5 | $4.8 \times 10^{-3}$ | NU-1 | B-1 | Method 1 | O-1 |
| Example 2 | ML-2 | 0.15 | 2,360 | 2.3 | $4.8 \times 10^{-3}$ | NU-2 | B-1 | Method 1 | O-1 |
| Example 3 | ML-2 | 0.15 | 2,360 | 1.9 | $4.8 \times 10^{-3}$ | NU-4 | B-1 | Method 1 | O-1 |
| Example 4 | ML-2 | 0.15 | 2,360 | 1.7 | $4.8 \times 10^{-3}$ | NU-5 | B-1 | Method 1 | O-1 |
| Example 5 | ML-2 | 0.05 | 2,400 | 1.4 | $1.6 \times 10^{-3}$ | NU-5 | B-1 | Method 1 | O-1 |
| Example 6 | ML-2 | 0.10 | 2,380 | 1.6 | $3.2 \times 10^{-3}$ | NU-5 | B-1 | Method 1 | O-1 |
| Example 7 | ML-2 | 0.20 | 2,330 | 1.9 | $6.4 \times 10^{-3}$ | NU-5 | B-1 | Method 1 | O-1 |
| Example 8 | ML-2 | 0.15 | 2,360 | 1.5 | $4.8 \times 10^{-3}$ | NU-5 | B-2 | Method 1 | O-1 |
| Example 9 | ML-1 | 0.15 | 2,550 | 2.5 | $4.2 \times 10^{-3}$ | NU-5 | B-1 | Method 1 | O-1 |
| Comparative Example 1 | ML-3 | 0.15 | 1,600 | 3.1 | $4.8 \times 10^{-3}$ | NU-5 | B-1 | Method 1 | O-1 |
| Example 10 | ML-4 | 0.15 | 2,500 | 2.2 | $2.1 \times 10^{-3}$ | NU-5 | B-1 | Method 1 | O-1 |
| Example 11 | ML-5 | 0.15 | 2,500 | 1.8 | $2.4 \times 10^{-3}$ | NU-5 | B-1 | Method 1 | O-1 |

TABLE 1-continued

Disc

| Sample No. | Prescription | Magnetic Layer Thickness ($\mu$m) | Hc (Oe) | Surface Roughness (nm) | $\phi$m (emu/cm$^2$) | Lower Layer | Support | Preparation Method | Orientation |
|---|---|---|---|---|---|---|---|---|---|
| Example 12 | ML-2 | 0.15 | 2,360 | 2.5 | $4.8 \times 10^{-3}$ | NU-5 | B-1 | Method 3 | O-1 |
| Example 13 | ML-2 | 0.15 | 2,360 | 1.7 | $4.8 \times 10^{-3}$ | NU-5 | B-1 | Method 1 | O-2 |
| Example 14 | ML-5 | 0.15 | 2,500 | 1.8 | $2.5 \times 10^{-3}$ | NU-5 | B-1 | Method 1 | O-2 |
| Example 15 | ML-4 | 0.15 | 2,700 | 1.9 | $2.3 \times 10^{-3}$ | NU-5 | B-1 | Method 1 | O-4 |
| Example 16 | ML-2 | 0.15 | 2,660 | 1.6 | $4.8 \times 10^{-3}$ | NU-5 | B-1 | Method 5 | O-5 |
| Example 17 | ML-4 | 0.15 | 2,700 | 1.8 | $2.3 \times 10^{-3}$ | NU-5 | B-1 | Method 5 | O-5 |
| Example 21 | ML-6 | 0.15 | 2,360 | 1.7 | $4.8 \times 10^{-3}$ | NU-6 | B-1 | Method 1 | O-1 |
| Example 22 | ML-7 | 0.15 | 2,360 | 1.7 | $4.8 \times 10^{-3}$ | NU-7 | B-1 | Method 1 | O-1 |
| Example 23 | ML-8 | 0.15 | 2,360 | 1.7 | $4.8 \times 10^{-3}$ | NU-8 | B-2 | Method 1 | O-1 |

TABLE 2

| Sample No. | Track Density (tpi) | Linear Recording Density (kbpi) | Areal Recording Density (G bit/inch$^2$) | Error Rate ($10^{-5}$) | C/Fe |
|---|---|---|---|---|---|
| Example 1 | 5,200 | 144 | 0.75 | 0.2 | 40 |
| Example 2 | 5,200 | 144 | 0.75 | 0.08 | 10 |
| Example 3 | 5,200 | 144 | 0.75 | 0.03 | 70 |
| Example 4 | 5,200 | 144 | 0.75 | 0.01 | 25 |
| Example 5 | 5,200 | 144 | 0.75 | 0.06 | 25 |
| Example 6 | 5,200 | 144 | 0.75 | 0.01 | 25 |
| Example 7 | 5,200 | 144 | 0.75 | 0.2 | 25 |
| Example 8 | 5,200 | 144 | 0.75 | 0.008 | 25 |
| Example 9 | 5,200 | 144 | 0.75 | 0.004 | 30 |
| Comparative Example 1 | 5,200 | 144 | 0.75 | 40 | 30 |
| Example 10 | 5,200 | 144 | 0.75 | 0.01 | — |
| Example 11 | 5,200 | 144 | 0.75 | 0.005 | — |
| Example 12 | 5,200 | 144 | 0.75 | 0.1 | 25 |
| Example 13 | 5,200 | 144 | 0.75 | 0.001 | 25 |
| Example 14 | 5,200 | 144 | 0.75 | 0.0006 | — |
| Example 15 | 5,200 | 144 | 0.75 | 0.0004 | — |
| Example 16 | 5,200 | 144 | 0.75 | 0.0002 | 25 |
| Example 17 | 5,200 | 144 | 0.75 | 0.0001 | — |
| Example 18 | 7,500 | 200 | 1.5 | 0.8 | 25 |
| Example 19 | 6,000 | 166 | 1.0 | 0.08 | 25 |
| Example 20 | 3,000 | 120 | 0.36 | 0.007 | 25 |
| Example 21 | 5,200 | 144 | 0.75 | 0.01 | 45 |
| Example 22 | 5,200 | 144 | 0.75 | 0.01 | 60 |
| Example 23 | 5,200 | 144 | 0.75 | 0.01 | 75 |
| Reference Example 1 | 2,000 | 50 | 0.1 | 0.5 | 25 |

In each of Examples 18 to 20 and Reference Example 1, the disc in Example 13 was used and error rate was determined with varying linear recording density and track density.

TABLE 3

Computer Tape

| Sample No. | Prescription | Magnetic Layer Thickness ($\mu$m) | Hc (Oe) | Surface Roughness (nm) | $\phi$m (emu/cm$^2$) | Lower Layer | Support | Preparation Method | Orientation |
|---|---|---|---|---|---|---|---|---|---|
| Example 24 | ML-2 | 0.15 | 2,460 | 3.7 | $4.8 \times 10^{-3}$ | NU-1 | B-4 | Method 2 | O-3 |
| Example 25 | ML-2 | 0.15 | 2,460 | 2.4 | $4.8 \times 10^{-3}$ | NU-2 | B-4 | Method 2 | O-3 |
| Example 26 | ML-2 | 0.15 | 2,460 | 2.1 | $4.8 \times 10^{-3}$ | NU-4 | B-4 | Method 2 | O-3 |
| Example 27 | ML-2 | 0.15 | 2,460 | 1.8 | $4.8 \times 10^{-3}$ | NU-5 | B-4 | Method 2 | O-3 |
| Example 28 | ML-2 | 0.05 | 2,500 | 1.7 | $1.6 \times 10^{-3}$ | NU-5 | B-4 | Method 2 | O-3 |
| Example 29 | ML-2 | 0.10 | 2,480 | 1.7 | $3.2 \times 10^{-3}$ | NU-5 | B-4 | Method 2 | O-3 |
| Example 30 | ML-2 | 0.20 | 2,430 | 2.0 | $6.4 \times 10^{-3}$ | NU-5 | B-4 | Method 2 | O-3 |
| Example 31 | ML-1 | 0.15 | 2,650 | 2.6 | $4.2 \times 10^{-3}$ | NU-5 | B-4 | Method 2 | O-3 |
| Comparative Example 2 | ML-3 | 0.15 | 1,700 | 3.3 | $4.8 \times 10^{-3}$ | NU-5 | B-4 | Method 2 | O-3 |
| Example 32 | ML-2 | 0.15 | 2,460 | 2.7 | $4.8 \times 10^{-3}$ | NU-5 | B-4 | Method 4 | O-3 |

TABLE 4

| Sample No. | Track Density (tpi) | Linear Recording Density (kbpi) | Areal Recording Density (G bit/inch$^2$) | Error Rate ($10^{-5}$) | C/Fe |
|---|---|---|---|---|---|
| Example 24 | 3,000 | 122 | 0.366 | 0.09 | 40 |
| Example 25 | 3,000 | 122 | 0.366 | 0.02 | 10 |
| Example 26 | 3,000 | 122 | 0.366 | 0.003 | 70 |
| Example 27 | 3,000 | 122 | 0.366 | 0.001 | 25 |
| Example 28 | 3,000 | 122 | 0.366 | 0.01 | 25 |
| Example 29 | 3,000 | 122 | 0.366 | 0.002 | 25 |
| Example 30 | 3,000 | 122 | 0.366 | 0.01 | 25 |
| Example 31 | 3,000 | 122 | 0.366 | 0.0005 | 30 |
| Comparative Example 2 | 3,000 | 122 | 0.366 | 11 | 30 |
| Example 32 | 3,000 | 122 | 0.366 | 0.02 | 25 |
| Example 33 | 4,000 | 150 | 0.6 | 0.02 | 40 |
| Example 34 | 5,000 | 170 | 0.85 | 0.5 | 40 |
| Reference Example 2 | 3,000 | 50 | 0.15 | 0.1 | 40 |

As described above, the above signals of linear recording density were recorded on the tape by 8–10 conversion PR1 equalization system and error rate of the tape was measured using a DDS drive. In each of Examples 33, 34 and Reference Example 2, the tape in Example 24 was used and error rate was determined with varying linear recording density and track density.

From the results in Tables 2 and 4, it can be seen that the error rates of the magnetic recording media (i.e., discs and computer tapes) according to the present invention, in particular, in high density recording region, are $1 \times 10^{-5}$ or less, which are conspicuously excellent as compared with conventional disc-like media.

EXAMPLE 35

Preparation of Coating Solution

Magnetic Coating Solution: mL-1 (acicular magnetic powder was used)

| | |
|---|---|
| Ferromagnetic metal powder: m-1 | 100 parts |
| Composition: Co/Fe (atomic ratio), 30% | |
| Hc: 2,550 Oe | |
| Specific surface area: 55 m$^2$/g | |
| $\sigma_s$: 140 emu/g | |
| Crystallite size: 120 Å | |
| Long axis length: 0.048 μm | |
| Acicular ratio: 4 | |
| Al compound (Al/Fe, atomic ratio: 8%) | |
| Y compound (Y/Fe, atomic ratio: 6%) | |
| Vinyl chloride copolymer | 12 parts |
| MR110 (manufactured by Nippon Zeon CO., Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Carbon black | 5 parts |
| #50 (manufactured by Asahi Carbon Co., Ltd.) | |
| Phenylphosphonic acid | 3 parts |
| Lubricant | |
| Ester shown in Table 9-1 or 10-1 | |
| Stearic acid | 2 parts |
| Methyl ethyl ketone | 180 parts |
| Cyclohexanone | 180 parts |

Magnetic Coating Solution: mL-2 (acicular magnetic powder was used)

| | |
|---|---|
| Ferromagnetic metal powder: m-2 | 100 parts |
| Composition: Co/Fe (atomic ratio), 30% | |
| Hc: 2,360 Oe | |
| Specific surface area: 49 m$^2$/g | |
| $\sigma_s$: 146 emu/g | |
| Crystallite size: 170 Å | |
| Long axis length: 0.100 μm | |
| Acicular ratio: 6 | |
| SFD: 0.51 | |
| Al compound (Al/Fe, atomic ratio: 5%) | |
| Y compound (Y/Fe, atomic ratio: 5%) | |
| pH: 9.4 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT70 (manufactured by Sumitomo Chemical Co., Ltd.) | |
| Carbon black | 1 part |
| #50 (manufactured by Asahi Carbon Co., Ltd.) | |
| Phenylphosphonic acid | 3 parts |
| Lubricant | |
| Ester shown in Table 9-1 or 10-1 | |
| Oleic acid | 1 part |
| Stearic acid | 0.6 part |
| Ethylene glycol dioleyl | 12 parts |
| Methyl ethyl ketone | 180 parts |
| Cyclohexanone | 180 parts |

Magnetic Coating Solution: mL-3 (acicular magnetic powder was used, comparative example)

| | |
|---|---|
| Ferromagnetic metal powder: m-3 | 100 parts |
| Composition: Fe/Ni, 96/4 | |
| Hc: 1,600 Oe | |
| Specific surface area: 45 m$^2$/g | |
| Crystallite size: 220 Å | |
| $\sigma_s$: 135 emu/g | |
| Average long axis length: 0.20 μm | |
| Acicular ratio: 9 | |
| Vinyl chloride copolymer | 12 parts |
| MR110 (manufactured by Nippon Zeon Co., Ltd.) | |
| Polyurethane resin | 5 parts |
| UR 8600 (manufactured by Toyobo Co., Ltd.) | |
| α-Alumina (particle size: 0.65 μm) | 2 parts |
| Chromium oxide (particle size: 0.35 μm) | 15 parts |
| Carbon black (particle size: 0.03 μm) | 2 parts |
| Carbon black (particle size: 0.3 μm) | 9 parts |
| Lubricant | |
| Ester shown in Table 9-1 or 10-1 | |
| Oleic acid | 1 part |
| Stearic acid | 1 part |
| Methyl ethyl ketone | 300 parts |

Magnetic Coating Solution: mL-4 (tabular magnetic powder was used)

| | |
|---|---|
| Barium ferrite magnetic powder: m-4 | 100 parts |
| Composition of molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 58 emu/g | |
| Tabular diameter: 35 nm | |

-continued

| | |
|---|---|
| Tabular ratio: 4 | |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 10 parts |
| HIT55 (manufactured by Sumitomo Chemical Co., Ltd.) | |
| Carbon black | 5 parts |
| #50 (manufactured by Asahi Carbon Co., Ltd.) | |
| Phenylphosphonic acid | 3 parts |
| Lubricant | |
| Ester shown in Table 9-1 or 10-1 | |
| Stearic acid | 2 parts |
| Methyl ethyl ketone | 125 parts |
| Cyclohexanone | 125 parts |

Magnetic Coating Solution: mL-5 (tabular magnetic powder was used)

| | |
|---|---|
| Barium ferrite magnetic powder: m-5 | 100 parts |
| Composition of molar ratio based on Ba: Fe, 9.10, Co, 0.20, Zn, 0.77 | |
| Hc: 2,500 Oe | |
| Specific surface area: 50 nm | |
| $\sigma_s$: 58 emu/g | |
| Tabular diameter: 35 nm | |
| Tabular ratio: 2.5 | |
| Vinyl chloride copolymer | 10 parts |
| MR110 (manufactured by Nippon Zeon Co., Ltd.) | |
| Polyurethane resin | 4 parts |
| UR 5500 (manufactured by Toyobo Co., Ltd.) | |
| α-Alumina | 10 parts |
| HIT55 (manufactured by Sumitomo Chemical Co., Ltd.) | |
| Carbon black | 1 part |
| #50 (manufactured by Asahi Carbon Co., Ltd.) | |
| Phenylphosphonic acid | 3 parts |
| Lubricant | |
| Ester shown in Table 9-1 or 10-1 | |
| Oleic acid | 1 part |
| Stearic acid | 0.6 part |
| Ethylene glycol dioleyl | 16 parts |
| Methyl ethyl ketone | 180 parts |
| Cyclohexanone | 180 parts |

Nonmagnetic Coating Solution: nU-1 (spherical inorganic powder was used)

| | |
|---|---|
| Nonmagnetic powder, TiO$_2$, crystal system rutile | 80 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$, 8 wt % based on total particles | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Lubricant | |
| Ester shown in Table 9-1 or 10-1 | |

-continued

| | |
|---|---|
| Stearic acid | 3 parts |
| Methyl ethyl ketone/cyclohexanone (8/2 mixed solvent) | 250 parts |

Nonmagnetic Coating Solution: nU-2 (spherical inorganic powder was used)

| | |
|---|---|
| Nonmagnetic powder, TiO$_2$, crystal system rutile | 100 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$ and SiO$_2$ | |
| Carbon black | 13 parts |
| Ketjen Black EC (manufactured by Akzo Nobel Co., Ltd.) | |
| Average particle size: 30 nm | |
| DBP oil absorption: 350 ml/100 g | |
| pH: 9.5 | |
| Specific surface area (S$_{BET}$): 950 m$^2$/g | |
| Volatile content: 1.0% | |
| Vinyl chloride copolymer | 16 parts |
| MR110 (manufactured by Nippon Zeon Co., Ltd.) | |
| Polyurethane resin | 6 parts |
| UR 8200 (manufactured by Toyobo Co., Ltd.) | |
| Phenylphosphonic acid | 4 parts |
| Lubricant | |
| Ester shown in Table 9-1 or 10-1 | |
| Oleic acid | 1 part |
| Stearic acid | 0.8 part |
| Methyl ethyl ketone/cyclohexanone (8/2 mixed solvent) | 250 parts |

Nonmagnetic Coating Solution: nU-3 (spherical inorganic powder was used, comparative example)

| | |
|---|---|
| Nonmagnetic powder, TiO$_2$, crystal system rutile | 75 parts |
| Average particle size: 0.035 μm | |
| Specific surface area (S$_{BET}$): 40 m$^2$/g | |
| pH: 7 | |
| TiO$_2$ content: 90% or more | |
| DBP oil absorption: 27 to 38 ml/100 g | |
| Surface-covering compound: Al$_2$O$_3$ and SiO$_2$ | |
| Carbon black | 10 parts |
| Ketjen Black EC (manufactured by Akzo Nobel Co., Ltd.) | |
| α-Alumina | 15 parts |
| AKP-15 (manufactured by Sumitomo Chemical Co., Ltd.) | |
| Average particle size: 0.65 μm | |
| Vinyl chloride copolymer | 12 parts |
| MR110 (manufactured by Nippon Zeon Co., Ltd.) | |
| Polyurethane resin | 5 parts |
| UR 8600 (manufactured by Toyobo Co., Ltd.) | |
| Lubricant | |
| Ester shown in Table 9-1 or 10-1 | |
| Oleic acid | 1 part |
| Stearic acid | 1 part |
| Methyl ethyl ketone | 300 parts |

Nonmagnetic Coating Solution nU-4 (acicular inorganic powder was used)

| | |
|---|---|
| Nonmagnetic powder, α-Fe$_2$O$_3$, hematite<br>Long axis length: 0.15 μm<br>Specific surface area (S$_{BET}$): 50 m$^2$/g<br>pH: 9<br>Surface-covering compound: Al$_2$O$_3$,<br>8 wt % based on total particles | 80 parts |
| Carbon black<br>CONDUCTEX SC-U (manufactured by<br>Columbia Carbon Co., Ltd.) | 20 parts |
| Vinyl chloride copolymer<br>MR110 (manufactured by Nippon Zeon<br>Co., Ltd.) | 12 parts |
| Polyurethane resin<br>UR 8200 (manufactured by Toyobo Co., Ltd.) | 5 parts |
| Phenylphosphonic acid | 4 parts |
| Lubricant<br>Ester shown in Table 9-1 or 10-1 | |
| Stearic acid | 3 parts |
| Methyl ethyl ketone/cyclohexanone<br>(8/2 mixed solvent) | 250 parts |

Nonmagnetic Coating Solution nU-5 (acicular inorganic powder was used)

| | |
|---|---|
| Nonmagnetic powder, α-Fe$_2$O$_3$, hematite<br>Long axis length: 0.15 μm<br>Specific surface area (S$_{BET}$): 50 m$^2$/g<br>pH: 9<br>Surface-covering compound: Al$_2$O$_3$,<br>8 wt % based on total particles | 100 parts |
| Carbon black<br>#3250B (manufactured by Mitsubishi Kasei<br>Corp.) | 18 parts |
| Vinyl chloride copolymer<br>MR104 (manufactured by Nippon Zeon<br>Co., Ltd.) | 15 parts |
| Polyurethane resin<br>UR 5500 (manufactured by Toyobo Co., Ltd.) | 7 parts |
| Phenylphosphonic acid | 4 parts |
| Lubricant<br>Ester shown in Table 9-1 or 10-1 | |
| Oleic acid | 1.3 parts |
| Stearic acid | 0.8 part |
| Methyl ethyl ketone/cyclohexanone<br>(8/2 mixed solvent) | 250 parts |

Preparation Method 1 (disc: W/W)

Each of the above ten compositions of the coating solutions for the magnetic layer and the nonmagnetic layer was blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were respectively simultaneously multilayer-coated on a polyethylene terephthalate support having a thickness of 62 μm and a central plane average surface roughness of 3 nm of the surface side on which a magnetic layer was to be coated. The nonmagnetic layer coating solution was coated in a dry thickness of 1.5 μm, immediately thereafter the magnetic layer coating solution was coated on the nonmagnetic layer so as to give the magnetic layer having a thickness of 0.15 μm. The coated layers were subjected to random orientation while the magnetic layer and the nonmagnetic layer were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layers were subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch cartridge having a liner inside (a zip-disc cartridge manufactured by Iomega Co., Ltd., U.S.A.), and equipped the cartridge with prescribed mechanism parts to obtain a 3.7 inch floppy disc. A part of samples was subjected to machine direction orientation using Co magnets with the same pole and counter positions of 4,000 G before random orientation treatment.

In this case, it is preferred to increase the frequency and magnetic field intensity of the alternating current magnetic field generator so as to achieve finally sufficient random orientation, thereby 98% or more of orientation ratio can be obtained.

When a barium ferrite magnetic powder is used, vertical orientation can be performed besides the above-described orientation. Further, if necessary, discs after being punched may be subjected to post treatments, e.g., a thermal treatment at high temperature (generally from 50 to 90° C.) to accelerate curing of coated layers, or a burnishing treatment with an abrasive tape to scrape off surface protrusions.

Preparation Method 2 (computer tape: W/W)

Each of the above compositions of the coating solutions for the magnetic layer and the nonmagnetic layer were blended in a kneader, then dispersed with a sand mill. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were respectively simultaneously multilayer-coated on an aramide support (trade name: Mictron) having a thickness of 4.4 μm and a central plane average surface roughness of 2 nm of the surface side on which a magnetic layer was to be coated. The nonmagnetic layer coating solution was coated in a dry thickness of 1.7 μm, immediately thereafter the magnetic layer coating solution was coated on the nonmagnetic layer so as to give the magnetic layer having a thickness of 0.15 μm. The coated layers were oriented with a cobalt magnet having a magnetic force of 6,000 G and a solenoid having a magnetic force of 6,000 G while both layers were still wet. After drying, the coated layers were subjected to calendering treatment with calenders of 7 stages comprising metal rolls at 85° C. at a rate of 200 m/min. Subsequently, a backing layer (100 parts of a carbon black having an average particle size of 17 nm, 80 parts of calcium carbonate having an average particle size of 40 nm, and 5 parts of α-alumina having an average particle size of 200 nm were dispersed in a nitrocellulose resin, a polyurethane resin and a polyisocyanate) having a thickness of 0.5 µm was coated. The obtained web was slit to a width of 3.8 mm. The magnetic layer surface of the thus-produced tape was cleaned with a tape cleaning apparatus of a nonwoven fabric and a razor blade pressed against the surface of the tape, which was attached to a machine having delivery and winding-up movement of a slit product. The thus-obtained magnetic tape was incorporated in a cartridge for DDS.

Preparation Method 3 (disc: W/D)

Each of the above ten compositions of the coating solutions for the magnetic layer and the nonmagnetic layer was blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 µm to obtain coating solutions for forming the nonmagnetic layer and the magnetic layer.

The nonmagnetic layer coating solution was coated in a dry thickness of 1.5 µm on a polyethylene terephthalate support having a thickness of 62 µm and a central plane average surface roughness of 3 nm of the surface side on which the magnetic layer was to be coated, dried, and subjected to calendering treatment. The magnetic layer coating solution was coated by blade coating on the nonmagnetic layer so as to give the magnetic layer having a thickness of 0.15 µm. The coated layers were subjected to random orientation by passing through an alternating current magnetic field generator having two magnetic field intensities of frequency of 50 Hz, magnetic field intensity of 250 Gauss and frequency of 50 Hz, magnetic field intensity of 120 Gauss. The procedure was carried out in the same manner as in Preparation Method 1 hereafter. Calendering of the nonmagnetic layer may be omitted.

Preparation Method 4 (computer tape: W/D)

Each of the above compositions of the coating solutions for the magnetic layer and the nonmagnetic layer were blended in a kneader, then dispersed with a sand mill. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 µm to obtain coating solutions for forming the nonmagnetic layer and the magnetic layer.

The nonmagnetic layer coating solution was coated in a dry thickness of 1.7 µm on an aramide support (trade name: Mictron) having a thickness of 4.4 µm and a central plane average surface roughness of 2 nm of the surface side on which a magnetic layer was to be coated, dried, and subjected to calendering treatment. The magnetic layer coating solution was coated by blade coating on the nonmagnetic layer so as to give the magnetic layer having a thickness of 0.15 µm. The coated layers were oriented with a cobalt magnet having a magnetic force of 6,000 G and a solenoid having a magnetic force of 6,000 G. The procedure was carried out in the same manner as in Preparation Method 2 hereafter. Calendering of the nonmagnetic layer may be omitted.

Preparation Method 5 (disc: spin coating)

Each of the above ten compositions of the coating solutions for the magnetic layer and the nonmagnetic layer were blended in a kneader, then dispersed with a sand mill. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 µm to obtain coating solutions for forming the nonmagnetic layer and the magnetic layer.

The nonmagnetic layer coating solution was coated in a dry thickness of 1.5 µm by spin coating on a polyethylene terephthalate support having a thickness of 62 µm and a central plane average surface roughness of 3 nm of the surface side on which a magnetic layer was to be coated and dried. The magnetic layer coating solution was coated by spin coating on the nonmagnetic layer so as to give the magnetic layer having a thickness of 0.15 µm. The coated layers were oriented using Co magnets with the same pole and counter positions of 6,000 G in the circumferential direction and the surface of the layer was smoothed by batch system rolling treatment by which the same pressure as in Preparation Method 1 can be applied. The procedure was carried out in the same manner as in Preparation Method 1 hereafter. Also, the magnetic layer may be coated by spin coating on the nonmagnetic layer while the nonmagnetic layer coated by spin coating is still wet. By using the spin coating process, not only the amount of residual magnetization in the recording direction can be made large but also vertical magnetization components of the barium ferrite powder and the ferromagnetic metal powder of short acicular ratio can be reduced and symmetric property of reproduced wave form can be improved.

Lubricant: Diester
  L-a1: $C_{17}H_{35}COO(CH_2)_4OCOC_{17}H_{35}$
  L-a2: $C_{11}H_{21}COO(CH_2)_4OCOC_{11}H_{21}$
  L-a3: $C_{17}H_{33}COO(CH_2)_2OCOC_{17}H_{33}$
  L-a4: $C_{11}H_{23}COO(CH_2)_4OCOC_{11}H_{23}$
  L-a5: $C_{27}H_{53}COO(CH_2)_4OCOC_{27}H_{53}$
  L-a6: $C_{11}H_{21}COO(CH_2)_4OCOC_{17}H_{33}$
  L-a7: $C_{17}H_{33}COO(CH_2)_{11}OCOC_{17}H_{33}$
  L-a8: $C_{17}H_{33}COOCH_2CH=CHCH_2OCOC_{17}H_{33}$
  L-a9: $C_{14}H_{27}COOCH_2CH=CHCH_2OCOC_{14}H_{27}$
  L-a10: $C_{17}H_{33}COO(CH_2)_8OCOC_{14}H_{27}$
  L-a11: $C_{17}H_{33}COOCH_2C(CH_3)_2CH_2OCOC_{17}H_{33}$
  L-a12: $C_{10}H_{21}COOCH_2C(CH_3)_2CH_2OCOC_{10}H_{21}$
  L-a13: $C_{13}H_{27}COO(CH_2)_3OCOC_{13}H_{27}$ Lubricant: Monoester
  L-b1: $C_{17}H_{35}COOC_{17}H_{35}$
  L-b2: $C_{17}H_{35}COOC_4H_9$
  L-b3: $C_{17}H_{35}COOCH_2CH_2OC_4H_9$
  L-b4: $C_{17}H_{35}COO(CH_2CH_2O)_2C_4H_9$ Support b-1: Polyethylene Terephthalate Thickness: 62 µm F-5 value:
  MD: 114 MPa, TD: 107 MPa Breaking strength:
  MD: 276 MPa, TD: 281 MPa
Breaking extension:
  MD: 174%, TD: 139%
Thermal shrinkage factor (80° C., 30 minutes):
  MD: 0.04%, TD: 0.05%
Thermal shrinkage factor (100° C., 30 minutes):
  MD: 0.2%, TD: 0.3%
Temperature expansion coefficient:
  Long axis: $15 \times 10^{-5}$/° C.
  Short axis: $18 \times 10^{-5}$/° C.
Central plane average surface roughness: 3 nm Support b-2: Polyethylene Naphthalate Thickness: 55 μm
Central plane average surface roughness: 1.8 nm
Thermal shrinkage factor (80° C., 30 minutes):
  MD: 0.007%, TD: 0.007%
Thermal shrinkage factor (100° C., 30 minutes):
  MD: 0.02%, TD: 0.02%
Temperature expansion coefficient:
  Long axis: $10 \times 10^{-5}$/° C.
  Short axis: $11 \times 10^{-5}$/° C.

Support b-3: Polyethylene Terephthalate

Thickness: 62 μm
Central plane average surface roughness: 9 nm

Support b-4: Aramide

Thickness: 4.4 μm
Central plane average surface roughness: 2 nm

Orientation o-1: Random orientation
o-2: Orientation in the machine direction using a Co magnet first, then random orientation
o-3: Orientation in the machine direction using a Co magnet first, then in the machine direction using a solenoid
o-4: Orientation in the vertical direction using a Co magnet
o-5: Orientation in the circumferential direction using a Co magnet Backing Layer Coating Solution: bL-1

| | |
|---|---|
| Fine carbon black powder BP-800 (average particle size: 17 nm, manufactured by Cabot Co., Ltd.) | 100 parts |
| Coarse carbon black powder Thermal Black (average particle size: 270 nm, manufactured by Cancarb Co., Ltd.) | 10 parts |
| Calcium carbonate (soft inorganic powder) Hakuenka O (average particle size: 40 nm, Mohs' hardness: 3, manufactured by Shiraishi Kogyo Co., Ltd.) | 80 parts |
| α-Alumina (hard inorganic powder) (average particle size: 200 nm, Mohs' hardness: 9) | 5 parts |
| Nitrocellulose resin | 140 parts |
| Polyurethane resin | 15 parts |
| Polyisocyanate | 40 parts |
| Polyester resin | 5 parts |
| Dispersant: | |
| Copper oleate | 5 parts |
| Copper phthalocyanine | 5 parts |
| Barium sulfate | 5 parts |
| Methyl ethyl ketone | 2,200 parts |
| Butyl acetate | 300 parts |
| Toluene | 600 parts |

The above compositions of the coating solution for the backing layer were blended in a continuous kneader, then dispersed with a sand mill. The resulting dispersion solution was filtered through a filter having an average pore diameter of 1 μm to obtain a coating solution for forming the backing layer.

With respect to samples obtained by combining the above-described each method arbitrarily as shown in Table 5 or 7, magnetic characteristics, central plane average surface roughness, areal recording density, etc., were determined and the results obtained are shown in Table 6 or 8.

(1) Magnetic Characteristics (Hc):
Magnetic characteristics were measured using a vibrating sample magnetometer (a product of Toei Kogyo Co., Ltd.) at Hm 10 KOe.

(2) Central Plane Average Surface Roughness (Ra):
Surface roughness (Ra) of the area of about 250 μm×250 μm, was measured using "TOPO3D" (a product of WYKO Co., Ltd., U.S.A.) by 3D-MIRAU method. The wavelength of measurement was about 650 nm and spherical compensation and cylindrical compensation were applied. Measurement was performed using a light interference type non-contact surface roughness meter.

(3) Linear Recording Density:
Linear recording density means a bit number of signals recorded per 1 inch in the recording direction.

(4) Track Density:
Track density means a track number per 1 inch.

(5) Areal Recording Density:
Areal recording density means a value obtained by multiplying linear recording density by track density.

(6) φm:
φm is the amount of magnetization per unit area of a magnetic recording medium, which is represented by Bm (Gauss) multiplying thickness. This is the value obtained by using a vibrating sample magnetometer (a product of Toei Kogyo Co., Ltd.) at Hm 10 KOe, which can be directly measured.

These linear recording density, track density and areal recording density are values determined by systems to be used.

(7) Error Rate of Disc:
The above signals of linear recording density were recorded on the disc by (2,7) RLL modulation system and error rate of the disc was measured.

(8) Error Rate of Tape:
The above signals of linear recording density were recorded on the tape by 8–10 conversion PR1 equalization system and error rate of the tape was measured using a DDS drive.

(9) Thickness of Magnetic Layer:

The sample having the thickness of about 0.1 μm was cut out with a diamond cutter in the machine direction of the magnetic medium, observed with a transmission type electron microscope of from 10,000 to 100,000, preferably from 20,000 to 50,000 magnifications and photographed. The print size of the photograph was from A4 (i.e., 297×210 mm) to A5 (i.e., 210×148 mm) sizes. The present inventors paid attentions to the difference of the shapes of the ferromagnetic powders and the nonmagnetic powders of the magnetic layer and the nonmagnetic layer and rimmed the interface of the magnetic layer and the nonmagnetic layer and also the surface of the magnetic layer with black color by visual judgement. Thereafter, the distance of the rimmed lines was measured by the image processing apparatus "IBAS2" (manufactured by Zeiss Corp.). Measurement was conducted from 85 to 300 times when the length of the sample photograph was 21 cm. The average measured value at that time was taken as the magnetic layer thickness d. d was obtained according to the description in JP-A-5-298653.

(10) Measuring Methods of Particle Sizes of Magnetic Powder and Abrasive:

Measurement of particle size distribution of magnetic powder:

Particles of the magnetic powder of the sample were observed using a transmission type electron microscope, particles on the printed photograph were measured one by one with an image analyzer and particle size distribution of the magnetic powder was obtained.

1. Preparation of Sample

About one earpickful of the magnetic powder was put in a weighing bottle containing about 10 ml of water, the content was dispersed by ultrasonics for about 10 minutes, then scooped with copper mesh on which a collodion membrane was formed, and dried, which was reinforced by carbon vapor deposition and used as a sample for observation.

2. Observation of Particles and Photographic Print Observation:

Apparatus: a transmission type electron microscope

Photographing magnification: 60,000-fold

Photographic Print:

Overall magnification: 200,000-fold

Overall magnification was corrected from the diffraction grating images of simultaneous observation.

3. Measurement of Particle Size

Apparatus: image analyzer KS400 manufactured by KONTRON Co., Ltd.

Method: The outline of the particle on the photograph was traced on a digitizer with a slicing pen and the long axis length and the short axis length were measured. The averages of long axis lengths and short axis lengths were respectively taken as the average long axis length and the average short axis length, and the ratio thereof (average long axis length/average short axis length) was taken as the acicular ratio.

Number of particles measured: 500

Measurement of particle size distribution of abrasive:

Particles of the abrasive of the sample were observed using a transmission type electron microscope, particles of the printed photograph were measured one by one with an image analyzer and particle size distribution of the abrasive was obtained.

1. Preparation of Sample

About one earpickful of the abrasive was put in a weighing bottle containing about 10 ml of water, the content was dispersed by ultrasonics for about 10 minutes, then scooped with copper mesh on which a collodion membrane was formed, and dried, which was reinforced by carbon vapor deposition and used as a sample for observation.

2. Observation of Particles and Photographic Print Observation:

Apparatus: a transmission type electron microscope

Photographing magnification: 10,000-fold

Photographic Print:

Overall magnification: 30,000-fold

Overall magnification was corrected from the diffraction grating images of simultaneous observation.

3. Measurement of Particle Size

Apparatus: image analyzer KS400 manufactured by KONTRON Co., Ltd.

Method: The outline of the particle on the photograph was traced on a digitizer with a slicing pen and the particle size was measured. The average value of determined particles was taken as the average particle size.

Parameter of measurement: equivalent-circle diameter

Number of particles measured: 500

(11) Running Durability:

A floppy disc drive ("ZIP100", a product of IOMEGA CORP., U.S.A., rotation number: 2,968 rpm) was used. The head was fixed at the position of radius of 38 mm. Recording was conducted at recording density of 34 kfci, then reproduced the signals recorded and this was taken as 100%. The disc was run for 1,500 hours under the following thermocycle condition, which being taken as one cycle. Output was monitored every 24 hours of running and the point when the initial reproduction output became 70% or less was taken as NG.

Thermo-Cycle Flow

25° C., 50% RH, 1 hr→(temperature up, 2 hr)→60° C., 20% RH, 7 hr→(temperature down, 2 hr)→25° C., 50% RH, 1 hr→(temperature down, 2 hr)→5° C., 50% RH, 7 hr→(temperature up, 2 hr)→(this cycle was repeated).

(12) Liner Wear:

A sample was run for 1,000 hours under the same condition as in the evaluation of running durability with the head being off, and after completion of running, cartridge case of the sample was opened and the surface of the magnetic layer was visually evaluated by the following criteria.

o: No defect was observed on the surface of the magnetic layer.

Δ: Fine scratches were generated on a part of the surface of the magnetic layer.

x: Fine scratches were generated on the entire surface of the magnetic layer.

(13) Liner Adhesion:

A sample was run for 1,000 hours under the same condition as in the evaluation of running durability with the head being off, and after completion of running, cartridge case of the sample was opened and the surface of the magnetic layer was visually evaluated by the following criteria.

o: Liner was not adhered on the surface of the magnetic layer.

Δ: Liner was adhered on a part of the surface of the magnetic layer.

x: Liner was adhered on the entire surface of the magnetic layer.

(14) Starting Torque:

Starting torque at the time of head-on in LS-102 drive (a product of Imation Co., Ltd.) was determined using torque gauge model 300 ATG (a product of Tonichi Seisakusho Co., Ltd.) (unit: g·cm).

TABLE 5

Disc

| | | Magnetic Layer | | | | | | | |
|---|---|---|---|---|---|---|---|---|---|
| Sample No. | Prescription | Thickness ($\mu$m) | Hc (Oe) | Surface Roughness (nm) | $\phi$m (emu/cm$^2$) | Lower Layer | Support | Preparation Method | Orientation |
| 1 | mL-2 | 0.15 | 2,360 | 3.5 | 4.8 × 10$^{-3}$ | nU-1 | b-1 | Method 1 | o-3 |
| 2 | mL-2 | 0.15 | 2,360 | 2.3 | 4.8 × 10$^{-3}$ | nU-2 | b-1 | Method 1 | o-1 |
| 3 | mL-2 | 0.15 | 2,360 | 1.9 | 4.8 × 10$^{-3}$ | nU-4 | b-1 | Method 1 | o-1 |
| 4 | mL-2 | 0.15 | 2,360 | 1.7 | 4.8 × 10$^{-3}$ | nU-5 | b-1 | Method 1 | o-1 |
| 5 | mL-2 | 0.05 | 2,400 | 1.4 | 1.6 × 10$^{-3}$ | nU-5 | b-1 | Method 1 | o-1 |
| 6 | mL-2 | 0.10 | 2,380 | 1.6 | 3.2 × 10$^{-3}$ | nU-5 | b-1 | Method 1 | o-1 |
| 7 | mL-2 | 0.20 | 2,330 | 1.9 | 6.4 × 10$^{-3}$ | nU-5 | b-1 | Method 1 | o-1 |
| 8 | mL-2 | 0.15 | 2,360 | 1.5 | 4.8 × 10$^{-3}$ | nU-5 | b-2 | Method 1 | o-1 |
| 9 | mL-1 | 0.15 | 2,550 | 2.5 | 4.2 × 10$^{-3}$ | nU-5 | b-1 | Method 1 | o-1 |
| 10 | mL-4 | 0.15 | 2,500 | 2.2 | 2.1 × 10$^{-3}$ | nU-5 | b-1 | Method 1 | o-1 |
| 11 | mL-5 | 0.15 | 2,500 | 1.8 | 2.4 × 10$^{-3}$ | nU-5 | b-1 | Method 1 | o-1 |
| 12 | mL-2 | 0.15 | 2,360 | 2.5 | 4.8 × 10$^{-3}$ | nU-5 | b-1 | Method 3 | o-1 |
| 13 | mL-2 | 0.15 | 2,360 | 1.7 | 4.8 × 10$^{-3}$ | nU-5 | b-1 | Method 1 | o-2 |
| 14 | mL-5 | 0.15 | 2,500 | 1.8 | 2.5 × 10$^{-3}$ | nU-5 | b-1 | Method 1 | o-2 |
| 15 | mL-4 | 0.15 | 2,700 | 1.9 | 2.3 × 10$^{-3}$ | nU-5 | b-1 | Method 1 | o-4 |
| 16 | mL-2 | 0.15 | 2,660 | 1.6 | 4.8 × 10$^{-3}$ | nU-5 | b-1 | Method 5 | o-5 |
| 17 | mL-4 | 0.15 | 2,700 | 1.8 | 2.3 × 10$^{-3}$ | nU-5 | b-1 | Method 5 | o-5 |

TABLE 6

Disc

| Sample No. | Track Density (tpi) | Linear Recording Density (kbpi) | Areal Recording Density (G bit/inch$^2$) | Error Rate (10$^{-5}$) |
|---|---|---|---|---|
| 1 | 5,200 | 144 | 0.75 | 0.2 |
| 2 | 5,200 | 144 | 0.75 | 0.08 |
| 3 | 5,200 | 144 | 0.75 | 0.03 |
| 4 | 5,200 | 144 | 0.75 | 0.01 |
| 5 | 5,200 | 144 | 0.75 | 0.06 |
| 6 | 5,200 | 144 | 0.75 | 0.01 |
| 7 | 5,200 | 144 | 0.75 | 0.2 |
| 8 | 5,200 | 144 | 0.75 | 0.008 |
| 9 | 5,200 | 144 | 0.75 | 0.004 |
| 10 | 5,200 | 144 | 0.75 | 0.01 |
| 11 | 5,200 | 144 | 0.75 | 0.005 |
| 12 | 5,200 | 144 | 0.75 | 0.1 |
| 13 | 5,200 | 144 | 0.75 | 0.001 |
| 14 | 5,200 | 144 | 0.75 | 0.0006 |
| 15 | 5,200 | 144 | 0.75 | 0.0004 |
| 16 | 5,200 | 144 | 0.75 | 0.0002 |

TABLE 6-continued

Disc

| Sample No. | Track Density (tpi) | Linear Recording Density (kbpi) | Areal Recording Density (G bit/inch$^2$) | Error Rate (10$^{-5}$) |
|---|---|---|---|---|
| 17 | 5,200 | 144 | 0.75 | 0.0001 |
| 18 | 7,500 | 200 | 1.5 | 0.8 |
| 19 | 6,000 | 166 | 1.0 | 0.08 |
| 20 | 3,000 | 120 | 0.36 | 0.007 |

In each of Sample Nos. 18 to 20, the disc of Sample No. 13 was used and error rate was determined with varying linear recording density and track density.

TABLE 7

Computer Tape

| | | Magnetic Layer | | | | | | | |
|---|---|---|---|---|---|---|---|---|---|
| Sample No. | Prescription | Thickness ($\mu$m) | Hc (Oe) | Surface Roughness | $\phi$m (emu/cm$^2$) | Lower Layer | Support | Preparation Method | Orientation |
| 21 | mL-2 | 0.15 | 2,460 | 3.7 nm | 4.8 × 10$^{-3}$ | nU-1 | b-4 | Method 3 | o-3 |
| 22 | mL-2 | 0.15 | 2,460 | 2.4 nm | .8 × 10$^{-3}$ | nU-2 | b-4 | Method 3 | o-3 |
| 24 | mL-2 | 0.15 | 2,460 | 1.8 nm | 4.8 × 10$^{-3}$ | nU-5 | b-4 | Method 3 | o-3 |
| 25 | mL-2 | 0.05 | 2,500 | 1.7 nm | 1.6 × 10$^{-3}$ | nU-5 | b-4 | Method 3 | o-3 |
| 26 | mL-2 | 0.10 | 2,480 | 1.7 nm | 3.2 × 10$^{-3}$ | nU-5 | b-4 | Method 3 | o-3 |
| 27 | mL-2 | 0.20 | 2,430 | 2.0 nm | 6.4 × 10$^{-3}$ | nU-5 | b-4 | Method 3 | o-3 |
| 28 | mL-1 | 0.15 | 2,650 | 2.6 nm | 4.2 × 10$^{-3}$ | nU-5 | b-4 | Method 3 | o-3 |
| 29 | mL-2 | 0.15 | 2,460 | 2.7 nm | 4.8 × 10$^{-3}$ | nU-5 | b-4 | Method 4 | o-3 |

TABLE 8

| Sample No. | Track Density (tpi) | Linear Recording Density (kbpi) | Areal Recording Density (G bit/inch$^2$) | Error Rate ($10^{-5}$) |
|---|---|---|---|---|
| 21 | 3,000 | 122 | 0.366 | 0.09 |
| 22 | 3,000 | 122 | 0.366 | 0.02 |
| 23 | 3,000 | 122 | 0.366 | 0.003 |
| 24 | 3,000 | 122 | 0.366 | 0.001 |
| 25 | 3,000 | 122 | 0.366 | 0.01 |
| 26 | 3,000 | 122 | 0.366 | 0.002 |
| 27 | 3,000 | 122 | 0.366 | 0.01 |
| 28 | 3,000 | 122 | 0.366 | 0.0005 |
| 29 | 3,000 | 122 | 0.366 | 0.02 |
| 30 | 4,000 | 150 | 0.6 | 0.02 |
| 31 | 5,000 | 170 | 0.85 | 0.5 |

As described above, the above signals of linear recording density were recorded on the tape by 8–10 conversion PR1 equalization system and error rate of the tape was measured using a DDS drive. In each of Sample Nos. 30 and 31, the tape of Sample No. 24 was used and error rate was measured with varying linear recording density and track density.

TABLE 9-1

| | | Disc | | | | | | |
|---|---|---|---|---|---|---|---|---|
| | | Lubricant for Upper Magnetic Layer | | | | Lubricant for Lower Nonmagnetic Layer | | |
| Medium No. | Sample No. | Kind | Amount (part) | Kind | Amount (part) | Kind | Amount (part) | Kind | Amount (part) |
| 1 | 1 | L-a3 | 6 | L-b2 | 6 | L-a3 | 8 | L-b2 | 8 |
| 2 | 1 | L-a3 | 6 | L-b3 | 6 | L-a3 | 8 | L-b3 | 8 |
| 3 | 1 | L-a3 | 6 | L-b4 | 6 | L-a3 | 8 | L-b4 | 8 |
| 4 | 1 | L-a3 | 9 | L-b3 | 3 | L-a3 | 12 | L-b3 | 4 |
| 5 | 1 | L-a3 | 3 | L-b3 | 9 | L-a3 | 4 | L-b3 | 12 |
| 6 | 1 | L-a3 | 6 | L-b3 | 6 | L-a3 | 12 | L-b3 | 4 |
| 7 | 1 | L-a1 | 6 | L-b3 | 6 | L-a1 | 8 | L-b3 | 8 |
| 8 | 1 | L-a8 | 6 | L-b3 | 6 | L-a8 | 8 | L-b3 | 5 |
| 9 | 1 | L-a3 | 6 | L-b3 | 6 | L-a1 | 8 | L-b3 | 8 |
| 10 | 1 | L-a3 | 6 | L-b3 | 6 | L-a3 | 8 | L-b2 | 8 |
| 11 | 1 | L-a3 | 6 | L-b2 | 6 | L-a3 | 8 | L-a3 | 8 |
| 12 | 1 | L-a3 | 6 | L-b3 | 3 | L-a3 | 8 | L-b3 | 8 |
| 13 | 1 | L-a3 | 6 | L-b3 | 3 | L-a3 | 8 | L-b3 | 5 |
| 14 | 1 | L-a3 | 6 | L-b3 | 6 | L-a3 | 8 | L-b3 | 5 |
| 15 | 1 | L-a3 | 3 | L-b3 | 3 | L-a3 | 5 | L-b3 | 5 |
| 16 | 1 | L-a3 | 8 | L-b3 | 8 | L-a3 | 10 | L-b3 | 10 |
| 17 | 1 | L-a3 | 6 | L-b3 | 6 | L-a3 | 10 | L-b3 | 8 |
| 18 | 3 | L-a3 | 6 | L-b3 | 6 | L-a3 | 8 | L-b3 | 8 |
| 19 | 6 | L-a3 | 6 | L-b3 | 6 | L-a3 | 8 | L-b3 | 8 |
| 20 | 9 | L-a3 | 6 | L-b3 | 6 | L-a3 | 8 | L-b3 | 8 |

TABLE 9-2

| | | Disc | | | | |
|---|---|---|---|---|---|---|
| Medium No. | Sample No. | C/Fe | Running Durability | Liner Wear | Liner Adhesion | Starting Torque |
| 1 | 1 | 55 | 1,200 | ○ | ○ | 60 |
| 2 | 1 | 50 | 1,500 | ○ | ○ | 53 |
| 3 | 1 | 50 | 1,440 | ○ | ○ | 59 |
| 4 | 1 | 35 | 1,500 | ○ | ○ | 55 |
| 5 | 1 | 70 | 1,080 | ○ | ○ | 65 |
| 6 | 1 | 40 | 1,500 | ○ | ○ | 56 |
| 7 | 1 | 25 | 1,008 | ○ | ○ | 64 |
| 8 | 1 | 20 | 1,200 | ○ | ○ | 54 |
| 9 | 1 | 30 | 1,104 | ○ | ○ | 63 |
| 10 | 1 | 50 | 1,032 | ○ | ○ | 65 |
| 11 | 1 | 55 | 1,008 | ○ | ○ | 60 |
| 12 | 1 | 45 | 1,500 | ○ | ○ | 54 |
| 13 | 1 | 40 | 1,464 | ○ | ○ | 54 |
| 14 | 1 | 40 | 1,440 | ○ | ○ | 55 |
| 15 | 1 | 30 | 1,008 | ○ | ○ | 50 |
| 16 | 1 | 65 | 1,320 | ○ | ○ | 68 |
| 17 | 1 | 60 | 1,500 | ○ | ○ | 55 |
| 18 | 3 | 95 | 1,008 | ○ | ○ | 65 |
| 19 | 6 | 90 | 972 | ○ | ○ | 70 |
| 20 | 9 | 90 | 1,080 | ○ | ○ | 61 |

TABLE 10-1

| | | Disc | | | | | | |
|---|---|---|---|---|---|---|---|---|
| | | Lubricant for Upper Magnetic Layer | | | | Lubricant for Lower Nonmagnetic Layer | | |
| Medium No. | Sample No. | Kind | Amount (part) | Kind | Amount (part) | Kind | Amount (part) | Kind | Amount (part) |
| 21 | 10 | L-a3 | 6 | L-b3 | 6 | L-a3 | 10 | L-b3 | 8 |
| 22 | 11 | L-a3 | 6 | L-b3 | 6 | L-a3 | 10 | L-b3 | 8 |
| 23 | 15 | L-a3 | 6 | L-b3 | 6 | L-a3 | 10 | L-b3 | 8 |
| 24 | 1 | L-a3 | 4 | L-b2 | 4 | L-a3 | 6 | L-b2 | 6 |
| | | | | L-b3 | 4 | | | L-b3 | 6 |
| 25 | 1 | L-a1 | 4 | L-b2 | 4 | L-a3 | 6 | L-b2 | 6 |
| | | | | L-b4 | 4 | | | L-b4 | 6 |
| 26 | 1 | L-a1 | 12 | | | L-a1 | 16 | | |
| 27 | 1 | L-a3 | 12 | | | L-a3 | 16 | | |
| 28 | 1 | L-a8 | 12 | | | L-a8 | 16 | | |
| 29 | 1 | L-b2 | 12 | | | L-b2 | 16 | | |
| 30 | 1 | L-a3 | 12 | | | L-b3 | 16 | | |
| 31 | 1 | L-b3 | 12 | | | L-a3 | 16 | | |
| 32 | 1 | L-a1 | 6 | L-a3 | 6 | L-a1 | 8 | L-a3 | 8 |
| 33 | 1 | L-b2 | 6 | L-b3 | 6 | L-b2 | 8 | L-b3 | 8 |
| 34 | 2 | L-a11 | 8 | L-b3 | 2 | L-a11 | 8 | L-b3 | 2 |
| 35 | 2 | L-a11 | 12 | L-b3 | 2 | L-a11 | 12 | L-b3 | 2 |
| 36 | 2 | L-a11 | 20 | L-b3 | 2 | L-a11 | 20 | L-b3 | 2 |
| 37 | 2 | L-a3 | 14 | L-b3 | 2 | L-a3 | 14 | L-b3 | 2 |
| 38 | 2 | L-a12 | 16 | L-b3 | 2 | L-a12 | 16 | L-b3 | 2 |
| 39 | 2 | L-a13 | 16 | L-b3 | 2 | L-a13 | 16 | L-b3 | 2 |

TABLE 10-2

| | | Disc | | | |
|---|---|---|---|---|---|
| Medium No. | Sample No. | C/Fe | Running Durability | Liner Wear | Liner Adhesion | Starting Torque |
| 21 | 10 | 10 | 1,500 | ○ | ○ | 59 |
| 22 | 11 | 15 | 1,224 | ○ | ○ | 62 |
| 23 | 15 | 10 | 1,320 | ○ | ○ | 65 |
| 24 | 1 | 40 | 1,500 | ○ | ○ | 56 |
| 25 | 1 | 35 | 1,416 | ○ | ○ | 55 |
| 26 | 1 | 10 | 552 | ○ | ○ | 52 |
| 27 | 1 | 15 | 600 | ○ | ○ | 50 |
| 28 | 1 | 10 | 576 | Δ | ○ | 51 |
| 29 | 1 | 85 | 480 | ○ | Δ | 80 |
| 30 | 1 | 70 | 528 | ○ | Δ | 73 |
| 31 | 1 | 20 | 600 | ○ | ○ | 64 |
| 32 | 1 | 10 | 576 | ○ | ○ | 59 |
| 33 | 1 | 80 | 480 | ○ | Δ | 81 |
| 34 | 2 | 5 | 1,500 | ○ | ○ | 30 |
| 35 | 2 | 18 | 1,500 | ○ | ○ | 35 |
| 36 | 2 | 80 | 1,500 | ○ | ○ | 45 |
| 37 | 2 | 36 | 1,500 | ○ | ○ | 40 |
| 38 | 2 | 48 | 1,500 | ○ | ○ | 40 |
| 39 | 2 | 45 | 1,500 | ○ | ○ | 40 |

As is apparent from the results in Tables 9 and 10, when monoester and diester lubricants according to the present invention are used in combination, running durability, liner wear, liner adhesion and starting torque were markedly improved.

Further, though the results of experiment are not described, when the above monoester and diester lubricants are used in computer tapes in combination, the magnetic medium of the present invention exhibited excellent characteristics, e.g., low friction coefficient, excellent durability without causing clogging, and excellent abrasion resistance, after smooth 100 passes or even after 1,000 passes.

EXAMPLE 36

Magnetic characteristics of the magnetic powders used in Example 36 are shown in Tables 11 and 12 below.

TABLE 11

| | Barium Ferrite Magnetic Powder | | | | |
|---|---|---|---|---|---|
| Magnetic Powder | Average Particle Size (nm) | Tabular Ratio | Hc (Oe) | $\sigma_s$ (emu/g) | Element Contained (mol per mol of Ba) |
| BaF (1) | 25 | 3 | 2,380 | 56 | Zn: 0.8<br>Co: 0.2<br>Nb: 0.45<br>Al: 1.5 |
| BaF (2) | 20 | 3 | 2,030 | 49 | Zn: 0.8<br>Co: 0.1<br>Nb: 0.5<br>Al: 2 |
| BaF (3) | 25 | 3 | 2,310 | 58 | Zn: 0.6<br>Co: 0.1<br>Nb: 0.4<br>Al: 2 |
| BaF (4) | 25 | 3 | 1,830 | 55 | Zn: 0.6<br>Co: 0.3<br>Nb: 0.6<br>Al: 2 |
| BaF (5) | 25 | 3 | 2,960 | 54 | Zn: 0.4<br>Co: 0.1<br>Nb: 0.3<br>Al: 2 |
| BaF (6) | 25 | 3 | 1,720 | 53 | Zn: 0.7<br>Co: 0.4<br>Nb: 0.6<br>Al: 2 |

TABLE 12

Ferromagnetic Metal Powder

| Magnetic Powder | Average Long Axis Length (nm) | Acicular Ratio | Hc (Oe) | $\sigma_s$ (emu/g) | Element Contained (mol per 100 mol of Fe) |
|---|---|---|---|---|---|
| MP (1) | 80 | 5 | 2,340 | 160 | Co: 30 Al: 7 Y: 6 |
| MP (2) | 50 | 6 | 2,320 | 140 | Co: 30 Al: 10 Y: 5 |
| MP (3) | 80 | 5 | 1,890 | 140 | Co: 20 Al: 7 Y: 5 |
| MP (4) | 80 | 5 | 1,700 | 140 | Co: 20 Al: 6 Y: 6 |

Magnetic discs and magnetic tapes were produced as follows using the magnetic powders shown in Tables 11 and 12.

Preparation of Coating Solution

Magnetic Coating Solution 1 (hexagonal ferrite powder, disc)

| | |
|---|---|
| Barium ferrite magnetic powder BaF (1) to BaF (6) | 100 parts |
| Vinyl chloride copolymer MR555 (manufactured by Nippon Zeon Co., Ltd.) | 5 parts |
| Polyurethane resin UR 8200 (manufactured by Toyobo Co., Ltd.) | 3 parts |
| Carbon black #55 (manufactured by Asahi Carbon Co., Ltd.) | 1 part |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Magnetic Coating Solution 2 (hexagonal ferrite powder, tape)

| | |
|---|---|
| Barium ferrite magnetic powder BaF (1) and BaF (2) | 100 parts |
| Vinyl chloride copolymer MR555 (manufactured by Nippon Zeon Co., Ltd.) | 6 parts |
| Polyurethane resin UR 8200 (manufactured by Toyobo Co., Ltd.) | 3 parts |
| Carbon black (average particle size: 0.015 μm) #55 (manufactured by Asahi Carbon Co., Ltd.) | 5 parts |
| Phenylphosphonic acid | 2 parts |
| Butyl stearate | 1 part |
| Stearic acid | 2 parts |
| Methyl ethyl ketone | 125 parts |
| Cyclohexanone | 125 parts |

Magnetic Coating Solution 3 (ferromagnetic metal powder, disc)

| | |
|---|---|
| Ferromagnetic metal fine powder MP (1) to MP (4) | 100 parts |
| Vinyl chloride copolymer MR110 (manufactured by Nippon Zeon Co., Ltd.) | 12 parts |
| Polyurethane resin UR 8200 (manufactured by Toyobo Co., Ltd.) | 3 parts |
| Carbon black #55 (manufactured by Asahi Carbon Co., Ltd.) | 5 parts |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

Magnetic Coating Solution 4 (ferromagnetic metal powder, tape)

| | |
|---|---|
| Ferromagnetic metal fine powder MP (1) and MP (2) | 100 parts |
| Vinyl chloride copolymer MR110 (manufactured by Nippon Zeon Co., Ltd.) | 12 parts |
| Polyurethane resin UR 8200 (manufactured by Toyobo Co., Ltd.) | 3 parts |
| Carbon black #55 (manufactured by Asahi Carbon Co., Ltd.) | 1 part |
| Butyl stearate | 1 part |
| Stearic acid | 5 parts |
| Methyl ethyl ketone | 100 parts |
| Cyclohexanone | 20 parts |
| Toluene | 60 parts |

Nonmagnetic Coating Solution 5 (for a lower layer, disc)

| | |
|---|---|
| Nonmagnetic powder, TiO$_2$, crystal system rutile Average particle size: 0.035 μm Specific surface area (S$_{BET}$): 40 m$^2$/g pH: 7 TiO$_2$ content: 90% or more DBP oil absorption: 27 to 38 ml/100 g Surface-covering compound: Al$_2$O$_3$, 8 wt % based on total particles | 80 parts |
| Carbon black CONDUCTEX SC-U (manufactured by Columbia Carbon Co., Ltd.) | 20 parts |
| Vinyl chloride copolymer MR110 (manufactured by Nippon Zeon Co., Ltd.) | 12 parts |
| Polyurethane resin UR 8200 (manufactured by Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

Nonmagnetic Coating Solution 6 (for a lower layer, tape)

| | |
|---|---|
| Nonmagnetic powder, TiO$_2$, crystal system rutile<br>Average particle size: 0.035 μm<br>Specific surface area (S$_{BET}$): 40 m$^2$/g<br>pH: 7<br>TiO$_2$ content: 90% or more<br>DBP oil absorption: 27 to 38 ml/100 g<br>Surface-covering compound: Al$_2$O$_3$,<br>8 wt % based on total particles | 80 parts |
| Carbon black<br>CONDUCTEX SC-U (manufactured by<br>Columbia Carbon Co., Ltd.) | 20 parts |
| Vinyl chloride copolymer<br>MR110 (manufactured by Nippon Zeon<br>Co., Ltd.) | 12 parts |
| Polyurethane resin<br>UR 8200 (manufactured by Toyobo Co., Ltd.) | 5 parts |
| Phenylphosphonic acid | 4 parts |
| Butyl stearate | 1 part |
| Stearic acid | 3 parts |
| Methyl ethyl ketone/cyclohexanone<br>(8/2 mixed solvent) | 250 parts |

Preparation Method 1 (disc)

Each of the above compositions of the coating solutions for the magnetic layer and the nonmagnetic layer was blended in a kneader, then the prescribed amount of the diamond fine particle shown in Table 13-1 or 14-1 was added (or not added) to each solution and dispersed with a sand mill. Subsequently, the prescribed amount of dispersed α-alumina HIT55 (SLH55, manufactured by Sumitomo Chemical Co., Ltd) shown in Table 13-1 or 14-1 was added (or not added), further, polyisocyanate was added to each resulting dispersion solution, in an amount of 10 parts to the lower layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic lower layer and the magnetic layer.

These coating solutions obtained were respectively simultaneously multilayer-coated on a polyethylene terephthalate support having a thickness of 62 μm and a central plane average surface roughness of 3 nm of the surface side on which a magnetic layer was to be coated. The nonmagnetic lower layer coating solution was coated in a dry thickness of 1.5 μm, immediately thereafter the magnetic layer coating solution was coated on the nonmagnetic layer so as to give the magnetic layer having the thickness of 0.2 μm. When ferromagnetic metal powders were used, the layer containing the ferromagnetic metal powder was subjected to random orientation, while the magnetic layer and the nonmagnetic layer were still wet, by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layer was subjected to calendering treatment with calenders of 7 stages at 90° C. at line pressure of 300 kg/cm. The obtained web was punched to a disc of 3.5 inches, the disc was subjected to a surface treatment by abrasives, thereby a magnetic recording disc was obtained. When the hexagonal ferrite magnetic powder was used, a magnetic recording disc was produced in the same producing steps as above except that random orientation was omitted.

Preparation Method 1–2 (disc)

Magnetic recording disc No. 16 in Table 14-1 was prepared in the same manner as in Preparation Method 1, except that the polyethylene terephthalate support having a central plane average surface roughness of 7 nm was used.

Preparation Method 2 (computer tape)

Each of the above compositions of the coating solutions for the magnetic layer and the nonmagnetic lower layer was blended in a kneader, then the prescribed amount of the diamond fine particle shown in Table 15-1 was added (or not added) to each solution, further, the prescribed amount of dispersed α-alumina HIT55 (SLH55, manufactured by Sumitomo Chemical Co., Ltd) shown in Table 15-1 was added (or not added) and dispersed with a sand, mill. Subsequently, polyisocyanate was added to each resulting dispersion solution, in an amount of 2.5 parts to the lower layer coating solution, and 3 parts to the magnetic layer coating solution. Further, 40 parts of cyclohexanone was added to each solution and each solution was filtered through a filter having an average pore diameter of 1 μm to obtain coating solutions for forming the nonmagnetic lower layer and the magnetic layer.

These coating solutions obtained were respectively simultaneously multilayer-coated on an aramide support (trade name: Mictron) having a thickness of 4.4 μm and a central plane average surface roughness of 2 nm of the surface side on which a magnetic layer was to be coated. The lower layer coating solution was coated in a dry thickness of 1.7 μm, immediately thereafter the magnetic layer coating solution was coated on the lower layer so as to give the magnetic layer having a thickness of 0.15 μm. The coated layers were subjected to orientation with a cobalt magnet having a magnetic force of 6,000 G and a solenoid having a magnetic force of 6,000 G while both layers were still wet. After drying, the coated layers were subjected to calendering treatment with calenders of 7 stages comprising metal rolls at 85° C. at a rate of 200 m/min. Subsequently, a backing layer having a thickness of 0.5 μm (100 parts of a carbon black having an average particle size of 17 nm, 80 parts of calcium carbonate having an average particle size of 40 nm, and 5 parts of α-alumina having an average particle size of 200 nm were dispersed in a nitrocellulose resin, a polyurethane resin and a polyisocyanate) was coated. The obtained web was slit to a width of 3.8 mm. The magnetic layer surface of the thus-produced tape was cleaned with a tape cleaning apparatus of a nonwoven fabric and a razor blade pressed against the surface of the tape, which was attached to a machine having delivery and winding-up movement of a slit product. Thus, tape samples were obtained.

The above-obtained magnetic powders, magnetic discs and computer tapes were respectively evaluated as follows.

Measuring Method (1) Magnetic Characteristics (Hc, σ$_2$):

Magnetic characteristics were measured using a vibrating sample magnetometer (a product of Toei Kogyo Co., Ltd.) by Hm 10 KOe.

(2) Diamond Fine Particle (particle size distribution):

An appropriate amount of a diamond particle was photographed by an electron microscope. From the electron microphotographs, 500 particles were randomly sampled, and an average particle size ϕ, the proportion of the number of particles having the particle size of 200% or more of the average particle size φ accounting for in the entire number of diamond particles (ΔN200) (%), and the proportion of the number of particles having the particle size of 50% or less of the average particle size φ accounting for in the entire number of diamond particles (ΔN50) (%) were obtained.

(3) Central Plane Average Surface Roughness (Ra):

Surface roughness (Ra) of the area of about 250 μm×250 μm was measured using "TOPO3D" (a product of WYKO, U.S.A.) by 3D-MIRAU method. The wavelength of measurement was about 650 nm and spherical compensation and cylindrical compensation were applied. Measurement was performed using a light interference type non-contact surface roughness meter.

(4) Electromagnetic Characteristics of a Disc:

Output: Reproduction output was measured using a disc tester manufactured by Kokusai Denshi Kogyo Co., Ltd. (the late Tokyo Engineering Co., Ltd.) and an SK606B type disc evaluation apparatus by a metal-in-gap head having a gap length of 0.3 μm. Recording was conducted at the position of radius of 24.6 mm by a recording wavelength of 90 KFCI, then reproduction output of a head amplifier was determined by an oscilloscope 7633 type manufactured by Techtronics Co., Ltd.

S/N ratio: After DC erasure of the disc used for determining reproduction output, reproduction output (noise level) was measured by a TR4171 type spectrum analyzer (manufactured by Advantes Co., Ltd.).

−20 log (noise/reproduction output) was taken as S/N ratio and represented as a relative value taking the S/N value of Sample Nos. 1 and 11 as 0 dB.

(5) Electromagnetic Characteristics of a Tape:

C/N ratio (tape): digital signals were recorded and reproduced with a recording head (MIG, gap length: 0.15 μm, 1.8 T) being attached to a drum tester. Relative speed of head-medium was 3 m/sec, recording wavelength was 0.35 μm, and modulated noise was determined.

(6) Durability:

(1) Durability of a magnetic disc:

A floppy disc drive ("ZIP100", a product of IOMEGA CORP., U.S.A., rotation number: 2,968 rpm) was used. The head was fixed at the position of radius of 38 mm. The disc was run under the following thermo-cycle condition, which being taken as one cycle. The point when scratches were visually observed on the surface of the sample was taken as NG. The time of durability of Sample No. 1 was taken as 100%.

Thermo-Cycle Flow

25° C., 50% RH, 1 hr→(temperature up, 2 hr)→60° C., 20% RH, 7 hr→(temperature down, 2 hr)→25° C., 50% RH, 1 hr→(temperature down, 2 hr)→5° C., 10% RH, 7 hr→(temperature up, 2 hr)→(this cycle was repeated).

(2) Durability of a computer tape:

Predetermined signals were recorded using a DDS drive. The disc was run at 50° C., 10% RH while monitoring reproduced signals, and the point when the initial reproduction output reached 70% was taken as NG. The durability of Sample No. 32 was taken as 100%.

The results of evaluation of magnetic discs are shown in Tables 13-2 and 14-2 and the results of evaluation of magnetic tapes are shown in Table 15-2, respectively.

TABLE 13-1

Disc in which barium ferrite powder is used

| Sample No. | Remarks | Magnetic Powder | Average Particle Size (nm) | Magnetic Layer Hc (Oe) | Magnetic Layer Ra (nm) | Diamond Fine Particle φ* (μm) | Diamond Fine Particle $\Delta N_{200}$ (%) | Diamond Fine Particle $\Delta N_{50}$ (%) | A | Alumina B |
|---|---|---|---|---|---|---|---|---|---|---|
| 1 | Ref. Ex. | BaF (1) | 25 | 2,400 | 4.1 | — | — | — | 0 | 20 |
| 2 | Ref. Ex. | BaF (1) | 25 | 2,410 | 3.9 | — | — | — | 0 | 10 |
| 3 | Ex. | BaF (1) | 25 | 2,400 | 2.8 | 0.2 | 2 | 6 | 1.5 | 0 |
| 4 | Ex. | BaF (2) | 20 | 2,050 | 2.1 | 0.3 | 0 | 5 | 0.3 | 10 |
| 5 | Ex. | BaF (3) | 35 | 2,360 | 4.2 | 0.4 | 3 | 7 | 0.3 | 10 |
| 6 | Ex. | BaF (1) | 25 | 2,410 | 3.0 | 0.4 | 7 | 3 | 1.5 | 0 |
| 7 | Ex. | BaF (1) | 25 | 2,400 | 2.4 | 0.4 | 0 | 23 | 1.5 | 0 |
| 8 | Ex. | BaF (4) | 25 | 1,870 | 3.6 | 0.4 | 3 | 7 | 0.3 | 10 |
| 9 | Ex. | BaF (5) | 25 | 3,050 | 3.0 | 0.3 | 0 | 5 | 0.3 | 10 |
| 10 | Ref. Ex. | BaF (6) | 25 | 1,750 | 2.9 | 0.4 | 3 | 7 | 0.3 | 10 |

φ*Average particle size of a diamond particle
A: The addition amount of a diamond particle in % by weight based on barium ferrite powder
B: The addition amount of an alumina in % by weight based on barium ferrite powder

TABLE 13-2

Results of evaluation of disc in which barium ferrite powder is used

| Sample No. | Remarks | Track Density (tpi) | Linear Recording Density (kbpi) | Areal Recording Density (G bit/inch$^2$) | S/N Ratio (dB) | Durability (%) |
|---|---|---|---|---|---|---|
| 1 | Reference Example | 5,200 | 144 | 0.75 | 0 | 100 |
| 2 | Reference Example | 5,200 | 144 | 0.75 | 2.5 | 30 |
| 3 | Example | 5,200 | 144 | 0.75 | 4.2 | 100 |
| 4 | Example | 5,200 | 144 | 0.75 | 5.0 | 100 |
| 5 | Example | 5,200 | 144 | 0.75 | 3.3 | 100 |
| 6 | Example | 5,200 | 144 | 0.75 | 2.0 | 100 |
| 7 | Example | 5,200 | 144 | 0.75 | 3.7 | 100 |
| 8 | Example | 5,200 | 144 | 0.75 | 2.2 | 100 |
| 9 | Example | 5,200 | 144 | 0.75 | 4.3 | 100 |
| 10 | Reference Example | 5,200 | 144 | 0.75 | 0.5 | 100 |

TABLE 14-1

Disc in which ferromagnetic metal powder is used

| Sample No. | Remarks | Magnetic Powder | Average Long Axis Length (nm) | Magnetic Layer Hc (Oe) | Magnetic Layer Ra (nm) | Diamond Fine Particle φ* (μm) | Diamond Fine Particle ΔN$_{200}$ (%) | Diamond Fine Particle ΔN$_{50}$ (%) | A | Alumina B |
|---|---|---|---|---|---|---|---|---|---|---|
| 11 | Ref. Ex. | MP (1) | 80 | 2,300 | 4.1 | — | — | — | 0 | 20 |
| 12 | Ref. Ex. | MP (1) | 80 | 2,300 | 3.5 | — | — | — | 0 | 10 |
| 13 | Ex. | MP (1) | 80 | 2,310 | 3.1 | 0.2 | 2 | 6 | 1.5 | 0 |
| 14 | Ex. | MP (1) | 80 | 2,310 | 3.3 | 0.3 | 0 | 5 | 1.5 | 0 |
| 15 | Ex. | MP (1) | 80 | 2,310 | 3.0 | 0.3 | 0 | 5 | 0.3 | 7.5 |
| 16 | Ex. | MP (2) | 50 | 2,300 | 3.0 | 0.3 | 0 | 5 | 0.3 | 7.5 |
| 17 | Ex. | MP (1) | 80 | 2,360 | 1.9 | 0.8 | 2 | 10 | 1.0 | 0 |
| 18 | Ex. | MP (1) | 80 | 2,350 | 2.7 | 0.4 | 3 | 7 | 0.2 | 10 |
| 19 | Ex. | MP (1) | 80 | 3,360 | 3.0 | 0.4 | 7 | 3 | 0.2 | 10 |
| 20 | Ex. | MP (1) | 80 | 2,350 | 3.0 | 0.4 | 0 | 23 | 0.2 | 10 |
| 21 | Ex. | MP (3) | 80 | 1,850 | 3.0 | 0.4 | 3 | 7 | 0.2 | 10 |
| 22 | Ref. Ex. | MP (4) | 80 | 1,720 | 3.1 | 0.4 | 3 | 7 | 0.2 | 10 |

φ*Average particle size of a diamond particle
A: The addition amount of a diamond particle in % by weight based on the magnetic powder
B: The addition amount of an alumina in % by weight based on the magnetic powder

TABLE 14-2

Results of evaluation of disc in which ferromagnetic metal powder is used

| Sample No. | Remarks | Track Density (tpi) | Linear Recording Density (kbpi) | Areal Recording Density (G bit/inch$^2$) | S/N Ratio (dB) | Durability (%) |
|---|---|---|---|---|---|---|
| 11 | Reference Example | 5,200 | 144 | 0.75 | 0 | 100 |
| 12 | Reference Example | 5,200 | 144 | 0.75 | 2.1 | 20 |
| 13 | Example | 5,200 | 144 | 0.75 | 3.5 | 100 |
| 14 | Example | 5,200 | 144 | 0.75 | 3.5 | 100 |
| 15 | Example | 5,200 | 144 | 0.75 | 3.6 | 100 |
| 16 | Example | 5,200 | 144 | 0.75 | 4.0 | 100 |
| 17 | Example | 5,200 | 144 | 0.75 | 3.0 | 100 |
| 18 | Example | 5,200 | 144 | 0.75 | 3.5 | 100 |
| 19 | Example | 5,200 | 144 | 0.75 | 1.8 | 100 |
| 20 | Example | 5,200 | 144 | 0.75 | 3.3 | 100 |
| 21 | Example | 5,200 | 144 | 0.75 | 2.0 | 100 |
| 22 | Reference Example | 5,200 | 144 | 0.75 | 0.2 | 100 |

TABLE 15-1

Magnetic recording tape

| Sample No. | Remarks | Magnetic Powder | Average Long Axis Length (nm) | Magnetic Layer Hc (Oe) | Magnetic Layer Ra (nm) | Diamond Fine Particle φ* (μm) | Diamond Fine Particle ΔN$_{200}$ (%) | Diamond Fine Particle ΔN$_{50}$ (%) | A | Alumina B |
|---|---|---|---|---|---|---|---|---|---|---|
| 23 | Ref. Ex. | MP (1) | 80 | 2,340 | 4.3 | — | — | — | 0 | 12 |
| 24 | Ref. Ex. | MP (1) | 80 | 2,340 | 3.3 | — | — | — | 0 | 6 |
| 25 | Ex. | MP (1) | 80 | 2,350 | 2.9 | 0.2 | 2 | 6 | 1.0 | 0 |
| 26 | Ex. | MP (1) | 80 | 2,350 | 3.0 | 0.3 | 0 | 5 | 0.2 | 6 |
| 27 | Ex. | MP (2) | 50 | 2,330 | 3.2 | 0.3 | 0 | 5 | 0.2 | 6 |
| 28 | Ex. | MP (2) | 50 | 2,390 | 2.8 | 0.4 | 3 | 7 | 0.2 | 10 |
| 29 | Ref. Ex. | BaF (1) | 25 | 2,430 | 3.9 | — | — | — | 0 | 12 |
| 30 | Ref. Ex. | BaF (1) | 25 | 2,450 | 4.0 | — | — | — | 0 | 6 |
| 31 | Ex. | BaF (1) | 25 | 3,450 | 2.6 | 0.3 | 0 | 5 | 0.3 | 6 |
| 32 | Ex. | BaF (2) | 20 | 2,100 | 1.9 | 0.3 | 0 | 5 | 0.3 | 6 |
| 33 | Ex. | BaF (2) | 20 | 2,350 | 2.4 | 0.2 | 2 | 6 | 1.0 | 0 |

φ*Average particle size of a diamond particle
A: The addition amount of a diamond particle in % by weight based on the magnetic powder or the barium ferrite powder
B: The addition amount of an alumina in % by weight based on the magnetic powder or the barium ferrite powder

TABLE 15-2

Results of evaluation of magnetic tape

| Sample No. | Remarks | Track Density (tpi) | Linear Recording Density (kbpi) | Areal Recording Density (G bit/inch²) | S/N Ratio (dB) | Durability (%) |
|---|---|---|---|---|---|---|
| 23 | Reference Example | 3,000 | 122 | 0.366 | 0 | 100 |
| 24 | Reference Example | 3,000 | 122 | 0.366 | 1.5 | 20 |
| 25 | Example | 3,000 | 122 | 0.366 | 1.8 | 100 |
| 26 | Example | 3,000 | 122 | 0.366 | 2.0 | 100 |
| 27 | Example | 3,000 | 122 | 0.366 | 1.5 | 100 |
| 28 | Example | 3,000 | 122 | 0.366 | 1.3 | 100 |
| 29 | Reference Example | 3,000 | 122 | 0.366 | 0 | 100 |
| 30 | Reference Example | 3,000 | 122 | 0.366 | 2.0 | 30 |
| 31 | Example | 3,000 | 122 | 0.366 | 2.2 | 100 |
| 32 | Example | 3,000 | 122 | 0.366 | 2.3 | 100 |
| 33 | Example | 3,000 | 122 | 0.366 | 2.4 | 100 |

As is apparent from the results in Example 36, noise in electromagnetic characteristics can be improved while retaining durability by adding to the magnetic layer a diamond particle preferably having an average particle size of from 0.10 to 1.0 μm in an amount of preferably from 0.01 to 5% by weight based on the magnetic powder.

EFFECT OF THE INVENTION

The present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.17 to 2 G bit/inch², wherein the coercive force of the magnetic layer is 1,800 Oe or more, the average long axis length of the above ferromagnetic metal powder is 0.15 μm or less, and the average particle size of the above ferromagnetic hexagonal ferrite powder is 0.10 μm or less, or the present invention can be attained by a magnetic recording medium which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.17 to 2 G bit/inch², wherein the dry thickness of the magnetic layer is from 0.05 to 0.30 μm, preferably from 0.05 to 0.25 μm, φm is from $10.0 \times 10^{-3}$ to $1.0 \times 10^{-3}$ emu/cm², preferably from $8.0 \times 10^{-3}$ to $1.0 \times 10^{-3}$ emu/cm². The magnetic recording medium having high capacity, excellent high density characteristics and excellent durability, in which, in particular, the error rate in high density recording region has been markedly improved, which could never be obtained by conventional techniques of the conventional coating type magnetic recording (particulate) medium, could be obtained by adopting the constitution of the present invention.

What is claimed is:

1. A magnetic recording medium which comprises a support having thereon a substantially nonmagnetic lower layer and a magnetic layer comprising a ferromagnetic metal powder or a ferromagnetic hexagonal ferrite powder dispersed in a binder formed on the lower layer, which is a magnetic recording medium for recording signals having areal recording density of from 0.20 to 2 G bit/inch², wherein the coercive force of said magnetic layer is 1,800 Oe or more, the average long axis length of said ferromagnetic metal powder is 0.15 μm or less, the average particle size of said ferromagnetic hexagonal ferrite powder is 0.10 μm or less; the dry thickness of said magnetic layer is from 0.05 to 0.30 μm, $\phi_m$ is from $10.0 \times 10^{-3}$ to $1.0 \times 10^{-3}$ emu/cm², and wherein said magnetic layer has a central plane average surface roughness of 5.0 nm or less measured by a 3D-MIRAU method.

2. The magnetic recording medium as claimed in claim 1, wherein the dry thickness of said magnetic layer is from 0.05 to 0.25 μm and the φm is preferably from $8.0 \times 10^{-3}$ to $1.0 \times 10^{-3}$ emu/cm².

3. The magnetic recording medium as claimed in claim 1, wherein said magnetic layer has a coercive force of 2,100 Oe or more, and said ferromagnetic metal powder has an average long axis length of 0.12 μm or less or said ferromagnetic hexagonal ferrite powder has an average particle size of 0.10 μm or less.

4. The magnetic recording medium as claimed in claim 1, which is a magnetic recording medium for a system of a high transfer rate of 1.0 MB/sec. or more.

5. The magnetic recording medium as claimed in claim 1, which is a magnetic recording medium for a high capacity floppy disc system of disc rotation speed of 2,000 rpm or more.

6. The magnetic recording medium as claimed in claim 1, wherein said ferromagnetic metal powder comprises Fe as a main component, has an average long axis length of from 0.12 μm or less, and an acicular ratio of from 3.0 to 9.0.

7. The magnetic recording medium as claimed in claim 1, wherein said ferromagnetic metal powder comprises Fe as a main component, has an average long axis length of 0.10 μm or less, and a crystallite size of from 80 to 180 Å.

8. The magnetic recording medium as claimed in claim 1, wherein said support has a central plane average surface roughness of 5.0 nm or less measured by 3D-MIRAU method.

9. The magnetic recording medium as claimed in claim 1, wherein said support has a thermal shrinkage factor of 0.5% or less at 100° C. for 30 minutes and a thermal shrinkage factor of 0.2% or less at 80° C. for 30 minutes in every direction of in-plane of said support.

10. The magnetic recording medium as claimed in claim 1, wherein said support has a temperature expansion coefficient of from $10^{-4}$ to $10^{-8}/°$ C. in every direction of in-plane of said support.

11. The magnetic recording medium as claimed in claim 1, wherein said lower layer and/or magnetic layer contain(s) at least a lubricant having a fluid lubrication function and a lubricant having a boundary lubrication function.

12. The magnetic recording medium as claimed in claim 11, wherein said lubricant contains a fatty acid and a fatty acid ester having the same fatty acid residues with each other.

13. The magnetic recording medium as claimed in claim 11, wherein said fatty acid of said lubricant contains at least a saturated fatty acid and said fatty acid ester of said lubricant contains at least a saturated fatty acid ester or an unsaturated fatty acid ester.

14. The magnetic recording medium as claimed in claim 11, wherein said fatty acid ester of said lubricant contains a monoester and a diester.

15. The magnetic recording medium as claimed in claim 11, wherein said fatty acid ester of said lubricant contains a saturated fatty acid ester and an unsaturated fatty acid ester.

16. The magnetic recording medium as claimed in claim 1, wherein the surface of said magnetic layer has a C/Fe peak ratio of from 5 to 100 when the surface is measured by the Auger electron spectroscopy.

17. The magnetic recording medium as claimed in claim 1, wherein said lower layer contains a carbon black having a particle size of from 5 to 80 nm and said magnetic layer contains a carbon black having a particle size of from 5 to 300 nm.

18. The magnetic recording medium as claimed in claim 1, wherein said lower layer contains a carbon black having an average particle size of from 5 to 80 nm and a carbon black having an average particle size of larger than 80 nm.

19. The magnetic recording medium as claimed in claim 1, wherein said lower layer and said magnetic layer each contains a carbon black having an average particle size of from 5 to 80 nm.

20. The magnetic recording medium as claimed in claim 1, wherein said lower layer contains an acicular inorganic powder having an average long axis length of 0.20 $\mu$m or less and an acicular ratio of from 4.0 or 9.0.

21. The magnetic recording medium as claimed in claim 1, wherein said lower layer contains an acicular inorganic powder and said magnetic layer contains an acicular ferromagnetic metal powder, and the average long axis length of said acicular inorganic powder is from 1.1 to 3.0 times the average long axis length of said acicular ferromagnetic metal powder.

22. The magnetic recording medium as claimed in claim 1, wherein said lower layer and/or said magnetic layer contain(s) a phosphorus compound and said lower layer contains an acicular or spherical inorganic powder.

23. The magnetic recording medium as claimed in claim 1, wherein said magnetic layer contains at least an abrasive having an average particle size of from 0.01 to 0.30 $\mu$m.

24. The magnetic recording medium as claimed in claim 1, wherein said magnetic layer contains at least a diamond particle having an average particle size of 2.0 $\mu$m or less.

25. The magnetic recording medium as claimed in claim 1, wherein said magnetic layer contains two kinds of abrasives having a Mohs' hardness of 9 or more.

26. The magnetic recording medium as claimed in claim 1, wherein said magnetic layer contains an $\alpha$-alumina and a diamond particle.

27. The magnetic recording medium as claimed in claim 1, wherein said lower layer and/or said magnetic layer contain(s) at least a polyurethane having a glass transition temperature of from 0° C. to 100° C.

28. The magnetic recording medium as claimed in claim 1, wherein said lower layer and/or said magnetic layer contain(s) at least a polyurethane having a breaking stress of from 0.05 to 10 kg/mm$^2$.

29. The magnetic recording medium as claimed in claim 1, wherein said magnetic layer has a dry thickness of from 0.05 to 0.20 $\mu$m and said magnetic layer contains an abrasive having an average particle size of 0.4 $\mu$m or less.

30. The magnetic recording medium as claimed in claim 1, which is a magnetic recording medium for recording signals having areal recording density of from 0.35 to 2 G bit/inch$^2$.

31. The magnetic recording medium as claimed in claim 1, which is a magnetic recording medium for a high capacity floppy disc system of disc rotation speed of 3,000 rpm or more.

32. The magnetic recording medium as claimed in claim 1, which is a magnetic recording medium for a system of a high transfer rate of 2.0 MB/sec. or more.

33. The magnetic recording medium as claimed in claim 1, which is a magnetic recording medium which has realized subordination transposition capable of recording/reproduction with conventional 3.5 inch type floppy discs.

34. The magnetic recording medium as claimed in claim 1, which is a magnetic recording medium for a high capacity floppy disc system adopting a dual discrete gap head having both a narrow gap for high density recording and a broad gap for conventional 3.5 inch type floppy discs.

35. The magnetic recording medium as claimed in claim 1, which is a magnetic recording medium for a high capacity floppy disc system adopting a head which floats by disc rotation.

36. The magnetic recording medium as claimed in claim 1, which is a magnetic recording medium for a high capacity floppy disc system adopting a head which floats by disc rotation and, at the same time, a linear type voice coil motor as a driving motor of the head.

37. The magnetic recording medium as claimed in claim 1, wherein said support is polyethylene terephthalate or polyamide.

\* \* \* \* \*